(12) United States Patent
Shinkai et al.

(10) Patent No.: US 9,316,845 B2
(45) Date of Patent: Apr. 19, 2016

(54) ILLUMINATION UNIT AND DISPLAY UNIT

(75) Inventors: Shogo Shinkai, Miyagi (JP); Akira Ebisui, Miyagi (JP); Kentaro Okuyama, Miyagi (JP); Harumi Sato, Miyagi (JP)

(73) Assignee: Sony Corporation, Tokyo (JP)

(*) Notice: Subject to any disclaimer, the term of this patent is extended or adjusted under 35 U.S.C. 154(b) by 107 days.

(21) Appl. No.: 14/234,341

(22) PCT Filed: Jul. 20, 2012

(86) PCT No.: PCT/JP2012/068425
§ 371 (c)(1),
(2), (4) Date: Jan. 22, 2014

(87) PCT Pub. No.: WO2013/018560
PCT Pub. Date: Feb. 7, 2013

(65) Prior Publication Data
US 2014/0192285 A1    Jul. 10, 2014

(30) Foreign Application Priority Data

Jul. 29, 2011  (JP) .................... 2011-167337
Dec. 8, 2011   (JP) .................... 2011-268686

(51) Int. Cl.
| G02F 1/1335 | (2006.01) |
| G02B 27/26 | (2006.01) |
| H04N 13/04 | (2006.01) |

(Continued)

(52) U.S. Cl.
CPC .............. *G02B 27/26* (2013.01); *F21V 7/005* (2013.01); *F21V 7/043* (2013.01); *F21V 7/09* (2013.01);

(Continued)

(58) Field of Classification Search
CPC .... G02B 6/0018; G02B 6/0028; G02B 6/005; G02B 6/0068; G02B 6/0055; G02B 6/002; G02B 6/0088; G02B 6/0043; G02B 6/0031; G02B 6/0816; G02B 6/0011; G02B 6/0046; G02B 6/0001; G02B 6/0013; G02B 6/0033; G02B 6/0045; G02B 6/0073; G02B 6/0086; G02B 6/0091; G02B 5/0284; G02B 5/124; G02B 5/12; G02B 5/136; G09F 13/14; G09F 13/16; G02F 1/133553; G02F 1/1336; G02F 1/1347; G02F 1/133524; G02F 2001/133616
USPC ................ 345/102; 349/63, 67, 113, 65, 122; 362/603, 297, 611, 613, 296.01, 560, 362/612, 615

See application file for complete search history.

(56) References Cited

U.S. PATENT DOCUMENTS

| 6,130,736 A * | 10/2000 | Sasaki et al. | .......... G02F 1/1333 349/122 |
| 6,266,108 B1 * | 7/2001 | Bao et al. | .............. G02F 1/1335 349/63 |

(Continued)

FOREIGN PATENT DOCUMENTS

| JP | 03-119889 | 5/1991 |
| JP | 2003-215589 | 7/2003 |

(Continued)

*Primary Examiner* — Thoi Duong
(74) *Attorney, Agent, or Firm* — K&L Gates LLP

(57) ABSTRACT

There are provided an illumination unit capable of reducing formation of a double image in three-dimensional display and a display unit including the same. An illumination optical system configured to generate linear illumination light formed by two-dimensionally arranging a plurality of linear illumination light beams or a plurality of point-like illumination light beams, and a reflective plate configured to reflect the linear illumination light are included. The reflective plate reflects the linear illumination light to or close to a plane passing through a part that generates the linear illumination light and being perpendicular to a plane including the reflective plate.

16 Claims, 55 Drawing Sheets

(51) Int. Cl.
*F21V 7/00* (2006.01)
*F21V 7/04* (2006.01)
*F21V 7/09* (2006.01)
*G02F 1/01* (2006.01)
*F21V 8/00* (2006.01)
*G02F 1/1334* (2006.01)

(52) U.S. Cl.
CPC .......... *G02F 1/0105* (2013.01); *H04N 13/0402* (2013.01); *H04N 13/0409* (2013.01); *G02B 6/0053* (2013.01); *G02B 6/0055* (2013.01); *G02B 6/0058* (2013.01); *G02F 1/1334* (2013.01); *G02F 1/133615* (2013.01); *G02F 2201/52* (2013.01)

(56) References Cited

U.S. PATENT DOCUMENTS

| | | | |
|---|---|---|---|
| 6,507,378 B1 * | 1/2003 | Yano et al. | G02F 1/1335 349/63 |
| 6,879,354 B1 | 4/2005 | Sawayama et al. | |

FOREIGN PATENT DOCUMENTS

| | | |
|---|---|---|
| JP | 2007-514273 | 5/2007 |
| JP | 3140639 | 4/2008 |
| JP | 2009-163033 | 7/2009 |
| WO | 2007/102251 | 9/2007 |

* cited by examiner (A)

(B)

20 μm (A) L13

(B) L12

ANGLE BETWEEN CONVEX SECTION AND LINEAR ILLUMINATION LIGHT 83A  83A
(83a) (83b)

FIG. 63

|  | COMPARATIVE EXAMPLE 1 LIGHT ABSORPTION PLATE | COMPARATIVE EXAMPLE 2 FLAT, MIRROR SURFACE | EXAMPLE 1 PRISM GROOVE |
|---|---|---|---|
| 3D LUMINANCE (a.u.) | 1 | 2.14 | 2.04 |
| BLACK-WHITE FINE LINE CONTRAST | MAX 27.7 | MAX 5.0 | MAX 14.3 |
| 2D LUMINANCE (a.u.) | 1 | 2.05 | 1.96 |

|  | COMPARATIVE EXAMPLE 3 LIGHT ABSORPTION PLATE | COMPARATIVE EXAMPLE 4 FLAT, MIRROR SURFACE | EXAMPLE 2 CORNER CUBE |
|---|---|---|---|
| 3D LUMINANCE (a.u.) | 1 | 2.14 | 2.03 |
| BLACK-WHITE FINE LINE CONTRAST | MAX 27.7 | MAX 5.0 | MAX 13.2 |
| 2D LUMINANCE (a.u.) | 1 | 2.05 | 1.95 |

(A)  (B)

(C)  (D)

ILLUMINATION UNIT AND DISPLAY UNIT

CROSS REFERENCES TO RELATED APPLICATIONS

The present application is a national stage of International Application No. PCT/JP2012/068425 filed on Jul. 20, 2012 and claims priority to Japanese Patent Application No. 2011-167337 filed on Jul. 29, 2011, and Japanese Patent Application No. 2011-268686 filed on Dec. 8, 2011, the disclosure of which is incorporated herein by reference.

BACKGROUND

The present technology relates to an illumination unit suitable for a purpose of illuminating, for example, a transmissive liquid crystal panel from a back thereof and a display unit including the same. More specifically, the present technology relates to an illumination unit suitable as a backlight in a display unit capable of performing two-dimensional display (planar display) and three-dimensional display (stereoscopic display), and a display unit including the same.

BACKGROUND ART

Display units capable of three-dimensional display are classified into display units in need of wearing special glasses and display units without need of the special glasses. In the latter display units, a lenticular lens and a parallax barrier are used to allow a stereoscopic image to be perceived with naked eyes. Image information is distributed to left and right eyes by them to allow the left and right eyes to see different images, and as a result, three-dimensional display is achievable.

However, in a case where the above-described parallax barrier is used, while realism is gained in three-dimensional display, resolution declines in two-dimensional display. Therefore, a technique of performing three-dimensional display without impairing resolution in two-dimensional display is disclosed in PTL 1. In PTL 1, a parallax barrier is configured of a liquid crystal device, and the liquid crystal device acts as the parallax barrier by forming non-transmissive portions in three-dimensional display. Then, when the entire liquid crystal device is turned to a transmission state in two-dimensional display, the liquid crystal device does not act as the parallax barrier, and all images on a display screen enter the left and right eyes in a similar fashion. However, in a method described in PTL 1, there is an issue that, in three-dimensional display, light is absorbed by the parallax barrier to cause low display luminance.

On the other hand, for example, in PTL 2, it is disclosed that a polymer dispersed liquid crystal (PDLC) capable of controlling transmission and diffusion by voltage application is included in a waveguide. In this method, when strip-like scattering regions are formed in parts of the PDLC, light propagating through an interior of the waveguide is scattered by the scattering regions, and linear light sources are formed. Moreover, in this method, when the entire PDLC is turned to a scattering region, light propagating through the interior of the waveguide is scattered by the scattering region, and a planar light source is formed. Accordingly, three-dimensional display or two-dimensional display is allowed to be selectively performed without providing a parallax barrier; therefore, a decline in display luminance caused by the parallax barrier is eliminated.

CITATION LIST

Patent Literature

[PTL 1] Japanese Unexamined Patent Application Publications No. H3-119889
[PTL 2] Japanese Unexamined Patent Application Publication (Published Japanese Translation of PCT Application) No. 2007-514273

SUMMARY

Incidentally, in the waveguide described in PTL 2, when a part or a whole of the PDLC is turned to a scattering state, scattered light is emitted not only to a display panel side but also to a bottom surface side of the waveguide. Therefore, it is disclosed in a paragraph [0054] in PTL 2 that a reflective plate is provided to a bottom surface of the waveguide to reflect, to the display panel side, the scattered light emitted to the bottom surface side of the waveguide, thereby enhancing display luminance.

However, in a case where the reflective plate is provided, in three-dimensional display, most of reflected light passes through a region (i.e., a transmission region) other than the scattering region to be emitted to the display panel side. Therefore, there is an issue that, when light emitted from the scattering region and light emitted from the transmission region pass through the display panel, a double image is formed, thereby causing degradation in display quality.

Therefore, it is desirable to provide an illumination unit capable of reducing formation of a double image in three-dimensional display and a display unit including the same.

An illumination unit according to an embodiment of the present technology includes: an illumination optical system configured to generate linear illumination light formed by two-dimensionally arranging a plurality of linear illumination light beams or a plurality of point-like illumination light beams; and a reflective plate configured to reflect the linear illumination light. The reflective plate reflects the linear illumination light to or close to a plane passing through a part that generates the linear illumination light and being perpendicular to a plane including the reflective plate. A display unit according to an embodiment of the present technology includes: a display panel including a plurality of pixels, the pixels being driven based on an image signal; and an illumination unit configured to illuminate the display panel. The illumination unit included in the display unit includes the same components as those in the above-described illumination unit.

In the illumination unit according to the embodiment of the present technology and the display unit according to the embodiment of the present technology, linear illumination light is reflected by the reflective plate to or close to the plane passing through the part that generates the linear illumination light and being perpendicular to the plane including the reflective plate. Thus, a front intensity distribution and an angle intensity distribution of the reflected light are allowed to be brought close to a front intensity distribution and an angle intensity distribution of light emitted toward a direction opposite to the reflective plate.

In the illumination unit according to the embodiment of the present technology and the display unit according to the embodiment of the present technology, the front intensity distribution and the angle intensity distribution of the reflected light are allowed to be brought close to the front intensity distribution and the angle intensity distribution of the light emitted toward the direction opposite to the reflective plate; therefore, compared to a case where a top surface of the reflective plate is configured of a flat surface or a case where the top surface of the reflective plate is configured of a parabolic surface generating parallel light, a rate at which illumination light is emitted from an unnecessary position for three-dimensional display, or a rate at which illumination light is emitted to an unnecessary angle direction for three-dimensional display is allowed to be reduced. Thus, in a case where such an illumination unit is applied as a backlight of a display unit for three-dimensional display, formation of a double image in three-dimensional display is allowed to be reduced. As a result, display quality in three-dimensional display is improved.

Additional features and advantages are described herein, and will be apparent from the following Detailed Description and the figures.

BRIEF DESCRIPTION OF THE FIGURES

FIG. 63 is a diagram illustrating an example of luminance and contrast in an example and comparative examples of the reflective plate in FIG. 60.

FIG. 76 is a diagram illustrating an example of luminance and contrast in an example and comparative examples of the reflective plate in FIG. 72.

DETAILED DESCRIPTION

Figure 1:
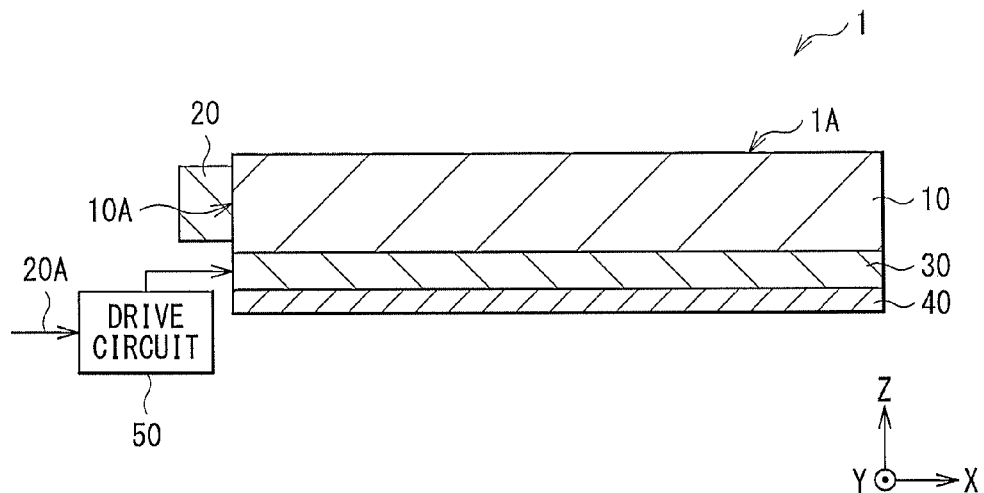
FIG. 1 is a sectional view illustrating an example of a configuration of an illumination unit according to a first embodiment of the present technology.

Some embodiments for embodying the present invention will be described in detail below referring to the accompanying drawings. It is to be noted that description will be given in the following order.

1. First Embodiment (Illumination unit)
An example in which an illumination unit is of an edge light system
An example in which a light modulation device is included
An example in which a reflective plate configured to perform two-dimensional recursive reflection is provided
2. Modification Examples of First Embodiment (Illumination unit)
3. Second Embodiment (Illumination unit)
An example in which an illumination unit is of a direct system
4. Modification Examples of Second Embodiment (Illumination unit)
5. Third Embodiment (Illumination unit)
An example in which an illumination unit is of an edge light system
An example in which scattering regions are provided to a light guide plate
6. Modification Examples of Third Embodiment (Illumination unit)
7. Modification Examples Common to Above-described Embodiments
An example in which a reflective plate configured to reflect light toward an adjacent linear illumination light source is provided
An example in which a reflective plate configured to perform three-dimensional recursive reflection is provided
8. Fourth Embodiment (Display unit)
An example in which any of the illumination units according to the above-described respective embodiments and modification examples thereof is used as a backlight of a display unit
9. Modification Examples of Fourth Embodiment (Display unit)
10. Examples (Display unit)

1. First Embodiment

FIG. 1 illustrates an example of a sectional configuration of an illumination unit 1 according to a first embodiment of the present technology. The illumination unit 1 is applicable as a backlight of a display unit, and, as illustrated in FIG. 1, the illumination unit 1 may include, for example, a light guide plate 10, a light source 20 disposed on a side surface of the light guide plate 10, a light modulation device 30 and a reflective plate 40 disposed behind the light guide plate 10, and a drive circuit 50 driving the light modulation device 30.

It is to be noted that the light guide plate 10 corresponds to a specific example of "light guide plate" in the present technology. The light source 20 corresponds to a specific example of "light source" in the present technology. The reflective plate 40 corresponds to a specific example of "reflective plate" in the present technology. The drive circuit 50 corresponds to a specific example of "driving section" in the present technology. An optical system configured of the light source 20 and the light modulation device 30 corresponds to a specific example of "illumination optical system" in the present technology.

The light guide plate 10 is configured to guide light from the light source 20 disposed on the side surface of the light guide plate 10 to a top surface of the light guide plate 10 (more specifically, a light exit surface 1A of the illumination unit 1). The light guide plate 10 may have, for example, a shape corresponding to a target object for illumination (for example, a display panel 210 which will be described later) disposed on the top surface of the light guide plate 10, for example, a rectangular parallelepiped shape surrounded by a top surface, a bottom surface, and side surfaces. It is to be noted that a side surface where light from the light source 20 enters of the side surfaces of the light guide plate 10 is hereinafter referred to as "light incident surface 10A".

In the light guide plate 10, for example, one or both of the top surface and the bottom surface may have a predetermined patterned shape, and the light guide plate 10 has a function of scattering and uniformizing light incident from the light incident surface 10A. It is to be noted that, in a case where luminance is uniformized by modulating a voltage that is to be applied to the light modulation device 30, a flat light guide plate that is not patterned may be used as the light guide plate 10. The light guide plate 10 may be formed by mainly including a transparent thermoplastic resin such as a polycarbonate resin (PC) or an acrylic resin (polymethylmethacrylate (PMMA)).

The light source 20 is a linear light source, and may be configured of, for example, a hot cathode fluorescent lamp (HCFL), a cold cathode fluorescent lamp (CCFL), a plurality of LEDs (light emitting diodes) arranged in one line, or the like. In a case where the light source 20 is configured of a plurality of LEDs, all of the LEDs may be preferably white LEDs in terms of efficiency, reduction in profile, and uniformity. It is to be noted that the light source 20 may be configured by including, for example, a red LED, a green LED, and a blue LED. The light source 20 may be disposed on one side surface of the light guide plate 10 (refer to FIG. 1), or two side surfaces, three side surfaces, or all side surfaces of the light guide plate 10.

Figure 2:
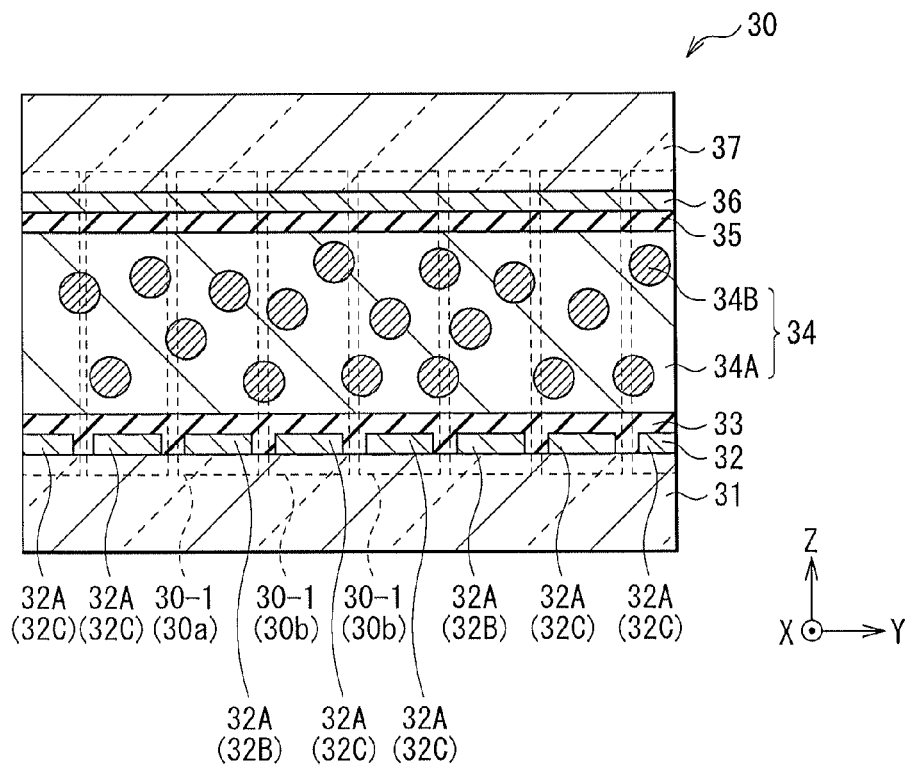
FIG. 2 is a sectional view illustrating an example of a configuration of a light modulation device in FIG. 1.

In this embodiment, the light modulation device 30 is in close contact with a back side (the bottom surface) of the light guide plate 10 without an air layer in between, and is bonded to the back side of the light guide plate 10 with, for example, an adhesive (not illustrated) in between. For example, as illustrated in FIG. 2, the light modulation device 30 may be configured by arranging a transparent substrate 31, a lower electrode 32, an alignment film 33, a light modulation layer 34, an alignment film 35, an upper electrode 36, and a transparent substrate 37 in this order from a side closer to the reflective plate 40. It is to be noted that the lower electrode 32 and the upper electrode 36 correspond to specific examples of "electrode" in the present technology.

The transparent substrates 31 and 37 are configured to support the light modulation layer 34, and are typically configured of substrates transparent to visible light, for example, glass plates or plastic films. The upper electrode 36 is disposed on a surface facing the transparent substrate 31 of the transparent substrate 37, and may be configured of, for example, one solid film formed on the entire surface. On the other hand, the lower electrode 32 is disposed on a surface facing the transparent substrate 37 of the transparent substrate 31, and, for example, as illustrated in FIG. 3, the lower electrode 32 may be configured of a plurality of sub-electrodes 32A.

Figure 3:
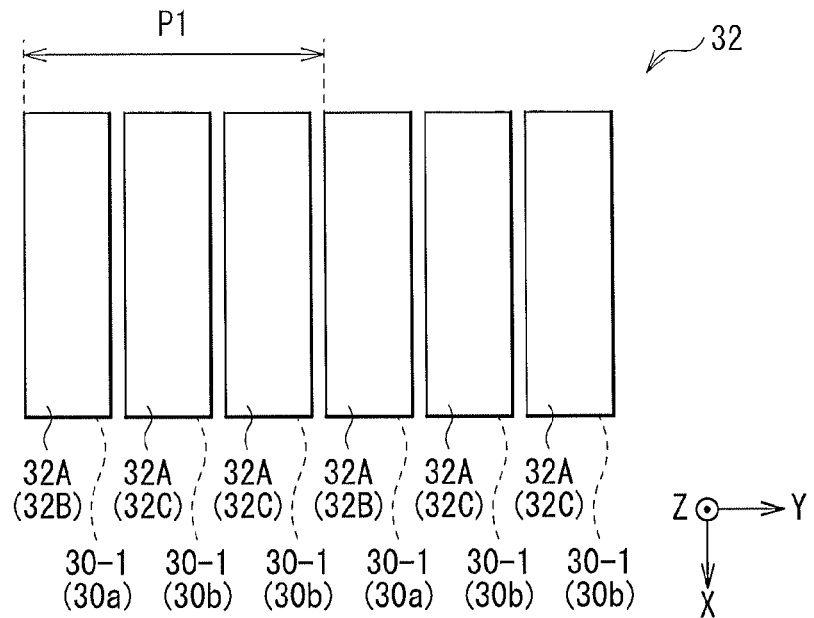
FIG. 3 is a top view illustrating an example of an electrode configuration in FIG. 2.

For example, as illustrated in FIG. 3, the plurality of sub-electrodes 32A each may have a strip-like shape extending in one direction (for example, a direction parallel to a light incident surface 10A) in a plane. When three-dimensional display is performed on the display unit, a plurality of specific sub-electrodes 32A (hereinafter referred to as "sub-electrodes 32B") selected from the plurality of sub-electrodes 32A are used to generate linear illumination light. The plurality of sub-electrodes 32B are arranged with a pitch P1 corresponding to (equal or close to) a pitch P3 (refer to FIG. 82) of a pixel when three-dimensional display is performed on the display unit.

When two-dimensional display is performed on the display unit, a plurality of sub-electrodes 32A (hereinafter referred to as "sub-electrodes 32C") except for the sub-electrodes 32B selected from the plurality of sub-electrodes 32A are used with the sub-electrodes 32B to generate planar illumination light. In other words, when two-dimensional display is performed on the display unit, all of the sub-electrodes 32A are used to generate planar illumination light. The plurality of sub-electrodes 32B and the plurality of sub-electrodes 32C are regularly arranged in a direction orthogonal to the light incident surface 10A. For example, as illustrated in FIGS. 2 and 3, a plurality of sub-electrode groups each configured of one sub-electrode 32B and two sub-electrodes 32C may be arranged in the direction orthogonal to the light incident surface 10A. For example, a width of the sub-electrode 32B may be narrower than a width of a pixel of the display unit.

Figure 4:
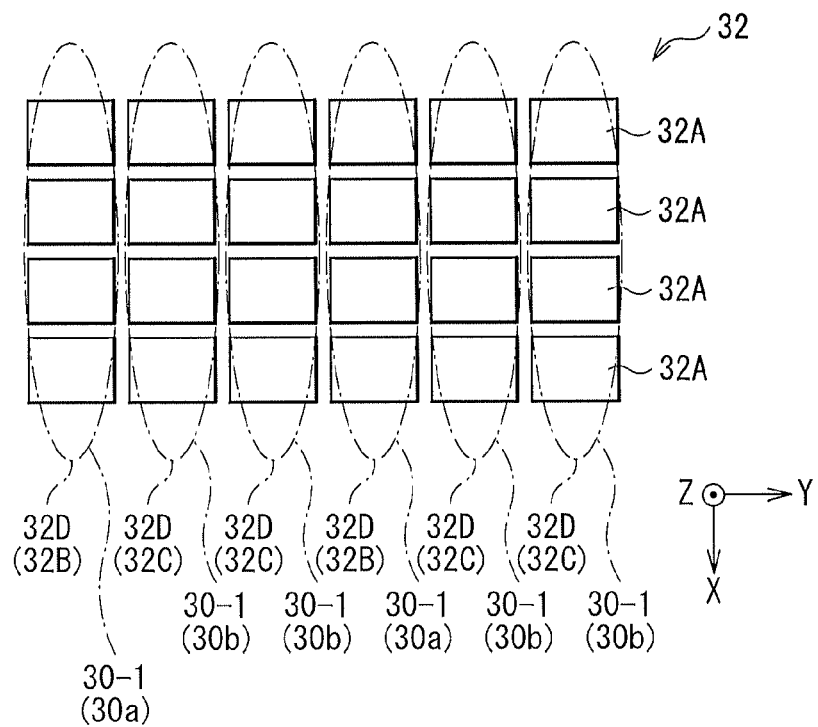
FIG. 4 is a top view illustrating a first modification example of the electrode configuration in FIG. 2.

For example, as illustrated in FIG. 4, each of the sub-electrodes 32A may have a block shape, and the plurality of sub-electrodes 32A may be two-dimensionally arranged. In this case, in a case where a group of a plurality of sub-electrodes 32A is considered as one linear electrode 32D, each linear electrode 32D may be used as each of the above-described sub-electrodes 32B and 32C. For example, a plurality of specific linear electrodes 32D selected from a plurality of linear electrodes 32D are used as sub-electrodes 32B. A plurality of linear electrodes 32D except for the linear electrodes 32D used as the sub-electrodes 32B selected from the plurality of linear electrodes 32D may be used as the sub-electrodes 32C.

It is to be noted that, in a case where each of the sub-electrodes 32A has a block shape and the plurality of sub-electrodes 32A are two-dimensionally arranged, when three-dimensional display is performed on the display unit, each of the sub-electrodes 32A may be used to generate point-like illumination light. Moreover, in a case where each of the sub-electrodes 32A has a block shape and the plurality of sub-electrodes 32A are two-dimensionally arranged, even when two-dimensional display capable of providing, from two perspectives, different two-dimensional images from each other is performed on the display unit, each of the sub-electrodes 32A may be used to generate point-like illumination light.

Figure 5:
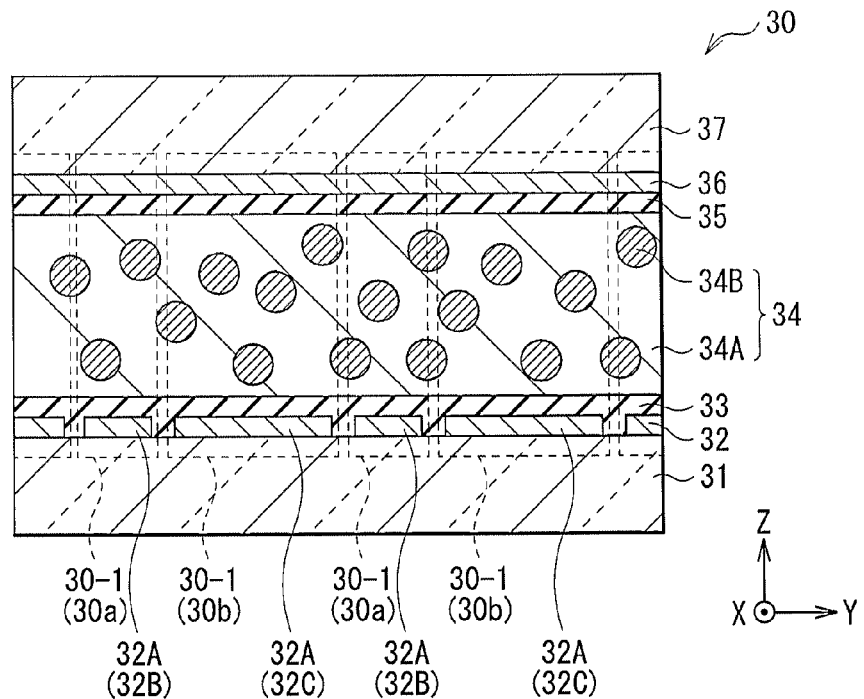
FIG. 5 is a sectional view illustrating another example of the configuration of the light modulation device in FIG. 1.
Figure 6:
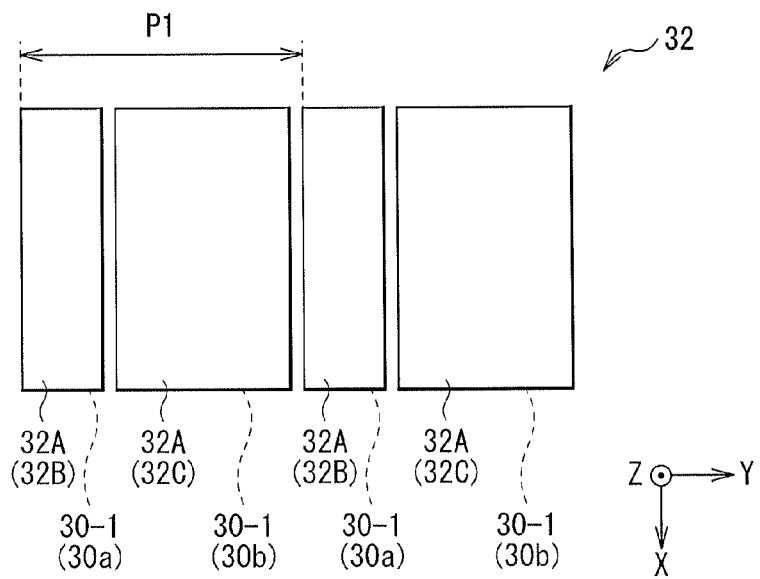
FIG. 6 is a top view illustrating an example of an electrode configuration in FIG. 5.
Figure 7:
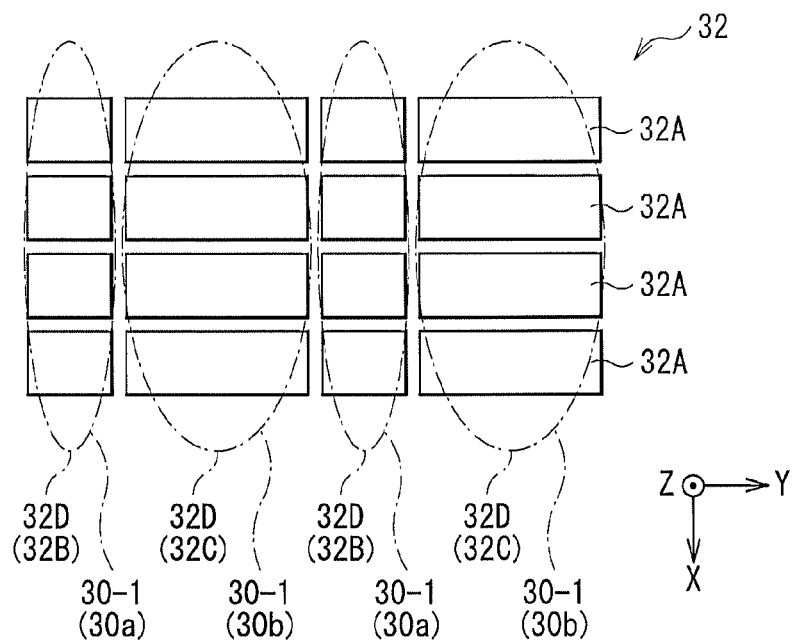
FIG. 7 is a top view illustrating another example of the electrode configuration in FIG. 5.

Moreover, for example, as illustrated in FIGS. 5 and 6, the sub-electrode 32C with a wider width than that of the sub-electrode 32B may be disposed between the sub-electrodes 32B adjacent to each other. Further, at this time, for example, as illustrated in FIG. 7, each of the sub-electrodes 32B may be configured of a plurality of sub-electrodes 32A, and each of the sub-electrodes 32C may be configured of a plurality of sub-electrodes 32A.

Figure 8:
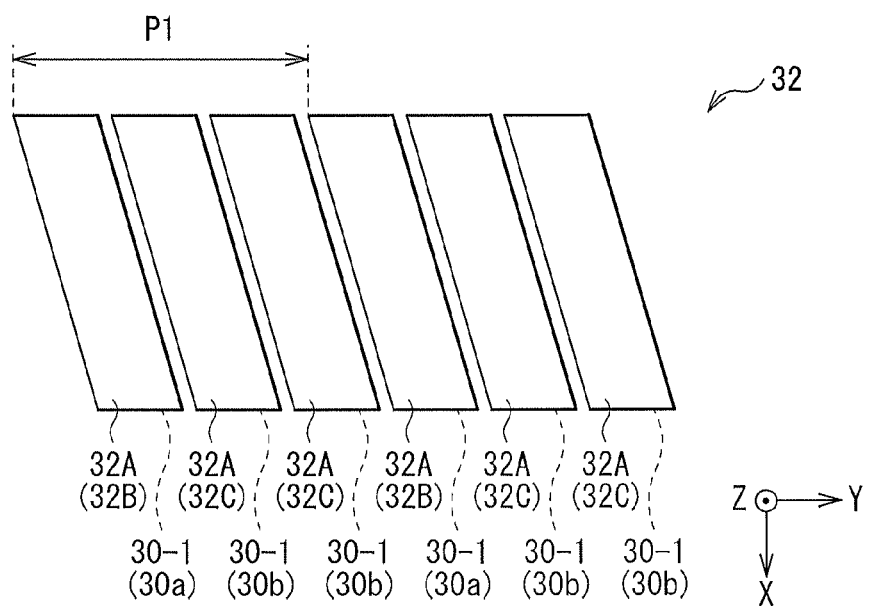
FIG. 8 is a top view illustrating a second modification example of the electrode configuration in FIG. 2.
Figure 9:
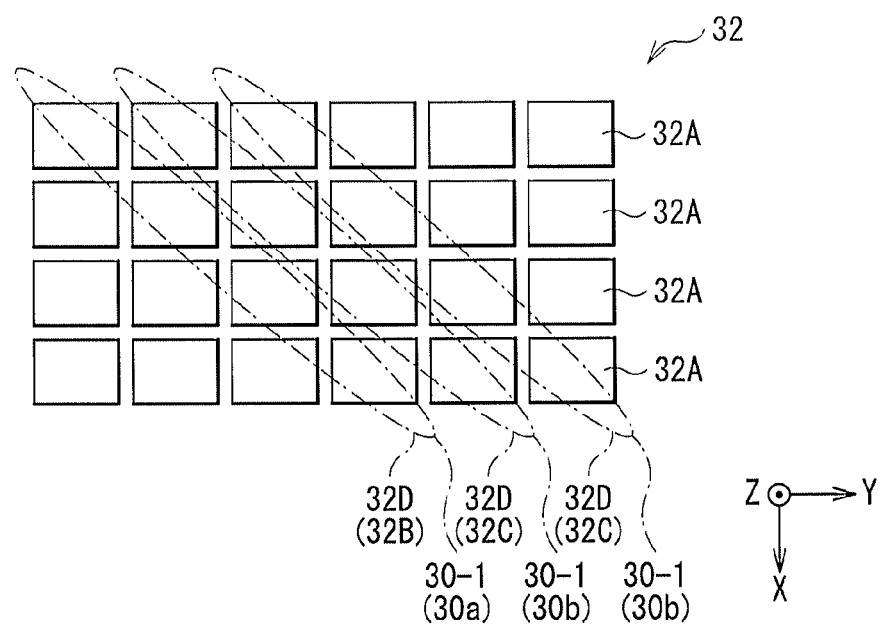
FIG. 9 is a top view illustrating a third modification example of the electrode configuration in FIG. 2.

Moreover, for example, as illustrated in FIG. 8, each of the sub-electrodes 32A may extend in a direction obliquely intersecting with the light incident surface 10A at an angle other than a right angle. Further, in a case where each of the sub-electrodes 32A has a block shape and the plurality of sub-electrodes 32A are two-dimensionally arranged, for example, as illustrated in FIG. 9, each of the linear electrodes 32D may extend in a direction obliquely intersecting with the light incident surface 10A at an angle other than the right angle. It is to be noted that, in a case where each of the sub-electrodes 32A extends in a direction obliquely intersecting with a normal to the light incident surface 10A, an extending direction of each of the sub-electrodes 32A may preferably extend in a direction intersecting with an arrangement direction of pixels in the display panel 210 which will be described later. In such a case, in three-dimensional display, a difference between resolution in a direction parallel to the normal to the light incident surface 10A and resolution in a direction parallel to the light incident surface 10A is allowed to be reduced.

Figure 10:
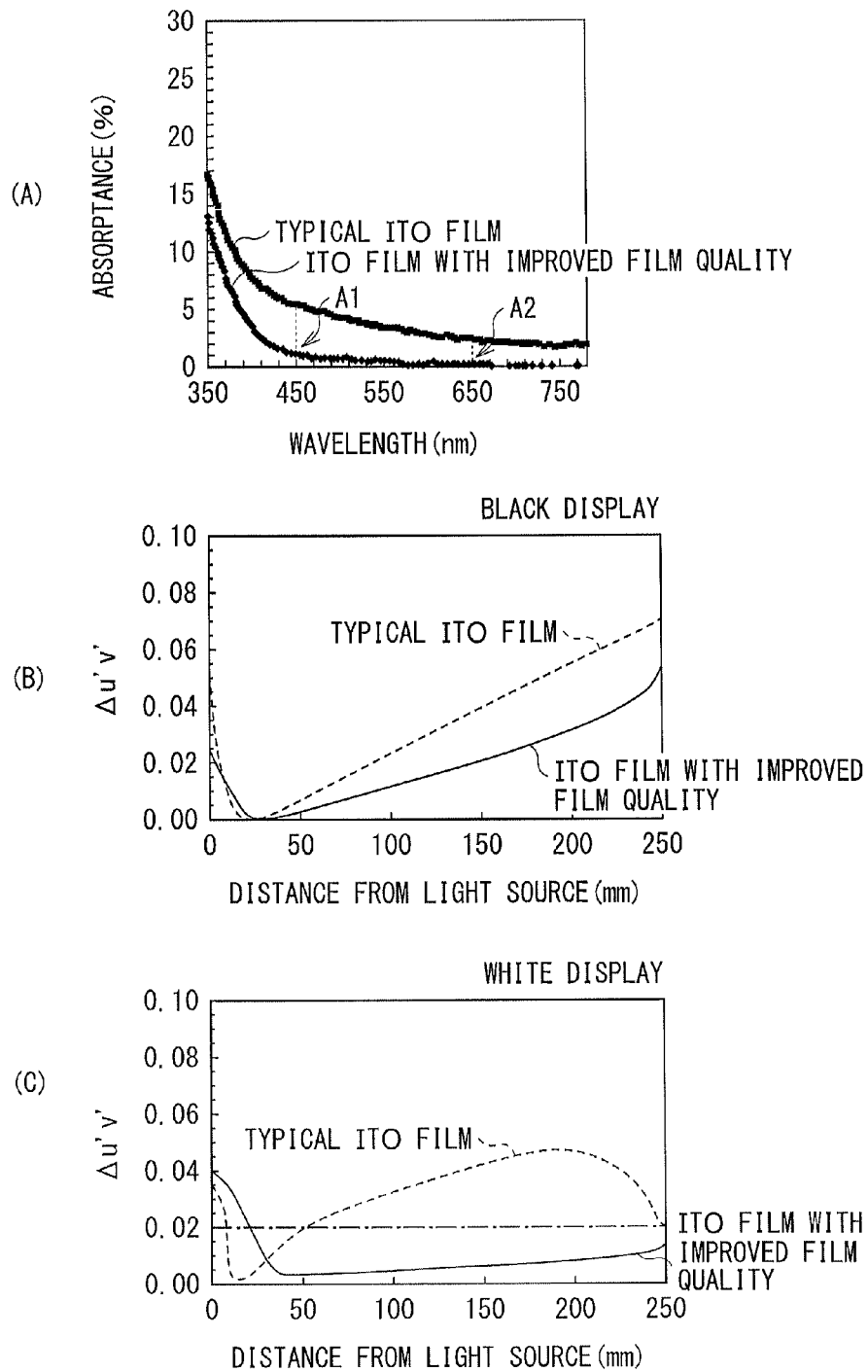
FIGS. 10A through 10C is a diagram illustrating an example of optical properties of an ITO film and positional dependence of chromaticity change in the illumination unit.

The lower electrode 32 and the upper electrode 36 are both configured of transparent conductive films. The transparent conductive films may preferably have, for example, a property represented by a following expression (refer to FIG. 10(A)). The transparent conductive films may be configured of, for example, films including ITO (hereinafter referred to as "ITO films"). It is to be noted that the lower electrode 32 and the upper electrode 36 may be made of indium zinc oxide (IZO), a metal nanowire, a carbon nanotube, graphene, or the like.

$|A1-A2| \leq 2.00$ where A1 is maximum light absorptance (%) within a range of 450 nm to 650 nm, and A2 is minimum light absorptance (%) within a range of 450 nm to 650 nm Since visible light is used as illumination light, a difference in light absorption of the transparent conductive film may be preferably small in a range of 380 to 780 nm. A difference between a maximum value and a minimum value of light absorbance in a range from 380 nm to 780 nm may be preferably 10.00 or less, and more preferably 7.00 or less. In particular, in a case where the transparent conductive film is applied to a backlight or the like, a difference between a maximum value and a minimum value of light absorbance in a wavelength region of a light source that is to be used may be preferably 2.00 or less, and more preferably 1.00 or less. In a case where a typical LED is used as a light source or the like, a difference between a maximum value and a minimum value of light absorbance in a range from 450 nm to 650 nm may be preferably 2.00 or less, and more preferably 1.00 or less. It is to be noted that absorptance was measured with use of V-550 manufactured by JASCO Corporation, and reflectivity and transmittance of light incident at 5° from a direction of a normal to a substrate were measured, and a value obtained by subtracting values of the reflectivity and the transmittance from 100% was determined as absorptance.

Figure 11:
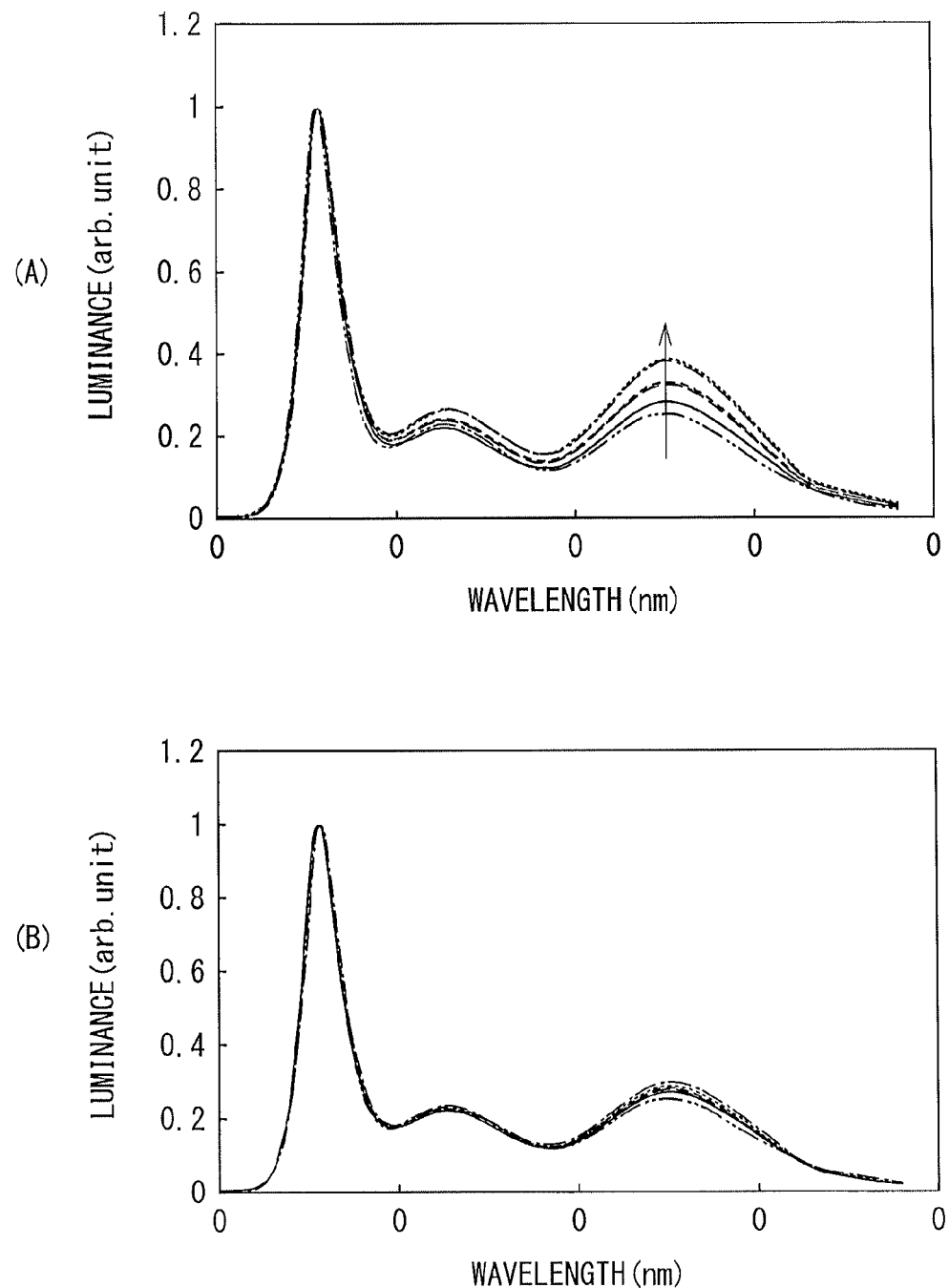
FIGS. 11A and 11B is a diagram illustrating an example of positional dependence of guided light spectrum.

In a case where the transparent conductive film has the property represented by the above-described expression in such a manner, when light emitted from the light source 20 repeatedly passes through the transparent conductive film in the light modulation device 30 while propagating through the light guide plate 10, wavelength dependence of absorption in the transparent conductive film is suppressed. In a case where the transparent conductive film is made of a typical ITO film, for example, as illustrated in broken lines in FIGS. 10(B) and (C) and an arrow in FIG. 11(A), a long-wavelength-side component is increased with an increase in a distance from the light source 20. On the other hand, in a case where the transparent conductive film is made of an ITO film that has the property represented by the above-described expression, i.e., having improved film quality, as illustrated by solid lines in FIGS. 10(B) and (C) and FIG. 11(B), a rate of change in the long-wavelength-side component with distance from the light source 20 is reduced. It is to be noted that Δu'v' on a vertical axis in each of FIGS. 10(B) and (C) is a barometer indicating that the long-wavelength-side component is increased with an increase in the value of Δu'v'.

Moreover, for example, in a case where the lower electrode 32 and the upper electrode 36 are configured of ITO films, a dye or a pigment absorbing light on a long wavelength side more than light on a short wavelength side may be preferably included in some part (for example, one or both of the light guide plate 10 and the light modulation device 30) of an optical path guiding light. As the above-described dye or pigment, a known material is allowed to be used. In particular, in a case where a process of applying ultraviolet light is included in formation of the light modulation layer 34, for example, after the light modulation device 30 is formed, the light guide plate 10 including the dye or the pigment and the light modulation device 30 may be preferably bonded together, or a part including the dye or the pigment may be preferably protected from ultraviolet light by an ultraviolet absorption layer to prevent damage caused by ultraviolet light. When light emitted from the light source 20 repeatedly passes through the light modulation device 30 while propagating through the light guide plate 10, wavelength dependence of absorption of the light modulation device 30 including an ITO film is suppressed by adding the above-described dye or pigment to some part in the optical path guiding light in this manner.

Portions in positions, where the lower electrode 32 and the upper electrode 36 face each other when the lower electrode 32 and the upper electrode 36 are viewed from a direction of a normal to the light modulation device 30, of the light modulation device 30 configure light modulation cells 30-1 (refer to FIGS. 2 and 5).

The light modulation cells 30-1 correspond to portions in positions, where the sub-electrodes 32A and the upper electrode 36 face each other, of the light modulation device 30. When three-dimensional display is performed on the display unit, cells 30a (refer to FIGS. 2 to 9) each including the sub-electrode 32B selected from a plurality of light modulation cells 30-1 are used to generate linear illumination light. When two-dimensional display is performed on the display unit, cells 30b (refer to FIGS. 2 to 9) each including the sub-electrode 32C selected from the plurality of light modulation cells 30-1 are used together with a plurality of cells 30a to generate planar illumination light. In other words, when two-dimensional display is performed on the display unit, all of the light modulation cells 30-1 are used to generate planar illumination light.

The light modulation cells 30-1 are allowed to be separately and independently driven by applying a predetermined voltage to the sub-electrode 32A and the upper electrode 36, and exhibit transparency or a scattering property with respect to light from the light source 20, depending on magnitude of a voltage value applied to the sub-electrode 32A and the upper electrode 36. It is to be noted that transparency and the scattering property will be described in more detail when the light modulation layer 34 is described.

The alignment films 33 and 35 are configured to align, for example, a liquid crystal or a monomer used in the light modulation layer 34. Kinds of alignment films may include, for example, a vertical alignment film and a horizontal alignment film, and in this embodiment, horizontal alignment films are used as the alignment films 33 and 35. Examples of the horizontal alignment films may include an alignment film formed by performing a rubbing treatment on polyimide, polyamide imide, polyvinyl alcohol, or the like, and an alignment film provided with a groove by transfer, etching, or the like. Other examples of the horizontal alignment films may include an alignment film formed by obliquely evaporating an inorganic material such as silicon oxide, a diamond-like carbon alignment film formed by ion beam irradiation, and an alignment film provided with an electrode pattern slit. In a case where plastic films are used as the transparent substrates 31 and 37, in a manufacturing process, polyamide imide capable of forming a film at a temperature of 100° C. or less may be preferably used for the alignment films 33 and 35, because a firing temperature after coating surfaces of the transparent substrates 31 and 37 with the alignment films 33 and 35 is preferably as low as possible.

Moreover, it is only necessary for both vertical and horizontal alignment films to have a function of aligning a liquid crystal and a monomer, and reliability, that is necessary for a typical liquid crystal display, with respect to repeated voltage application is not necessary, because reliability with respect to voltage application after forming a device is determined by an interface between a resultant formed by polymerizing a monomer, and a liquid crystal. Moreover, even if the alignment film is not used, for example, when an electric field or a magnetic field is applied between the lower electrode 32 and the upper electrode 36, a liquid crystal or a monomer used in the light modulation layer 34 is allowed to be aligned. In other words, while an electric field or a magnetic field is applied between the lower electrode 32 and the upper electrode 36, the alignment state of the liquid crystal or the monomer under voltage application is allowed to be fixed by ultraviolet irradiation. In a case where a voltage is used to form the alignment film, an electrode for alignment and an electrode for drive may be separately formed, or as a liquid crystal material, a dual-frequency liquid crystal allowing the sign of dielectric constant anisotropy to be inverted by a frequency may be used. Moreover, in a case where a magnetic field is used to form the alignment film, for the alignment film, a material with large magnetic susceptibility anisotropy may be preferably used, and, for example, a material with a large number of benzene rings may be preferably used.

The light modulation layer 34 exhibits a scattering property or transparency with respect to light from the light source 20, depending on magnitude of an electric field. When the electric field is relatively small, the light modulation layer 34 exhibits transparency with respect to light from the light source 20, and when the electric field is relatively large, the light modulation layer 34 exhibits the scattering property with respect to the light from the light source 20. For example, as illustrated in FIG. 2, the light modulation layer 34 is a composite layer including a bulk 34A and a plurality of microparticles 34B dispersed in the bulk 34A. The bulk 34A and the microparticles 34B have optical anisotropy.

Figure 12:
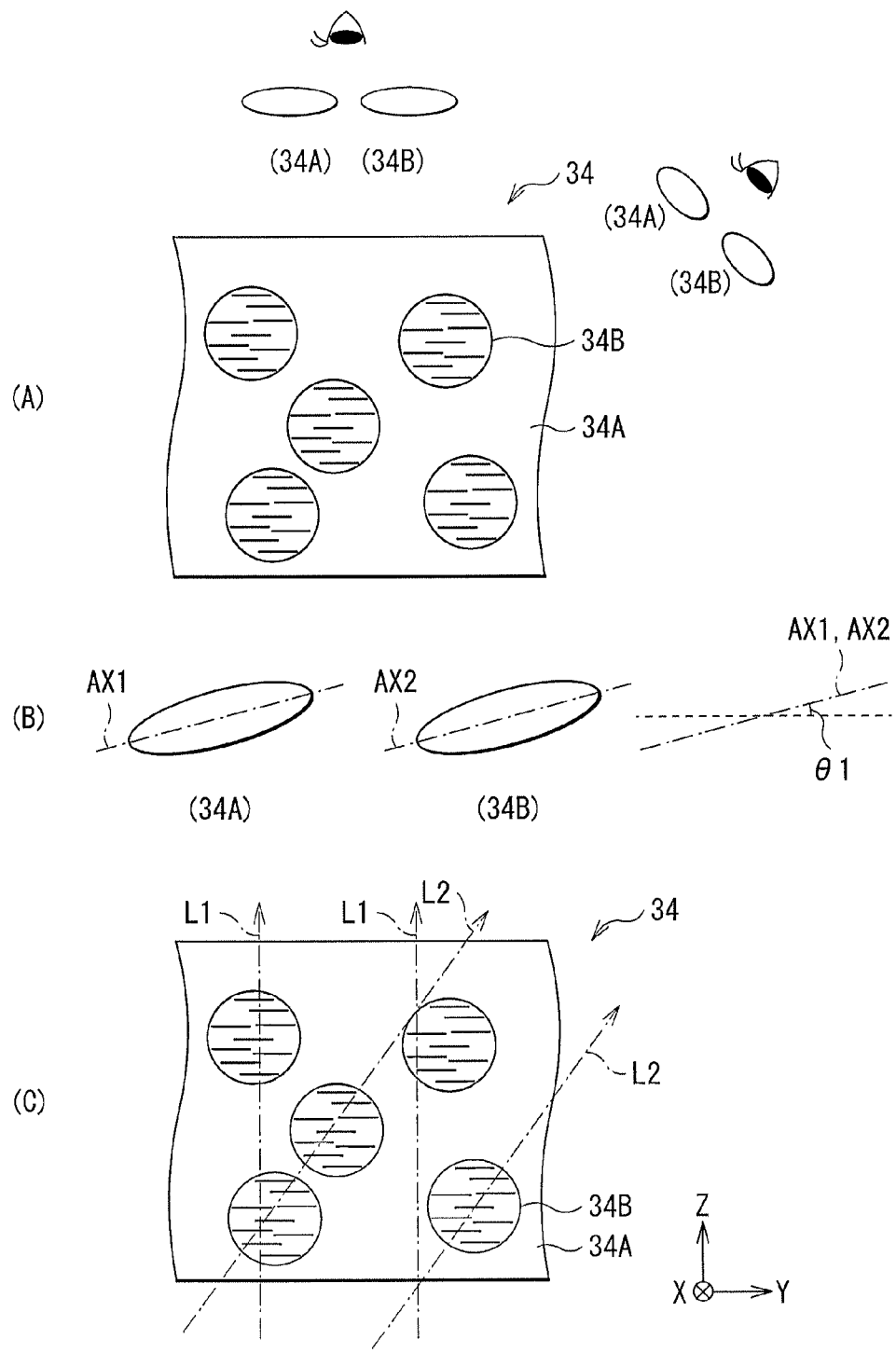
FIGS. 12A through 12C is a schematic view for describing an example of a function of a light modulation layer in FIG. 2.

FIG. 12(A) schematically illustrates an example of an alignment state in the microparticles 34B when a voltage is not applied between the lower electrode 32 and the upper electrode 36. It is to be noted that, in FIG. 12(A), an alignment state in the bulk 34A is not illustrated. FIG. 12(B) illustrates an example of refractive index ellipsoids exhibiting refractive index anisotropy of the bulk 34A and the microparticle 34B when a voltage is not applied between the lower electrode 32 and the upper electrode 36. The refractive index ellipsoid is a tensor ellipsoid representing a refractive index of linearly polarized light incident from various directions, and when a section of an ellipsoid from a light incident direction is observed, the refractive index is allowed to be geometrically learned. FIG. 12(C) schematically illustrates an example of a state where light L1 toward a front direction and light L2 toward an oblique direction pass through the light modulation layer 34 when a voltage is not applied between the lower electrode 32 and the upper electrode 36.

Figure 13:
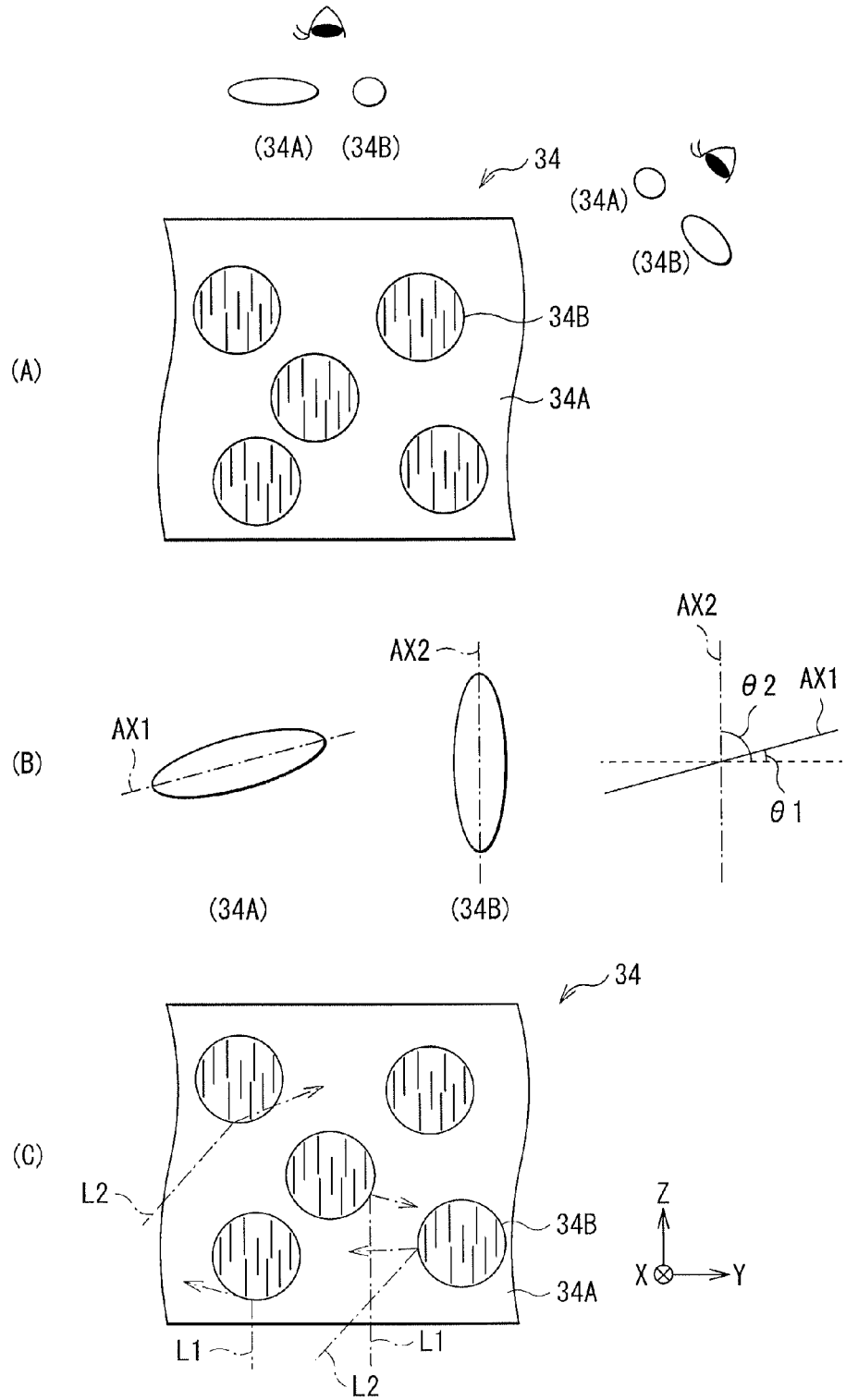
FIGS. 13A through 13C is a schematic view for describing another example of the function of the light modulation layer in FIG. 2.

FIG. 13(A) schematically illustrates an example of an alignment state in the microparticles 34B in a case where a voltage is applied between the lower electrode 32 and the upper electrode 36. It is to be noted that, in FIG. 13(A), an alignment state in the bulk 34A is not illustrated. FIG. 13(B) illustrates an example of refractive index ellipsoids exhibiting refractive index anisotropy of the bulk 34A and the microparticle 34B when a voltage is applied between the lower electrode 32 and the upper electrode 36. FIG. 13(C) schematically illustrates an example of a state where the light L1 toward the front direction and the light L2 toward the oblique direction are scattered by the light modulation layer 34 when a voltage is applied between the lower electrode 32 and the upper electrode 36.

For example, as illustrated in FIGS. 12(A) and (B), the bulk 34A and the microparticle 34B are structured to allow the direction of an optical axis AX1 of the bulk 34A and the direction of an optical axis AX2 of the microparticle 34B to coincide with (be parallel to) each other when a voltage is not applied between the lower electrode 32 and the upper electrode 36. It is to be noted that the optical axes AX1 and AX2 each indicate a line parallel to a travel direction of a light beam allowing a refractive index to have one value irrespective of polarization direction. Moreover, it is not necessary for the directions of the optical axis AX1 and the optical axis AX2 to consistently coincide with each other, and the directions of the optical axis AX1 and the optical axis AX2 may be slightly deviated from each other due to, for example, a manufacturing error.

Moreover, for example, the microparticle 34B is structured to allow the optical axis AX2 thereof to be parallel to the light incident surface 10A of the light guide plate 10 when a voltage is not applied between the lower electrode 32 and the upper electrode 36. Further, for example, the microparticle 34B is structured to allow the optical axis AX2 thereof to intersect with surfaces of the transparent substrates 31 and 37 at a slight angle θ1 (refer to FIG. 12(B)) when a voltage is not applied between the lower electrode 32 and the upper electrode 36. It is to be noted that the angle θ1 will be described in more detail when a material forming the microparticle 34B is described.

On the other hand, for example, the bulk 34A is structured to have a fixed optical axis AX1 irrespective of whether or not a voltage is applied between the lower electrode 32 and the upper electrode 36. More specifically, for example, as illustrated in FIGS. 12(A) and (B), and FIGS. 13(A) and (B), the bulk 34A is structured to have the optical axis AX1 parallel to the light incident surface 10A of the light guide plate 10 as well as intersecting with the surfaces of the transparent substrates 31 and 37 at the predetermined angle θ1. In other words, when a voltage is not applied between the lower electrode 32 and the upper electrode 36, the optical axis AX1 of the bulk 34A is parallel to the optical axis AX2 of the microparticle 34B.

It is to be noted that it is not necessary for the optical axis AX2 to be consistently parallel to the light incident surface 10A as well as to consistently intersect with the surfaces of the transparent substrates 31 and 37 at the angle θ1, and the optical axis AX2 may intersect with the surfaces of the transparent substrates 31 and 37 at an angle slightly different from the angle θ1 due to, for example, a manufacturing error. Moreover, it is not necessary for the optical axes AX1 and AX2 to be consistently parallel to the light incident surface 10A, and the optical axes AX1 and AX2 may intersect with the light incident surface 10A at a small angle due to, for example, a manufacturing error.

In this case, ordinary refractive indices of the bulk 34A and the microparticle 34B may be preferably equal to each other, and extraordinary refractive indices of the bulk 34A and the microparticle 34B may be preferably equal to each other. In this case, for example, when a voltage is not applied between the lower electrode 32 and the upper electrode 36, as illustrated in FIG. 12(A), there is little difference in refractive index in all directions including the front direction and the oblique direction, and high transparency is obtained. Therefore, for example, as illustrated in FIG. 12(C), the light L1 toward the front direction and the light L2 toward the oblique direction pass through the light modulation layer 34 without being scattered in the light modulation layer 34. As a result, for example, as illustrated in FIGS. 14(A) and (B), light L from the light source 20 (light from an oblique direction) is totally reflected by interfaces (a bottom surface of the transparent substrate 31 and a top surface of the light guide plate 10) of a transparent region (a transmission region 30A) of the light modulation layer 34, and luminance (luminance in black display) in the transmission region 30A is decreased, compared to a case where light is uniformly emitted from an entire surface (indicated by an alternate long and short dash line in FIG. 14(B)). It is to be noted that a profile of front luminance in FIG. 14(B) is obtained by arranging a diffusion sheet (not illustrated) on the light guide plate 10, and measuring the front luminance through the diffusion sheet.

It is to be noted that, when the illumination unit 1 is used as a backlight of the display unit, the top surface (the light exit surface 1A in FIG. 14) of the light guide plate 10 as one interface of the transmission region 30A may be preferably in contact with a material with a lower refractive index than that of the top surface of the light guide plate 10. Such a low-refractive-index material is typically air. It is to be noted that, in a case where the top surface of the light guide plate 10 is bonded to another optical member (for example, a display panel) in the display unit when the illumination unit 1 is used as the backlight of the display unit, the low-refractive-index material in contact with the top surface of the light guide plate 10 may be a glue or an adhesive.

For example, when a voltage is applied between the lower electrode 32 and the upper electrode 36, as illustrated in FIGS. 13(A) and (B), the bulk 34A and the microparticle 34B are structured to allow the directions of the optical axis AX1 and the optical axis AX2 to be different from (intersect with or be substantially orthogonal to) each other. Moreover, for example, when a voltage is applied between the lower electrode 32 and the upper electrode 36, the microparticle 34B is structured to allow the optical axis AX2 thereof to be parallel to the light incident surface 10A of the light guide plate 10 as well as to intersect with the surfaces of the transparent substrates 31 and 37 at an angle θ2 (for example, 90°) larger than the angle θ1. It is to be noted that the angle θ2 will be described in more detail when the material forming the microparticles 34B is described.

Therefore, when a voltage is applied between the lower electrode 32 and the upper electrode 36, in the light modulation layer 34, a difference in refractive index in all directions including the front direction and the oblique direction is increased to obtain a high scattering property. For example, as illustrated in FIG. 13(C), the light L1 toward the front direction and the light L2 toward the oblique direction are thereby scattered in the light modulation layer 34. As a result, for example, as illustrated in FIG. 14(A), the light L from the light source 20 (light from the oblique direction) passes through an interface (an interface between the transparent substrate 31 or the light guide plate 10 and the air) of a scattering region 30B, and light having passed toward the reflective plate 40 is reflected by the reflective plate 40 to pass through the light modulation device 30. Therefore, the luminance of the scattering region 30B is extremely higher than that in a case where light is uniformly emitted from the entire surface (indicated by the alternate long and short dash line in FIG. 14(B)), and luminance in white display is partially increased (partial luminance enhancement) by a reduced amount of the luminance of the transparent region 30A. It is to be noted that the scattering region 30B corresponds to a specific example of "first region" in the present technology.

It is to be noted that the ordinary refractive indices of the bulk 34A and the microparticle 34B may be slightly different from each other due to, for example, a manufacturing error, and may be preferably, for example, 0.1 or less, and more preferably 0.05 or less. Moreover, the extraordinary refractive indices of the bulk 34A and the microparticle 34B may be slightly different from each other due to, for example, a manufacturing error, and may be preferably, for example, 0.1 or less, and more preferably 0.05 or less.

Moreover, a refractive index difference in the bulk 34A ($\Delta n_P$=extraordinary refractive index $ne_P$–ordinary refractive index $no_P$) and a refractive index difference in the microparticle 34B ($\Delta n_L$=extraordinary refractive index $ne_L$–ordinary refractive index $no_L$) may be preferably as large as possible, and may be preferably 0.05 or over, more preferably 0.1 or over, and still more preferably 0.15 or over. In a case where the refractive index differences in the bulk 34A and the microparticle 34B are large, scattering power of the light modulation layer 34 is enhanced to allow light guide conditions to be easily disrupted, thereby allowing light from the light guide plate 10 to be easily extracted.

Figure 15:
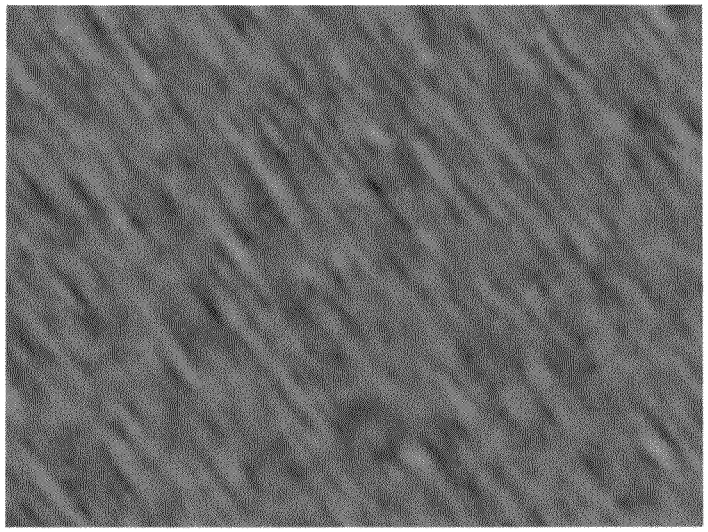
FIGS. 15A and 15B is a diagram illustrating an example of a streaky structure in a bulk in FIG. 2.
Figure 15:
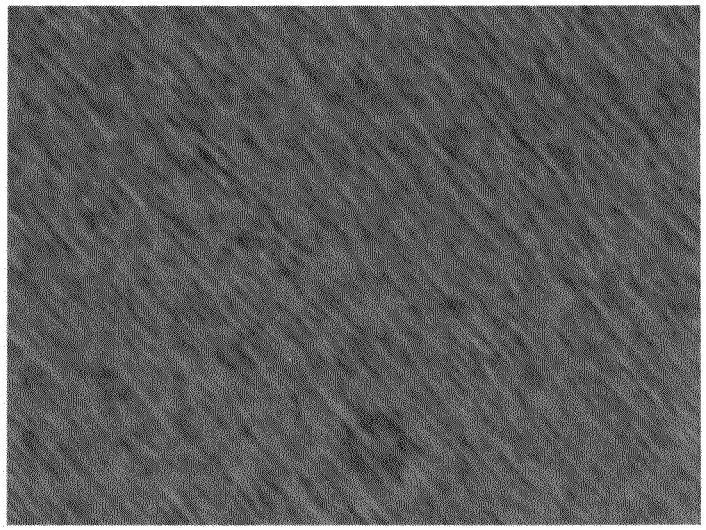

Further, the bulk 34A and the microparticle 34B have different response speeds with respect to an electric field. The bulk 34A may have, for example, a streaky structure (refer to FIGS. 15(A) and (B)), a porous structure, or a rod-like structure having a response speed slower than that of the microparticle 34B. It is to be noted that FIGS. 15(A) and (B) are polarizing micrographs in a case where an electric field is applied to the light modulation device 30, and bright streaky parts in FIGS. 15(A) and (B) correspond to the above-described streaky structure. FIG. 15(A) illustrates a state of the streaky structure of the bulk 34A in a case where the weight ratio of a liquid crystal to a monomer is 95:5, and FIG. 15(B) illustrates a state of the streaky structure of the bulk 34A in a case where the weight ratio of the liquid crystal to the monomer is 90:10. The bulk 34A may be formed of, for example, a polymer material obtained by polymerizing a low-molecular monomer. The bulk 34A is formed, for example, by polymerizing, by one or both of heat and light, a material (for example, a monomer) with orientation and polymerization that is aligned along the alignment direction of the microparticles 34B or the alignment directions of the alignment films 33 and 35.

For example, the streaky structure, the porous structure or the rod-like structure of the bulk 34A has a major axis in a direction parallel to the light incident surface 10A of the light guide plate 10 as well as intersecting with the surfaces of the transparent substrates 31 and 37 at the slight angle θ1. In a case where the bulk 34A has the streaky structure, an average streaky texture size in a minor-axis direction may be preferably within a range of 0.1 μm to 10 μm both inclusive to enhance a scattering property of guided light, and more preferably within a range of 0.2 μm to 2.0 μm both inclusive. In a case where the average streaky texture size in the minor-axis direction is within a range of 0.1 μm to 10 μm both inclusive, scattering power in the light modulation device 30 is substantially equal in a visible region of 380 to 780 nm. Therefore, in a plane, only light of a specific wavelength component is not increased or decreased; therefore, balance in a visible region is achievable in the plane. In a case where the average streaky texture size in the minor-axis direction is smaller than 0.1 μm or exceeds 10 μm, the scattering power of the light modulation device 30 is low irrespective of wavelength, and it is difficult for the light modulation device 30 to function as a light modulation device.

Moreover, to reduce wavelength dependence of scattering, the average streaky texture size in the minor-axis direction may be preferably within a range of 0.5 μm to 5 μm both inclusive, and more preferably within a range of 1 μm to 3 μm. In such a case, when light emitted from the light source 20 repeatedly passes through the bulk 34A in the light modulation device 30 while propagating through the light guide plate 10, wavelength dependence of scattering in the bulk 34A is suppressed. The streaky texture size is allowed to be observed by a polarizing microscope, a confocal microscope, an electron microscope, or the like.

On the other hand, the microparticles 34B may mainly include, for example, a liquid crystal material, and have a response speed sufficiently higher than that of the bulk 34A. Examples of the liquid crystal material (liquid crystal molecules) included in the microparticles 34B may include rod-like molecules. As liquid crystal molecules included in the microparticles 34B, liquid crystal molecules having positive dielectric constant anisotropy (a so-called positive type liquid crystal) may be preferably used.

In this case, when a voltage is not applied between the lower electrode 32 and the upper electrode 36, the major-axis directions of the liquid crystal molecules in the microparticles 34B are parallel to the optical axis AX1. At this time, the major axes of the liquid crystal molecules in the microparticles 34B are parallel to the light incident surface 10A of the light guide plate 10, as well as intersect with the surfaces of the transparent substrates 31 and 37 at the slight angle θ1. In other words, when a voltage is not applied between the lower electrode 32 and the upper electrode 36, the liquid crystal molecules in the microparticles 34B are aligned to be tilted at the angle θ1 in a plane parallel to the light incident surface 10A of the light guide plate 10. The angle θ1 is called a pretilt angle, and may be, for example, preferably within a range of 0.1° to 30° both inclusive. The angle θ1 may be more preferably within a range of 0.5° to 10° both inclusive, and still more preferably within a range of 0.7° to 2° both inclusive. When the angle θ1 is increased, scattering efficiency tends to be reduced due to the following reason. Moreover, when the angle θ1 is too small, the angle of a direction where the liquid crystal rises under voltage application varies. For example, the liquid crystal may rise in a 180°-different direction (reverse tilt). Therefore, refractive index differences in the microparticles 34B and the bulk 34A are not allowed to be effectively used; therefore, scattering efficiency tends to be reduced, and luminance tends to be reduced.

Further, when a voltage is applied between the lower electrode 32 and the upper electrode 36, in the microparticles 34B, the major-axis directions of the liquid crystal molecules intersect with (or is orthogonal) to the optical axis AX1. At this time, the major axes of the liquid crystal molecules in the microparticles 34B are parallel to the light incident surface 10A of the light guide plate 10, as well as intersect with the surfaces of the transparent substrates 31 and 37 at the angle θ2 (for example, 90°) which is larger than the angle θ1. In other words, when a voltage is applied between the lower electrode 32 and the upper electrode 36, the liquid crystal molecules in the microparticles 34B are aligned to be tilted at the angle θ2 in a plane parallel to the light incident surface 10A of the light guide plate 10 or to rise upright at the angle θ2)(=90°.

The above-described monomer having orientation and polymerization may be a material having optical anisotropy and forming a composite material with a liquid crystal; however, a low-molecular monomer that is cured with ultraviolet light may be preferable in this embodiment. In a state where no voltage is applied, directions of optical anisotropy of the liquid crystal and a resultant (a polymer material) formed by polymerizing a low-molecular monomer may preferably coincide with each other; therefore, before curing the low-molecular monomer with ultraviolet light, the liquid crystal and the low-molecular monomer may be preferably aligned in a same direction. In a case where a liquid crystal is used as the microparticles 34B, when the liquid crystal includes rod-like molecules, the used monomer material may preferably have a rod-like shape. As described above, a material having both of polymerization and liquid crystal properties may be preferably used as the monomer material, and, for example, the monomer material may preferably include one or more functional groups selected from a group configured of an acrylate group, a methacrylate group, an acryloyloxy group, a methacryloyloxy group, a vinyl ether group, and an epoxy group as polymerizable functional groups. These functional groups are allowed to be polymerized by ultraviolet, infrared, or electron irradiation, or by heating. To suppress a reduction in the degree of alignment under ultraviolet irradiation, a liquid crystal material having a polyfuncitonal group may be added. In a case where the bulk 34A has the above-described streaky structure, as the material of the bulk 34A, a bifunctional liquid crystal monomer may be preferably used. Moreover, a monofunctional monomer may be added to the material of the bulk 34A to adjust a temperature at which liquid crystal properties are exhibited, or a tri- or more-functional monomer may be added to the material of the bulk 34A to improve crosslink density.

For example, the drive circuit 50 is configured to control the magnitude of a voltage applied to a pair of electrodes (the sub-electrode 32A and the upper electrode 36) of each of the light modulation cells 30-1 to allow the optical axes AX2 of the microparticles 34B in one light modulation cell 30-1 to be parallel or substantially parallel to the optical axis AX1 of the bulk 34A, as well as to allow the optical axes AX2 of the microparticles 34B in another light modulation cell 30-2 to intersect with or be orthogonal to the optical axis AX1 of the bulk 34A. In other words, the drive circuit 50 allows, by electric field control, the direction of the optical axis AX1 of the bulk 34A and the directions of the optical axes AX2 of the microparticles 34B to coincide with (or substantially coincide with) each other or to be different from (or orthogonal to) each other.

When the drive circuit 50 receives a signal specifying three-dimensional display as a control signal 20A, the drive circuit 50 allows the light modulation device 30 to emit a plurality of linear illumination light beams. More specifically, the drive circuit 50 applies, to the plurality of specific sub-electrodes 32B selected from the plurality of sub-electrodes 32A, a voltage allowing the light modulation layer 34 to exhibit the scattering property, and applies, to the plurality of sub-electrodes 32C except for the plurality of sub-electrodes 32B selected from the plurality of sub-electrode 32A, a voltage allowing the light modulation layer 34 to exhibit transparency. In other words, the drive circuit 50 controls the magnitude of a voltage applied to a pair of electrodes (the sub-electrode 32A and the upper electrode 36) of each of the light modulation cells 30-1 to allow the optical axes AX2 of the microparticles 34B in each cell 30a in the light modulation device 30 to intersect with the optical axis AX1 of the bulk 34A, as well as to allow the optical axes AX2 of the microparticles 34B in each cell 30b in the light modulation device 30 to be parallel to the optical axis AX1 of the bulk 34A. Therefore, the drive circuit 50 forms the scattering region 30B in each cell 30a including the sub-electrode 32B, and forms the transmission region 30A in each cell 30b including the sub-electrode 32C, thereby allowing the scattering region 30B to emit linear illumination light.

Moreover, when the drive circuit 50 receives a signal specifying two-dimensional display as the control signal 20A, the drive circuit 50 allows the light modulation device 30 to emit planar illumination light. More specifically, the drive circuit 50 applies, to each of the sub-electrodes 32A, a voltage allowing the light modulation layer 34 to exhibit the scattering property. In other words, the drive circuit 50 controls the magnitude of a voltage applied to a pair of electrodes (the sub-electrode 32A and the upper electrode 36) of each of the light modulation cells 30-1 to allow the optical axes AX2 of the microparticles 34B in all light modulation cells 30-1 included in the light modulation device 30 to intersect with or be orthogonal (or substantially orthogonal) to the optical axis AX1 of the bulk 34A. Therefore, the drive circuit 50 forms the scattering region 30B in each of the light modulation cells 30-1, thereby allowing the scattering region 30B to emit planar illumination light.

It is to be noted that, when the drive circuit 50 receives the signal specifying two-dimensional display as the control signal 20A as well as a signal associated with image data, the drive circuit 50 may allow the light modulation device 30 to emit planar illumination light having a luminance distribution based on the image data (for example, planar illumination light having a dark part in a plane). However, in such a case, the lower electrode 32 may preferably have a layout corresponding to pixels of the display panel. In a case where the lower electrode 32 has a layout corresponding to the pixels of the display, based on the image data, the drive circuit 50 applies a voltage allowing the light modulation layer 34 to exhibit the scattering property to some of the plurality of sub-electrodes 32A, and applies a voltage allowing the light modulation layer 34 to exhibit transparency to one or a plurality of sub-electrodes 32A to which the voltage allowing the light modulation layer 34 to exhibit the scattering property is not applied.

The reflective plate 40 is configured to return, to the light guide plate 10, light leaked from a back side of the light guide plate 10 through the light modulation device 30. The reflective plate 40 may have, for example, functions such as reflection, diffusion, and scattering. Therefore, the reflective plate 40 allows light emitted from the light source 20 to be efficiently used, and is also useful to improve front luminance. A surface with a fine shape of the reflective plate 40 may be preferably a mirror surface. In this case, light emitted from the light modulation layer 30 is allowed to be regularly reflected (specularly reflected), and is allowed to be efficiently reflected to a focal point C (which will be described later). The reflective plate 40 may be made of, for example, foamed PET (polyethylene terephthalate), a silver-evaporated film, a multilayer reflective film, or white PET. In a case where the reflective plate 40 has a regular reflection (specular reflection) function, the surface of the reflective plate 40 may be preferably a surface subjected to a process such as silver evaporation, aluminum evaporation, and multilayer reflection. In a case where a fine shape is provided to the reflective plate 40, the reflective plate 40 may be integrally formed by a technique such as hot-press molding or extrusion molding with use of a thermoplastic resin, or the reflective plate 40 may be formed by coating a base made of, for example, PET or the like with an energy-ray (for example, ultraviolet-ray)-curable resin, and then transferring a shape to the energy-ray-curable resin. Examples of the thermoplastic resin may include a polycarbonate resin, an acrylic resin such as PMMA (polymethylmethacrylate resin), a polyester resin such as polyethylene terephthalate, an amorphous copolymer polyester resin such as MS (a copolymer of methylmethacrylate and styrene), a polystyrene resin, and a polyvinyl chloride resin. Moreover, in a case where the shape is transferred to the energy-ray (for example, ultraviolet-ray)-curable resin, the base may be made of glass. In a case where alignment of the reflective plate 40 and the light modulation device 30 is important, the reflective plate 40 and the light guide plate 10, the transparent substrate 31, or the transparent substrate 37 may be preferably made of materials having same properties as each other, or may preferably have linear expansion coefficients close to each other. This is to prevent misalignment due to change in outside temperature, or heat.

Figure 16:
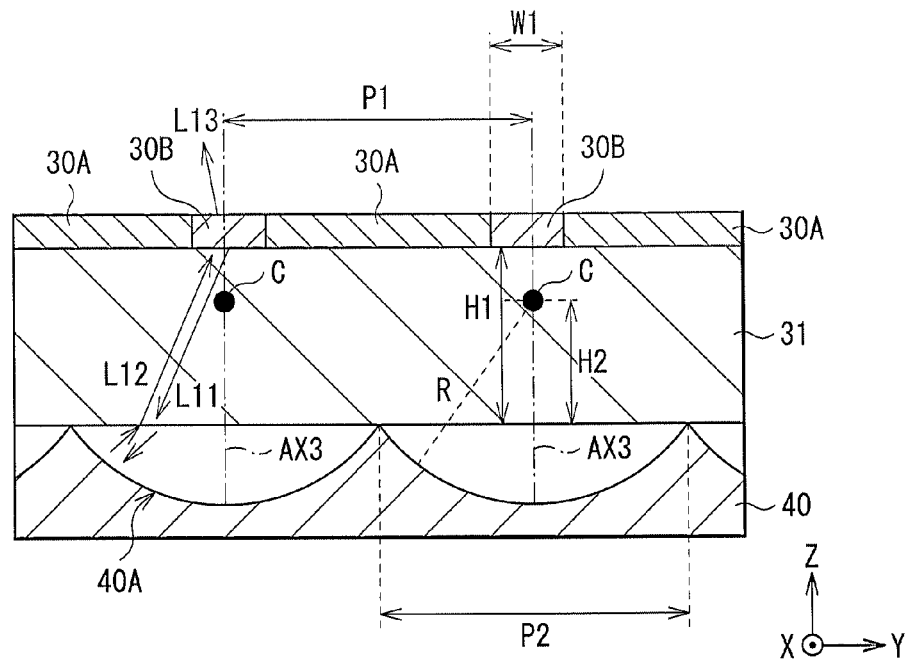
FIG. 16 is a sectional view illustrating an example of configurations of the light modulation layer and a reflective plate in FIG. 2.

For example, as illustrated in FIG. 16, the reflective plate 40 may be located at a position apart from a bottom surface of the light modulation layer 34 by a distance H1, and may have a reflective surface 40A on a side closer to the light modulation layer 34. The reflective surface 40A is configured to reflect, to the light exit surface 1A, a part of light emitted from the light source 20. More specifically, when three-dimensional display is performed on the display unit, the reflective plate 40 reflects linear illumination light generated in the scattering region 30B to generate reflected light focused on a focal point.

It is to be noted that, when three-dimensional display is performed on the display unit, the reflective plate 40 may reflect linear illumination light that is a group of a plurality of point-like illumination light beams generated in the scattering region 30B to generate reflected light focused on a focal point. Moreover, when two-dimensional display in which two-dimensional images different from each other are viewable from two perspectives is performed on the display unit, the reflective plate 40 may reflect point-like illumination light beams generated in the scattering region 30B to generate reflected light focused on a focal point.

The reflective plate 40 reflects reflected light to or close to a plane passing through a part (the scattering region 30B) that generates linear illumination light and being perpendicular to a plane including the reflective plate 40. More specifically, in a case where a light component parallel to a plane perpendicular to the part (the scattering region 30B) that generates linear illumination light of the linear illumination light is considered, the reflective plate 40 has a convex-concave shape generating reflected light focused on a focal point located on or near a line segment passing through the part (the scattering region 30B) that generates linear illumination light and being parallel to a normal to the plane including the reflective plate 40. Moreover, in a case where a light component intersecting with the plane perpendicular to the part (the scattering region 30B) that generates linear illumination light of the linear illumination light is considered, the reflective plate 40 has a convex-concave shape reflecting light from the linear illumination light to or near the part (the scattering region 30B) that generates linear illumination light. In this case, in a case where the reflective surface 40A is configured to reflect generated light to a part where the light is generated, for example, following expressions may be established. In other words, the reflective plate 40 has a two-dimensional recursive reflection property.

Vector V of light before reflection=(Vx, Vy, Vz)
Vector V of light after reflection=(Vx, −Vy, −Vz)

For example, as illustrated in FIG. 16, in a case where a light component parallel to the plane perpendicular to the part (the scattering region 30B) that generates linear illumination light is considered, the reflective plate 40 may have a convex-concave shape allowing reflected light to be focused on the focal point C located on or near a line segment AX3 directly below the scattering region 30B. It is to be noted that the line segment AX3 is a line segment passing through the part (the scattering region 30B) that generates linear illumination light and being parallel to the normal to the plane including the reflective plate 40. At this time, a distance H2 between the position of the focal point C and the top surface of the reflective plate 40 is shorter than the distance H1, and may be preferably equal to or longer than (H1/nr−W1) and shorter than H1. In this case, the top surface of the reflective plate 40 indicates a plane including a plurality of apexes formed on the top surface of the reflective plate 40. The term "W1" is a width of the part (the scattering region 30B) that generates linear illumination light. Moreover, the term "nr" is a relative refractive index (n1/n2). The term "n1" is a refractive index of a region between the top surface of the reflective plate 40 and the part (the scattering region 30B) that generates linear illumination light (in FIG. 16, the part may be the focal point C), and in this embodiment, the term "n1" is a refractive index of the transparent substrate 31. The term "n2" is a refractive index of a region between the reflective surface 40A and the top surface of the reflective plate 40. In a case where the region between the reflective surface 40A and the top surface of the reflective plate 40 is filled with atmospheric air, n2 is a refractive index (=1) of atmospheric air. Therefore, in a case where the region between the top surface of the reflective plate 40 and the part (the scattering region 30B) generates linear illumination light is filled with the transparent substrate 31, and the region between the reflective surface 40A and the top surface of the reflective plate 40 is filled with atmospheric air, the distance H2 may be preferably equal to or longer than (H1/n1−W1) and shorter than H1.

Figure 17:
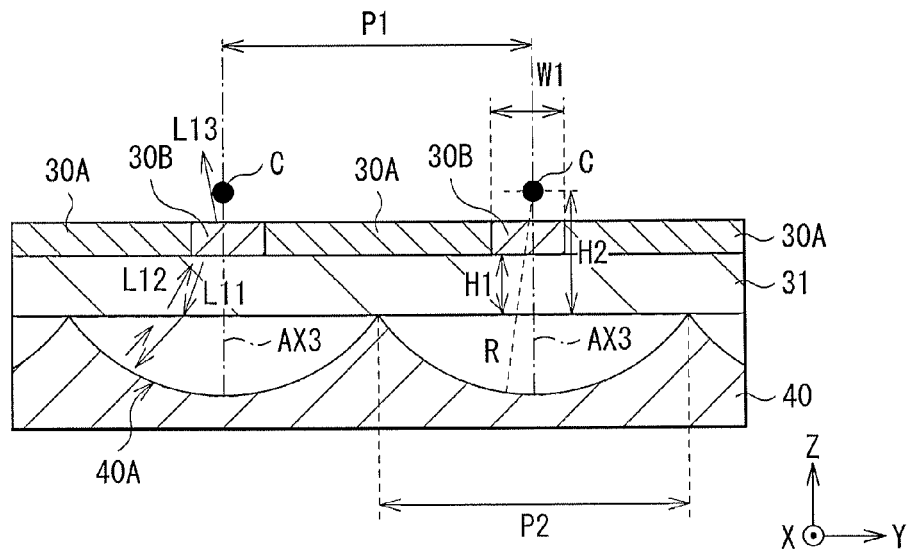
FIG. 17 is a sectional view illustrating a modification example of the configurations of the light modulation layer and the reflective plate in FIG. 2.
Figure 18:
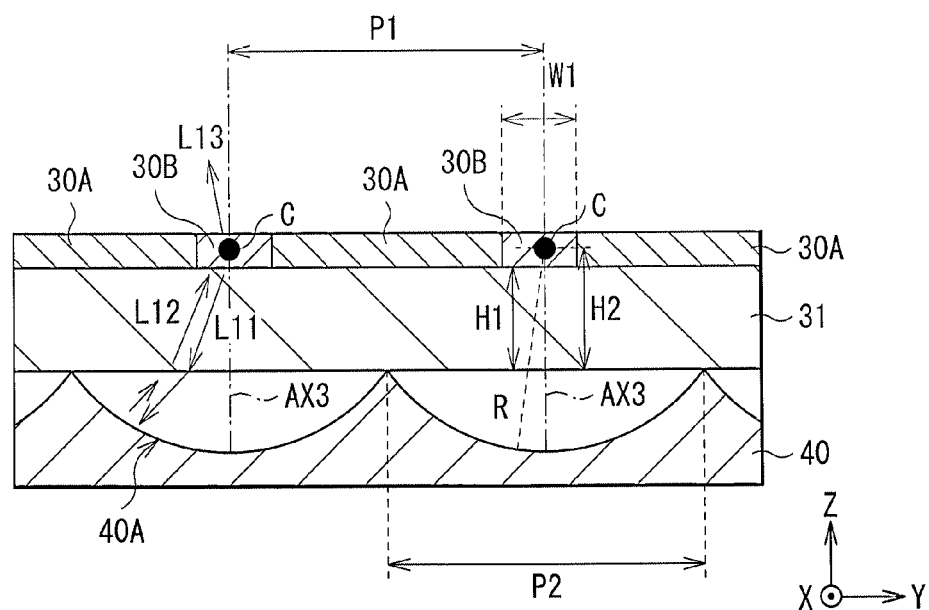
FIG. 18 is a sectional view illustrating another modification example of the configurations of the light modulation layer and the reflective plate in FIG. 2.

It is to be noted that, for example, as illustrated in FIG. 17, in a case where a light component parallel to the plane perpendicular to the part (the scattering region 30B) that generates linear illumination light is considered, the reflective plate 40 may have a convex-concave shape allowing reflected light to be focused on the focal point C located on or near the line segment AX3 directly above the scattering region 30B. At this time, the distance H2 is longer than the distance H1, and may be preferably longer than H1 and equal to or shorter than (H1/nr+W1). In this case, in a case where the region between the top surface of the reflective plate 40 and the part (the scattering region 30B) that generates linear illumination light is filled with the transparent substrate 31, and the region between the reflective surface 40A and the top surface of the reflective plate 40 is filled with atmospheric air, the distance H2 may be preferably longer than H1 and equal to or shorter than (H1/n1+W1). It is to be noted that, for example, as illustrated in FIG. 18, the reflective plate 40 may have a convex-concave shape allowing reflected light to be focused on the focal point C located on or near the line segment AX3 in the scattering region 30B. At this time, the distance H2 is substantially equal to the distance H1.

The reflective plate 40 includes, as the reflective surface 40A, a part of an inner surface of a cylinder with a central axis passing through the focal point C at a position facing the part (the scattering region 30B) that generates linear illumination light. A position facing the scattering region 30B of the reflective plate 40 may be preferably deepest.

When FIGS. 16, 17, and 18 are compared to one another, a position illustrated in FIG. 16 (directly below the scattering region 30B) may be most preferable as the position of the focal point C. At this time, the focal point C may be more preferably located at a position satisfying H2=H1/nr. In this case, in a case where the region between the top surface of the reflective plate 40 and the part (the scattering region 30B) that generates linear illumination light is filled with the transparent substrate 31 and the region between the reflective surface 40A and the top surface of the reflective plate 40 is filled with atmospheric air, the focal point C may be most preferably located at a position satisfying H2=H1/n1. A pitch P2 of a cubic shape in the reflective surface 40A of the reflective plate

40 may be most preferably equal or substantially equal to a pitch P1 of the scattering region 30B (the part that generates linear illumination light) in the light modulation layer 34. Moreover, in this case, a radius of a portion corresponding to the part of the inner surface of the cylinder of the reflective surface 40A may be most preferably $(H2^2+(P1/2)^2)^{1/2}$. In such a case, light reflected by the reflective surface 40A travels to the focal point C, and is refracted by a bottom surface of the transparent substrate 31 to recursively reach the scattering region 30B.

Figure 19:
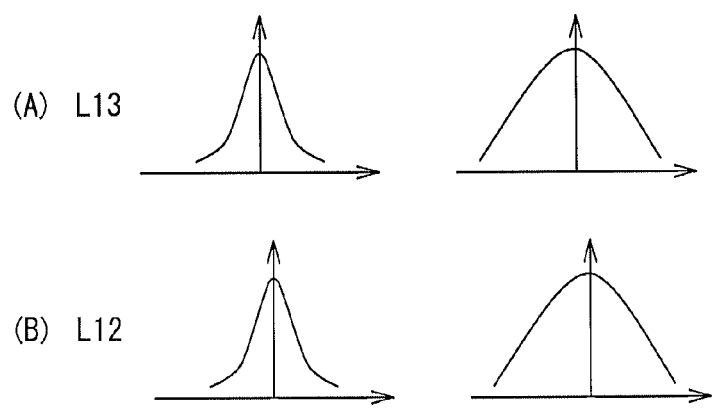
FIGS. 19A and 19B is a distribution chart illustrating an example of front luminance distributions and angle luminance distributions of light emitted from a light source directly to a top surface and light reflected by the reflective plate.

Next, a front luminance distribution and an angle luminance distribution of reflected light generated by the reflective plate 40 will be described below. FIG. 19(A) illustrates an example of a front luminance distribution and an angle luminance distribution of light L13 emitted to the light exit surface 1A of light emitted from the scattering region 30B of the light modulation layer 34. FIG. 19(B) illustrates an example of a front luminance distribution and an angle luminance distribution of light L12 emitted to a direction opposite to the light exit surface 1A and reflected by the reflective plate 40 of the light emitted from the scattering region 30B of the light modulation layer 34. FIGS. 19(A) and (B) illustrate results when a refractive index n of the transparent substrate 31=1.515, H1=700 μm, H2=462 μm (=H1/n), a distance (a radius R) between the focal point C and the reflective surface 40A=526 μm, P1=P2=504 μm, the width W1 of the part (the scattering region 30B) that generates linear illumination light=63 μm, and the focal point C is located directly below the scattering region 30B.

It is to be noted that graphs on the left in FIGS. 19(A) and (B) illustrate the front luminance distributions, and graphs on the right in FIGS. 19(A) and (B) illustrate the angle luminance distributions. The front luminance distribution indicates an in-plane luminance distribution of light emitted to a direction of a normal to the light modulation layer 34, and an origin point of a horizontal axis corresponds to directly above the scattering region 30B. The angle luminance distribution indicates an angle distribution of a luminance distribution of light scattered to the direction of the normal to the light modulation layer 34 of light having passed through an in-plane central point in the scattering region 30B, and an origin point of a horizontal axis corresponds to the direction of the normal to the light modulation layer 34.

As can be seen from FIGS. 19(A) and (B), the front luminance distribution and the angle luminance distribution of the light L12 are identical or substantially identical to the front luminance distribution and the angle luminance distribution of the light L13. In other words, the reflective plate 40 returns the light L13 to the scattering region 30B with little disturbance of the front luminance distribution and the angle luminance distribution of light emitted from the scattering region 30B to the light exit surface 1A. This means that there are not only an effect of allowing a rate at which reflected light enters the transparent region 30A of the light modulation layer 34 to be reduced but also an effect of not increasing light emitted to an unnecessary angle direction for three-dimensional display.

Figure 20:
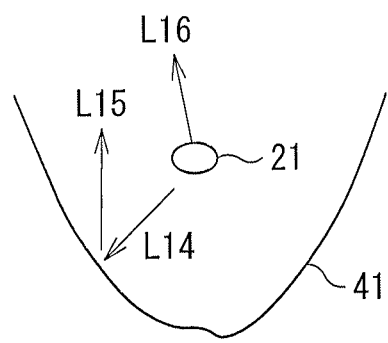
FIG. 20 is a schematic view illustrating an example of a configuration of a reflective plate according to a comparative example.
Figure 21:
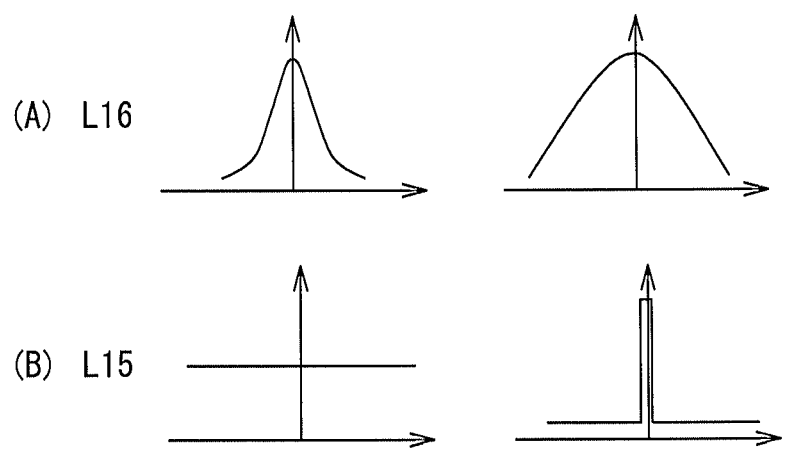
FIGS. 21A and 21B is a distribution chart illustrating an example of front luminance distributions and angle luminance distributions of light emitted from a light source directly to a top surface and light reflected by the reflective plate in FIG. 20.

FIG. 20 schematically illustrates a reflective plate 41 according to a comparative example together with the light source 21. The reflective plate 41 has a parabolic surface configured to reflect light from the light source 21 to generate parallel light. In FIG. 20, light directly emitted upward from the light source 21 is light L16, light emitted from the light source 21 to the reflective plate 41 is light L14, and light reflected by the reflective plate 41 of the light L14 is light L15. FIG. 21(A) illustrates an example of a front luminance distribution and an angle luminance distribution of the light L16. FIG. 21(B) illustrates an example of a front luminance distribution and an angle luminance distribution of the light L15. It is to be noted that graphs on the left in FIGS. 21(A) and (B) illustrate front luminance distributions and graphs on the right in FIGS. 21(A) and (B) illustrate angle luminance distributions.

As can be seen from FIGS. 21(A) and (B), the front luminance distribution and the angle luminance distribution of the light L15 are completely different from the front luminance distribution and the angle luminance distribution of the light L16. The front luminance distribution of the light L15 is substantially constant irrespective of position in a plane, and a significant percentage of the light L15 enters the transparent region 30A of the light modulation layer 34. Moreover, the angle luminance distribution of the light L15 is largely biased toward a front direction, and degradation in display quality in three-dimensional display is concerned.

Figure 22:
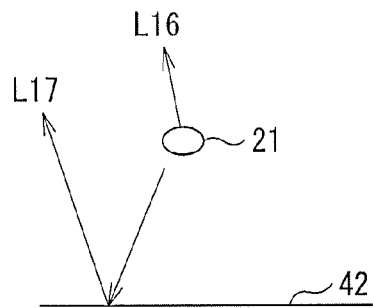
FIG. 22 is a schematic view illustrating an example of a configuration of a reflective plate according to another comparative example.
Figure 23:
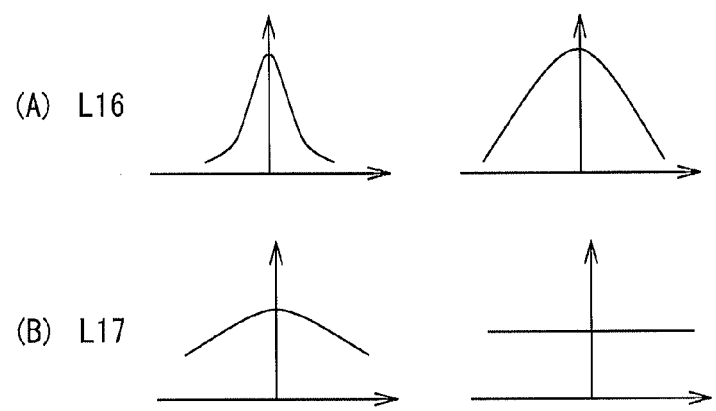
FIGS. 23A and 23B is a distribution chart illustrating an example of front luminance distributions and angle luminance distributions of light emitted from a light source directly to a top surface and light reflected by the reflective plate in FIG. 22.

FIG. 22 schematically illustrates a reflective plate 42 according to a comparative example together with the light source 21. The reflective plate 42 has a flat surface regularly reflecting light from the light source 21. In FIG. 22, light directly emitted upward from the light source 21 is the light L16, and light regularly reflected by the reflective plate 42 of light emitted from the light source 21 to the reflective plate 42 is light L17. FIG. 23(A) illustrates an example of a front luminance distribution and an angle luminance distribution of the light L16. FIG. 23(B) illustrates an example of a front luminance distribution and an angle luminance distribution of the light L17. It is to be noted that graphs on the left in FIGS. 23(A) and (B) illustrate front luminance distributions, and graphs on the right in FIGS. 23(A) and (B) illustrate angle luminance distributions.

As can be seen from FIGS. 23(A) and (B), the front luminance distribution and the angle luminance distribution of the light L17 are completely different from the front luminance distribution and the angle luminance distribution of the light L16. Although the front luminance distribution of the light L17 has a peak in the front direction, the front luminance distribution of the light L17 has a large component in a direction other than the front direction, and a significant percentage of the light L17 enters the transparent region 30A of the light modulation layer 34. Moreover, the angle luminance distribution of the light L17 is constant irrespective of angle, and degradation in display quality in three-dimensional display is concerned.

It is to be noted that, in this embodiment, the reflective plate 40 may be bonded to the transparent substrate 31. For bonding between the reflective plate 40 and the transparent substrate 31, entire bonding, outer-region bonding (bonding of a ring-shaped region other than a display region), or spot bonding (spot bonding of a region other than the display region) is considered. In a case where the reflective plate 40 and the transparent substrate 31 are entirely bonded together, it is considered that an apex portion of the reflective plate 40 is bonded to the transparent substrate 31. At this time, the apex portion of the reflective plate 40 may have a slightly flat surface.

Figure 24:
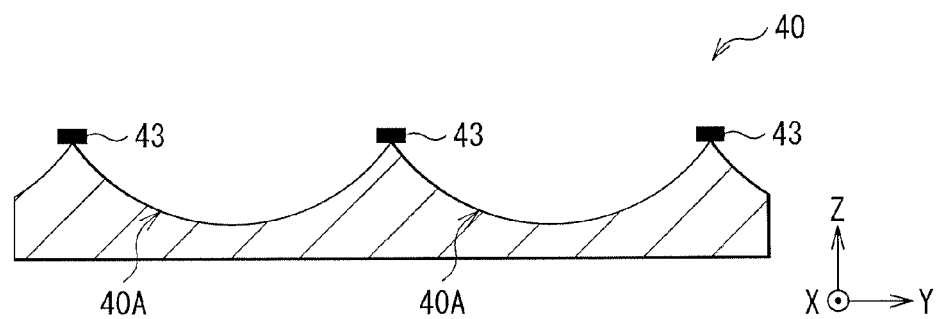
FIG. 24 is a sectional view illustrating another example of the configuration of the reflective plate in FIG. 1.

Moreover, in this embodiment, for example, as illustrated in FIG. 24, the reflective plate 40 may have a black 43 in a part in contact with the transparent substrate 31. The black 43 may be, for example, a mixture of an adhesive for fixing the reflective plate 40 to a back surface of the transparent substrate 31 with a black pigment.

A method of manufacturing the illumination unit 1 according to this embodiment will be described below referring to FIGS. 25(A) to (C) to FIGS. 27(A) to (C).

Figure 25:
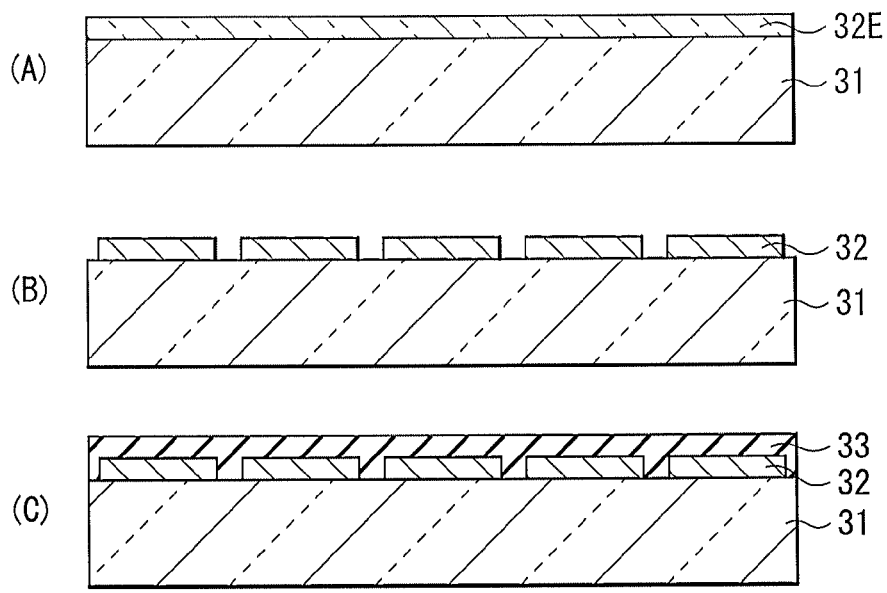
FIGS. 25A through 25C is a sectional view for describing processes of manufacturing the light modulation device in FIG. 2.

First, a transparent conductive film 32E made of ITO or the like is formed on the transparent substrate 31 configured of a glass substrate or a plastic film substrate (refer to FIG. 25(A)). Next, a resist layer is formed on an entire surface of the transparent conductive film 32E, and then an electrode pattern is formed on the resist layer by patterning. Then, the lower electrode 32 is formed by exposure and development, and the resist layer is removed (refer to FIG. 25(B)).

As a patterning method, for example, a photolithography method, a laser processing method, a pattern printing method, a screen printing method, or the like may be used. Moreover, for example, patterning may be performed by performing predetermined heating after performing screen printing with use of a "HyperEtch" material of Merck Ltd., and then rinsing the material with water. The electrode pattern is determined by a driving method and the number of divisions of partial drive. The electrode pattern is processed with a pixel pitch of a display that is to be used or a pitch close to pixel pitch. The processing width of an electrode depends on a processing method; however, in terms of light extraction efficiency, the width is preferably as small as possible. The processing width of the electrode may be, for example, 50 µm or less, preferably 20 µm, and more preferably 5 µm or less. Moreover, the electrode pattern may be formed by performing pattern printing on ITO nanoparticles, and then firing the ITO nanoparticles.

Next, after an entire surface of the transparent substrate 31 is coated with the alignment film 33, the alignment film 33 is dried and fired (refer to FIG. 25(C)). In a case where a polyimide-based material is used as the alignment film 33, NMP (N-methyl-2-pyrrolidone) is often used as a solvent; however, at this time, a temperature of about 200° C. is necessary under an atmosphere. It is to be noted that, in this case, when a plastic substrate is used as the transparent substrate 31, the alignment film 33 may be vacuum-dried and fired at 100° C. After that, a rubbing treatment is performed on the alignment film 33. Therefore, the alignment film 33 functions as an alignment film for horizontal alignment, and a pretilt is allowed to be formed in a rubbing direction of the alignment film 33.

Likewise, a transparent conductive film made of ITO or the like is formed on the transparent substrate 37 configured of a glass substrate or a plastic film substrate. Next, a resist layer is formed on an entire surface of the transparent conductive film, and then an electrode pattern is formed on the resist layer by patterning. Then, the upper electrode 36 is formed by exposure and development, and the resist layer is removed. Next, after an entire surface of the upper electrode 36 is coated with the alignment film 35, the alignment film 35 is dried and fired. After that, a rubbing treatment is performed on the alignment film 35. Therefore, the alignment film 35 functions as an alignment film for horizontal alignment, and a pretilt is allowed to be formed in a rubbing direction of the alignment film 35.

Figure 26:
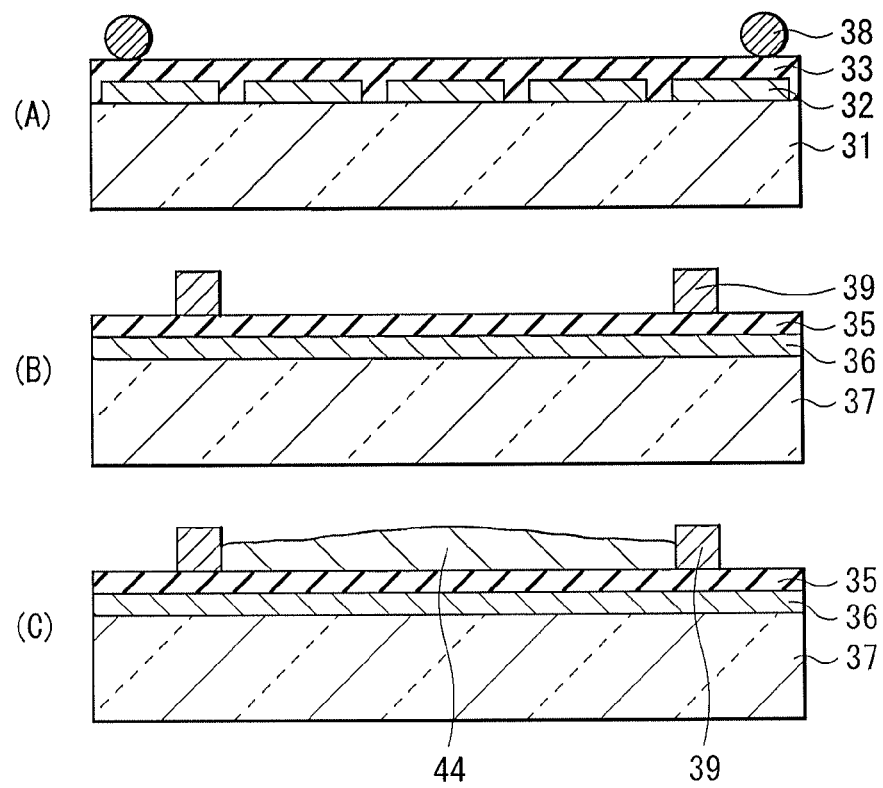
FIGS. 26A through 26C is a sectional view for describing manufacturing processes following FIG. 25.

Next, spacers 38 for forming a cell gap are sprayed on the alignment film 33 by a dry method or a wet method (refer to FIG. 26(A)). It is to be noted that, in a case where the light modulation cells 30-1 are formed by a vacuum bonding method, the spacers 38 may be mixed in a mixture which is to be dropped. Alternatively, columnar spacers may be formed by a photolithography method, instead of the spacers 38. Then, the alignment film 35 is coated with a sealant pattern 39 for bonding and preventing leakage of the liquid crystal in, for example, a frame shape (refer to FIG. 26(B)). The sealant pattern 39 is allowed to be formed by a dispenser method or a screen printing method.

The vacuum bonding method (a one-drop-fill (ODF) method) will be described below; however, the light modulation cells 30-1 may also be formed by a vacuum injection method, a roll bonding method, or the like.

First, a mixture 44 of a liquid crystal and a monomer, corresponding to a volume determined by a cell gap, a cell area, or the like, is dropped uniformly on a plane (refer to FIG. 26(C)). The mixture 44 may be preferably dropped with use of a linear guide precise dispenser; however, a die coater or the like may be used with use of the sealant pattern 39 as a bank.

The above-described materials may be used as the liquid crystal and the monomer, and a weight ratio of the liquid crystal to the monomer may be within a range of 98:2 to 50:50, preferably within a range of 95:5 to 75:25, and more preferably within a range of 92:8 to 85:15. A drive voltage is allowed to be decreased by increasing the ratio of the liquid crystal; however, when the liquid crystal is increased too much, the liquid crystal tends to have difficulty in returning to a transparent state, such as a decline in whiteness under voltage application or a decrease in the response speed after turning the voltage off.

In addition to the liquid crystal and the monomer, a polymerization initiator is added to the mixture 44. A monomer ratio of the polymerization initiator to be added may be adjusted within a range of 0.1 to 10 wt %, depending on an ultraviolet wavelength that is to be used. A polymerization inhibitor, a plasticizer, a viscosity modifier, or the like may be further added to the mixture 44, as necessary. When the monomer is a solid or gel at room temperature, a cap, a syringe, and a substrate may be preferably warmed.

Figure 27:
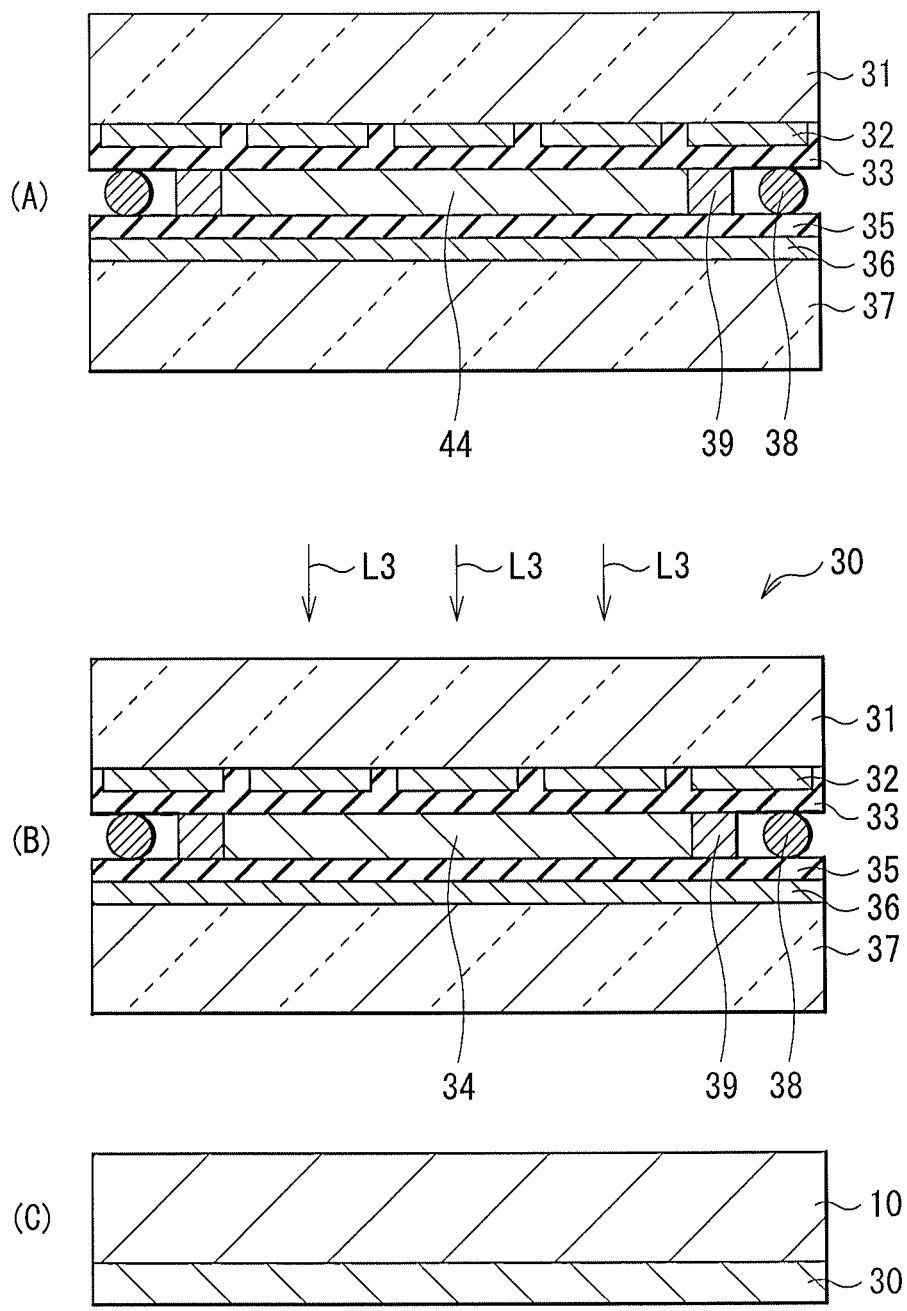
FIGS. 27A through 27C is a sectional view for describing manufacturing processes following FIG. 26.

After the transparent substrates 31 and 37 are put in a vacuum bonding system (not illustrated), evacuation is performed to bond the transparent substrates 31 and 37 (refer to FIG. 27(A)). After that, a resultant is released to the atmosphere to uniformize the cell gap by uniform pressurization under atmospheric pressure. The cell gap may be appropriately selected, based on a relationship between white luminance (whiteness) and the drive voltage; however, the cell gap may be within a range of 5 to 40 µm, preferably within a range of 6 to 20 µm, and more preferably within a range of 7 to 10 µm.

After bonding, an alignment process may be preferably performed as necessary (not illustrated). In a case where light leakage occurs by insertion of a bonded cell between crossed-Nicols polarization plates, the cell may be heated for a predetermined time or be left at room temperature to be aligned. After that, the monomer is irradiated with ultraviolet light L3 to be polymerized (refer to FIG. 27(B)). Thus, the light modulation device 30 is manufactured.

It may be preferable that the temperature of the cell be prevented from being changed under ultraviolet irradiation. An infrared cut filter may be preferably used, or an UV-LED or the like may be preferably used as a light source. Ultraviolet irradiance exerts an influence on an organization structure of a composite material; therefore, the ultraviolet irradiance may be preferably adjusted appropriately, based on a liquid crystal material that is to be used or a monomer material that is to be used, and a composition thereof, and the ultraviolet irradiance may be preferably within a range of 0.1 to 500 mW/cm$^2$, and more preferably within a range of 0.5 to 30 mW/cm$^2$. There is a tendency that the lower the ultraviolet irradiance is, the lower the drive voltage becomes, and preferable ultraviolet irradiance is allowed to be selected in terms of both of productivity and properties.

Then, the light modulation device 30 is bonded to the light guide plate 10 (refer to FIG. 27(C)). Bonding may be carried out by sticking or adhesion; however, it may be preferable that the light modulation device 30 be adhered or stuck with a material having a refractive index that is as close to a refractive index of the light guide plate 10 and a refractive index of a substrate material of the light modulation device 30 as possible. Finally, leading lines (not illustrated) are attached to the lower electrode 32 and the upper electrode 36. Thus, the illumination unit 1 according to this embodiment is manufactured.

Although the process of forming the light modulation device 30, and finally bonding the light modulation device 30 to the light guide plate 10 is described, the transparent substrate 37 on which the alignment film 35 is formed may be bonded in advance to the surface of the light guide plate 10 to form the illumination unit 1. Moreover, the illumination unit 1 may be formed by one of a sheet-feeding method and a roll-to-roll method.

Next, functions and effects of the illumination unit 1 according to this embodiment will be described below.

Figure 14:
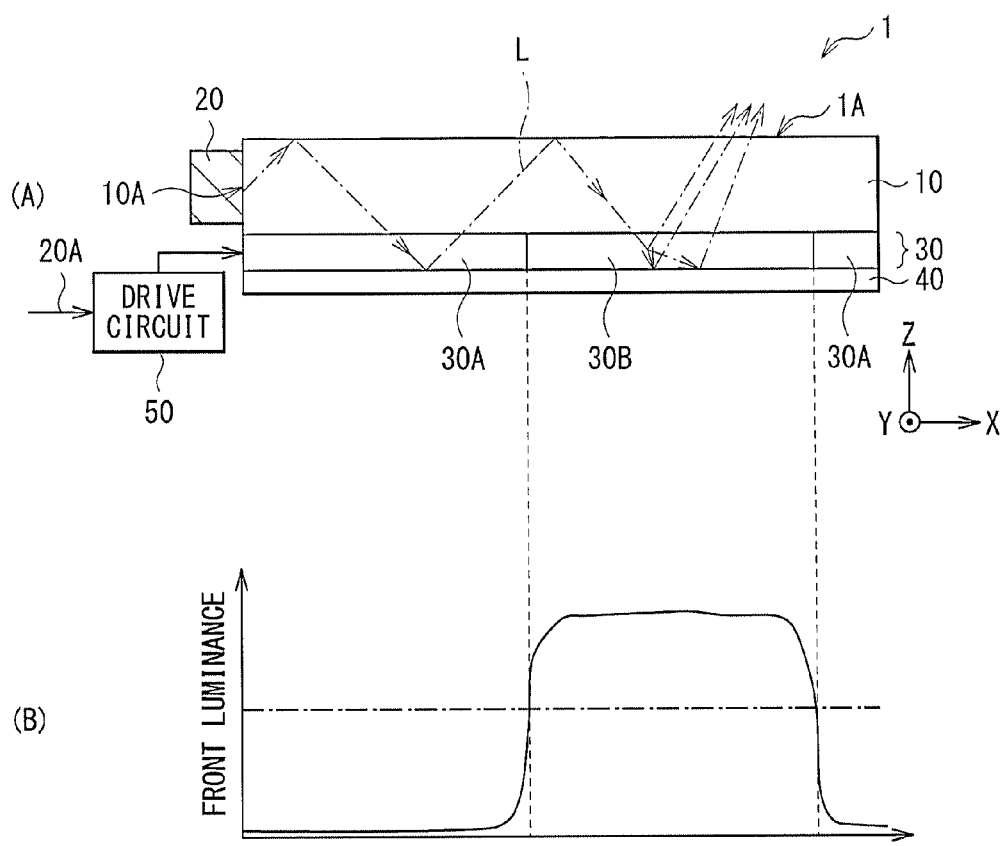
FIGS. 14A and 14B is a schematic view for describing an example of a function of the illumination unit in FIG. 1.

In the illumination unit 1 according to this embodiment, in three-dimensional display, a voltage is applied to a pair of electrodes (the sub-electrode 32A and the upper electrode 36) of each of the light modulation cells 30-1 to allow the optical axes AX2 of the microparticles 34B in each cell 30a to intersect with or be orthogonal to the optical axis AX1 of the bulk 34A, and to allow the optical axes AX2 of the microparticles 34B in each cell 30b to be parallel or substantially parallel to the optical axis AX1 of the bulk 34A. Therefore, in the light modulation device 30, each cell 30a serves as the scattering region 30B, and each cell 30b serves as the transmission region 30A. As a result, light emitted from the light source 20 and entering into the light guide plate 10 passes through the transparent region 30A of the light modulation device 30, and is scattered in the scattering region 30B of the light modulation device 30 (refer to FIG. 14). Light having passed through a bottom surface of the scattering region 30B in the scattered light is reflected by the reflective plate 40 to be returned to the light guide plate 10 again, and then the light is emitted from a top surface of the illumination unit 1. Moreover, light toward a top surface of the scattering region 30B of the scattered light passes through the light guide plate 10, and then is emitted from the top surface of the illumination unit 1. Thus, in three-dimensional display, light is hardly emitted from the top surface of the transmission region 30A, and light is emitted from the top surface of the scattering region 30B. Thus, for example, as illustrated in FIG. 14, linear illumination light is emitted to a front direction.

Moreover, in the illumination unit 1 according to this embodiment, in two-dimensional display, for example, a voltage is applied to a pair of electrodes (the sub-electrode 32A and the upper electrode 36) of each of the light modulation cells 30-1 to allow the optical axes AX2 of the microparticles 34B in each of the light modulation cells 30-1 to intersect with or be orthogonal to the optical axis AX1 of the bulk 34A. Therefore, light emitted from the light source 20 and entering into the light guide plate 10 is scattered in the scattering region 30B formed in the entire light modulation device 30. Light having passed through the bottom surface of the scattering region 30B of the scattered light is reflected by the reflective plate 40 to be returned to the light guide plate 10 again, and then the light is emitted from the top surface of the illumination unit 1. Moreover, light toward the top surface of the scattering region 30B of the scattered light passes through the light guide plate 10, and then is emitted from the top surface of the illumination unit 1. Thus, in two-dimensional display, for example, light is emitted from the entire top surface of the light modulation device 30 to emit planar illumination light toward the front direction.

Incidentally, in this embodiment, in three-dimensional display, it is not necessary to provide a parallax barrier. Moreover, even if a parallax barrier is disposed on a light exit side of the illumination unit 1, at this time, a part of the light modulation layer 34 serves as the scattering region 30B, and the scattering region 30B corresponds to a light transmission region of the parallax barrier, thereby allowing a rate at which light emitted from the light modulation layer 34 is absorbed by the parallax barrier to be extremely low. Further, in this embodiment, in three-dimensional display, a cylindrical lens is not necessary; therefore, there is little possibility that an issue of aberration caused by the cylindrical lens occurs.

Further, in this embodiment, light emitted to the reflective plate 40 of linear illumination light is reflected by the reflective plate 40 to generate the reflected light L12 focused on a focal point. Thus, a front intensity distribution and an angle intensity distribution of the reflected light L12 are allowed to be brought close to a front intensity distribution and an angle intensity distribution of the light L13 emitted toward a direction opposite to the reflective plate 40 of the linear illumination light. As a result, compared to a case where the top surface of the reflective plate is configured of a flat surface (refer to FIG. 22) and a case where the top surface of the reflective plate is configured of a parabolic surface generating parallel light (refer to FIG. 20), in three-dimensional display, a rate at which the reflected light L13 passes through a region (i.e., the transmission region 30A) different from the scattering region 30B to exit from the top surface is allowed to be reduced. Moreover, a rate at which the reflected light L12 is emitted to an unnecessary angle direction for three-dimensional display is allowed to be reduced. Thus, in a case where such an illumination unit 1 is applied as a backlight of a display unit for three-dimensional display, formation of a double image in three-dimensional display is allowed to be reduced. Therefore, display quality in three-dimensional display is improved.

Next, other effects of the illumination unit 1 according to this embodiment will be described below.

Typically, the PDLC is a composite layer that is formed by mixing the liquid crystal material and an isotropic low-molecular material, and causing phase separation by ultraviolet irradiation, drying of a solvent, or the like, and has microparticles of the liquid crystal material dispersed in a polymer material. The liquid crystal material in the composite layer is aligned in random directions under no voltage application, and thus exhibits the scattering property, but on the other hand, under voltage application, the liquid crystal material is aligned in an electric field direction; therefore, in a case where the ordinary refractive index of the liquid crystal material and the refractive index of the polymer material are equal to each other, the liquid crystal material exhibits high transparency in the front direction (in a direction of a normal to the PDLC). However, in this liquid crystal material, a difference between the extraordinary refractive index of the liquid crystal material and the refractive index of the polymer material becomes pronounced in an oblique direction; therefore, even if the liquid crystal material has transparency in the front direction, the liquid crystal material exhibits the scattering property in the oblique direction.

A typical light modulation device utilizing the PDLC often has a configuration in which the PDLC is sandwiched between two glass plates on which transparent conductive films are formed. When light obliquely enters from air into the light modulation device with the above-described configuration, the light incident from the oblique direction is refracted by a refractive index difference between the air and the glass plate to enter into the PDLC at a smaller angle. Therefore, large scattering does not occur in such a light modulation device. For example, when light enters from air at an angle of 80°, the incident angle of the light to the PDLC is reduced to about 40° by refraction at a glass interface.

However, in an edge-light system with use of a light guide plate, since light enters through the light guide plate, the light crosses the PDLC at a large angle of about 80°. Accordingly, a difference between the extraordinary refractive index of the liquid crystal material and the refractive index of the polymer material is large, and light crosses the PDCL at a larger angle, thereby causing a longer optical path subjected to scattering. For example, in a case where microparticles of a liquid crystal material having an ordinary refractive index of 1.5 and an extraordinary refractive index of 1.65 are dispersed in a polymer material having a refractive index of 1.5, there is no refractive index difference in the front direction (the direction of the normal to the PDLC), but the refractive index difference is large in the oblique direction. Therefore, the scattering property in the oblique direction is not allowed to be reduced, thereby causing low view angle characteristics. Further, in a case where an optical film such as a diffusion film is disposed on the light guide plate, oblique leak light is diffused also in the front direction by the diffusion film or the like, thereby causing an increase in light leakage in the front direction and a decrease in a modulation ratio in the front direction.

On the other hand, in this embodiment, since the bulk 34A and the microparticles 34B each include mainly an optical anisotropic material, the scattering property in an oblique direction is reduced, thereby enabling to improve transparency. For example, when the bulk 34A and the microparticles 34B include mainly the optical anisotropic materials with ordinary refractive indices that are equal to each other and extraordinary refractive indices that are also equal to each other, the directions of the optical axes of the bulk 34A and the microparticles 34B coincide with or substantially coincide with each other in a region where a voltage is not applied between the lower electrode 32 and the upper electrode 36. Therefore, the refractive index difference is reduced or eliminated in all directions including the front direction (a direction of the normal to the light modulation device 30) and the oblique direction, thereby obtaining high transparency. As a result, the leakage of light in a range having a large view angle is allowed to be reduced or substantially eliminated, and view angle characteristics are allowed to be improved.

For example, when a liquid crystal having an ordinary refractive index of 1.5 and an extraordinary refractive index of 1.65, and a liquid crystal monomer having an ordinary refractive index of 1.5 and an extraordinary refractive index of 1.65 are mixed, and the liquid crystal monomer is polymerized in a state where the liquid crystal and the liquid crystal monomer are aligned by an alignment film or an electric field, the optical axis of the liquid crystal and the optical axis of a polymer formed by polymerizing the liquid crystal monomer coincide with each other. Therefore, the refractive indices coincide with each other in all directions, thereby enabling to achieve a state where transparency is high, and to further improve the view angle characteristics.

Moreover, in this embodiment, for example, as illustrated in FIGS. 14(A) and (B), luminance in the transmission region 30A (luminance in black display) is lower, compared to a case where light is uniformly emitted from an entire surface (indicated by the alternate long and short dash line in FIG. 14(B)). On the other hand, luminance in the scattering region 30B is significantly increased, compared to a case where light is uniformly emitted from an entire surface (indicated by the alternate long and short dash line in FIG. 14(B)), and luminance in white display is partially increased (partial luminance enhancement) by a reduced amount of the luminance of the transmission region 30A.

Incidentally, the partial luminance enhancement is a technique of enhancing luminance when white display is partially performed, compared to a case where white display is performed on an entire screen. The partial luminance enhancement is typically used in a CRT, a PDP, or the like. However, in a liquid crystal display, since a backlight uniformly emits light in an entire surface thereof irrespective of an image, the luminance is not allowed to be partially enhanced. When an LED backlight in which a plurality of LEDs are two-dimensionally arranged is used as the backlight, some of the LEDs are allowed to be turned off. However, in such a case, diffusion light from dark regions in which the LEDs are turned off disappears; therefore, the luminance becomes lower, compared to a case where all of the LEDs are turned on. Also, the luminance may be increased by increasing a current applied to some LEDs which are turned on; however, in such a case, a large current flows for an extremely short time, thereby causing an issue in terms of load and reliability of a circuit.

On the other hand, in this embodiment, as the bulk 34A and the microparticles 34B each include mainly the optical anisotropic material, the scattering property in the oblique direction is suppressed to reduce leak light from the light guide plate in a dark state. Therefore, since light is guided from a part in a partially-dark state to a part in a partially-bright state, partial luminance enhancement is achievable without increasing electric power supplied to the illumination unit 1.

Moreover, in this embodiment, in a region where a voltage is not applied between the lower electrode 32 and the upper electrode 36, the optical axes AX2 of the microparticles 34B are parallel to the light incident surface 10A of the light guide plate 10 and intersect with the surfaces of the transparent substrates 31 and 37 at the slight angle θ1. In other words, the liquid crystal molecules included in the microparticles 34B are aligned to be tilted at the angle θ1 in a plane parallel to the light incident surface 10A (i.e., to have a pretilt angle). Therefore, when a voltage is applied between the lower electrode 32 and the upper electrode 36, the liquid crystal material included in the microparticles 34B does not rise in random directions, but rises in the plane parallel to the light incident surface 10A. At this time, the optical axis AX1 of the bulk 34A and the optical axes AX2 of the microparticles 34B intersect with or are orthogonal to each other in the plane parallel to the light incident surface 10A. In this case, light vibrating perpendicularly with respect to the transparent substrate 31 in light incident from the light incident surface 10A of the light guide plate 10 exhibits a difference between the extraordinary refractive index of the microparticle 34B and the ordinary refractive index of the bulk 34A. At this time, since the difference between the extraordinary refractive index of the microparticle 34B and the ordinary refractive index of the bulk 34A is large, scattering efficiency of light vibrating perpendicularly with respect to the transparent substrate 31 is increased. On the other hand, light vibrating in parallel with the transparent substrate 31 exhibits a difference between the ordinary refractive index of the microparticle 34B and the extraordinary refractive index of the bulk 34A. At this time, since the difference between the ordinary refractive index of the microparticle 34B and the extraordinary refractive index of the bulk 34A is also large, scattering efficiency of light vibrating in parallel with the transparent substrate 31 is increased. Therefore, light propagating through a region where a voltage is applied between the lower electrode 32 and the upper electrode 36 includes a large amount of a component in an oblique direction. For example, in a case where an acrylic light guide plate is used as the light guide plate 10, light in a region where a voltage is applied between the lower electrode 32 and the upper electrode 36 propagates at an angle of 41.8° or over. As a result, a refractive index difference in all directions including the oblique direction is increased to obtain a high scattering property, thereby enabling to improve display luminance. Moreover, the display luminance is allowed to be further improved by the above-described partial luminance enhancement effect.

Incidentally, for example, under no voltage application, in a case where the optical axis AX1 of the bulk 34A and the optical axes AX2 of the microparticles 34B are arranged perpendicularly to the light incident surface 10A of the light guide plate 10, and in a case where the liquid crystal material included in the microparticles 34B rises in the plane perpendicular to the light incident surface 10A when a voltage is applied between the lower electrode 32 and the upper electrode 36, as with the above-described case, light vibrating perpendicularly with respect to the transparent substrate 31 exhibits a difference between the extraordinary refractive index of the microparticle 34B and the ordinary refractive index of the bulk 34A; however, light vibrating in parallel with the transparent substrate 31 exhibits a difference between the ordinary refractive index of the microparticle 34B and the extraordinary refractive index of the bulk 34A. In this case, there is little or no difference between the ordinary refractive index of the microparticle 34B and the ordinary refractive index of the bulk 34A. Therefore, while light vibrating perpendicularly with respect to the transparent substrate 31 of light incident from the light incident surface 10A exhibits a large refractive index difference as with the above-described case, light vibrating in parallel with the transparent substrate 31 exhibits little or no refractive index difference. As a result, while scattering efficiency of light vibrating perpendicularly with respect to the transparent substrate 31 is increased, scattering efficiency of light vibrating in parallel with the transparent substrate 31 is low or zero. Accordingly, in a case where the optical axes AX1 and AX2 are arranged perpendicularly with respect to the light incident surface 10A, compared to a case where the optical axes AX1 and AX2 are arranged in parallel with the light incident surface 10A, scattering efficiency is lower; therefore, luminance obtained from the light guide plate 10 is lower than that obtained from the light modulation device 30 in this embodiment.

Thus, in this embodiment, the leakage of light in a range having a large view angle is allowed to be reduced or substantially eliminated, and display luminance is allowed to be improved. As a result, a modulation ratio in the front direction is allowed to be increased.

2. Modification Examples of First Embodiment

Next, modification examples of the above-described first embodiment will be described below. It is to be noted that a combination of any of following modification examples may be applicable to the illumination unit 1 according to the above-described first embodiment in a consistent manner with each other.

First Modification Example

Figure 28:
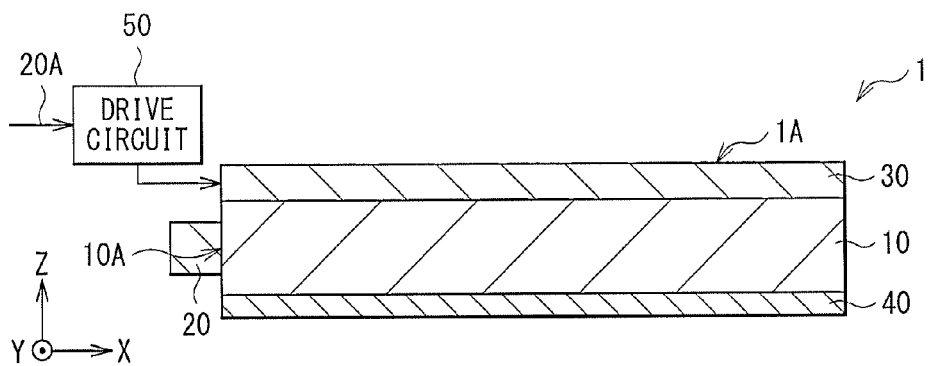
FIG. 28 is a sectional view illustrating a first modification example of the configuration of the illumination unit in FIG. 1.
Figure 29:
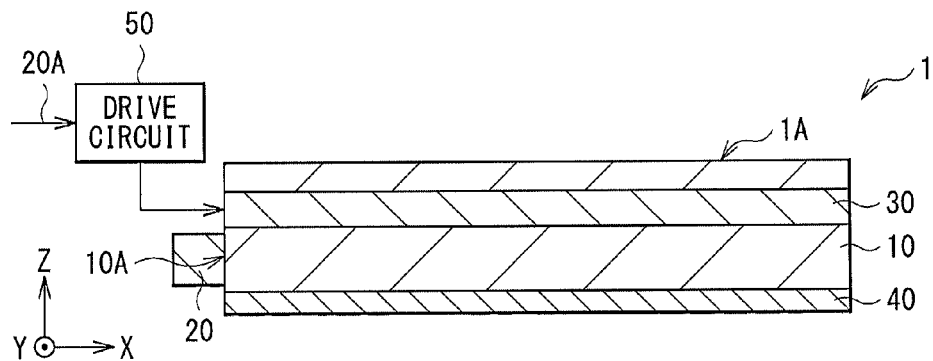
FIG. 29 is a sectional view illustrating a second modification example of the configuration of the illumination unit in FIG. 1.

In the above-described embodiment, the light modulation device 30 is in close contact with and are bonded to the back side (the bottom surface) of the light guide plate 10 without an air layer in between; however, for example, as illustrated in FIG. 28, the light modulation device 30 may be in close contact with and bonded to the top surface of the light guide plate 10 without an air layer in between. Moreover, for example, as illustrated in FIG. 29, the light modulation device 30 may be disposed in the light guide plate 10. However, also in this case, it is necessary for the light modulation device 30 to be in close contact with and bonded to the light guide plate 10 without an air layer in between.

Second Modification Example

Figure 30:
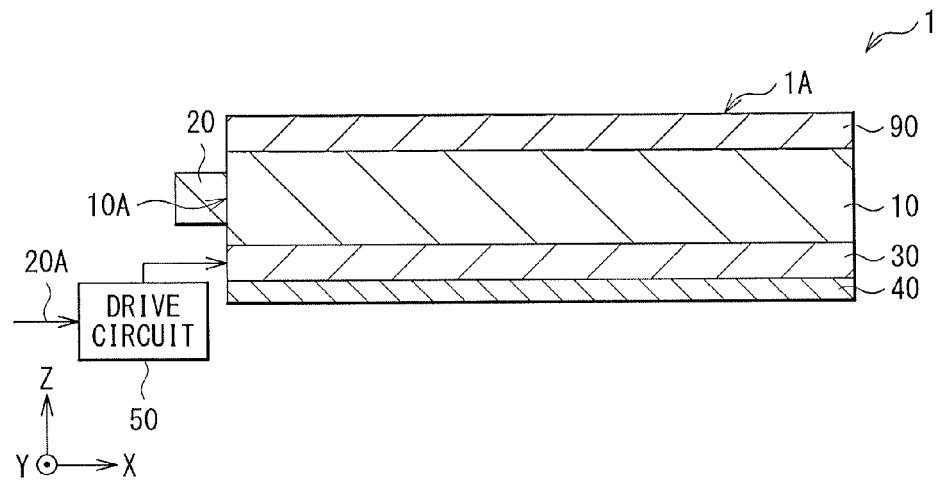
FIG. 30 is a sectional view illustrating a third modification example of the configuration of the illumination unit in FIG. 1.

Moreover, in the above-described embodiment and the modification example thereof, no component is specifically disposed on the light guide plate 10; however, for example, as illustrated in FIG. 30, an optical sheet 90 (for example, a diffusion plate, a diffusion sheet, a lens film, a polarization splitter sheet, or the like) may be provided. In such a case, some of light emitted from the light guide plate 10 in an oblique direction rises in the front direction; therefore, front luminance is allowed to be effectively improved.

Figure 31:
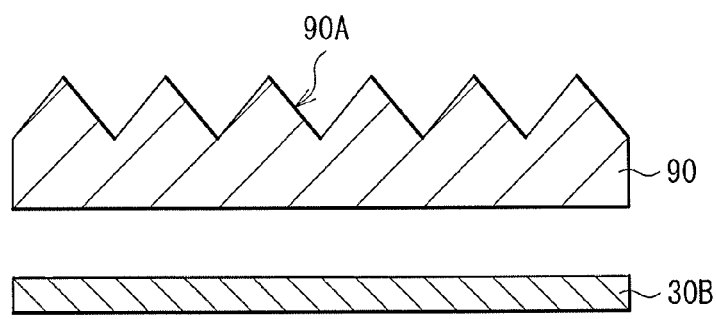
FIG. 31 is a sectional view illustrating an example of a configuration of an optical sheet in FIG. 30 with a scattering region.

For example, as illustrated in FIG. 31, it is assumed that a lens film in which a plurality of strip-like convex sections 90A are arranged on a top surface thereof is used as the optical sheet 90. At this time, for example, as illustrated in FIG. 31, in a case where the convex sections 90A each have a triangular prism shape, the convex sections 90A may preferably extend in a direction intersecting with or orthogonal to an extending direction of the strip-like scattering region 30B generating strip-like illumination light or strip-like illumination light that is a group of a plurality of point-like illumination light beams (hereinafter simply referred to as "strip-like illumination light"). In such a case, the strip-like illumination light having entered the lens film is allowed to pass through the lens film as it is. It is to be noted that a sectional shape of the convex section 90A may not be strictly a triangular shape as illustrated in FIG. 31, and may be a triangular shape with a slightly rounded apex or a slightly rounded oblique surface.

Figure 32:
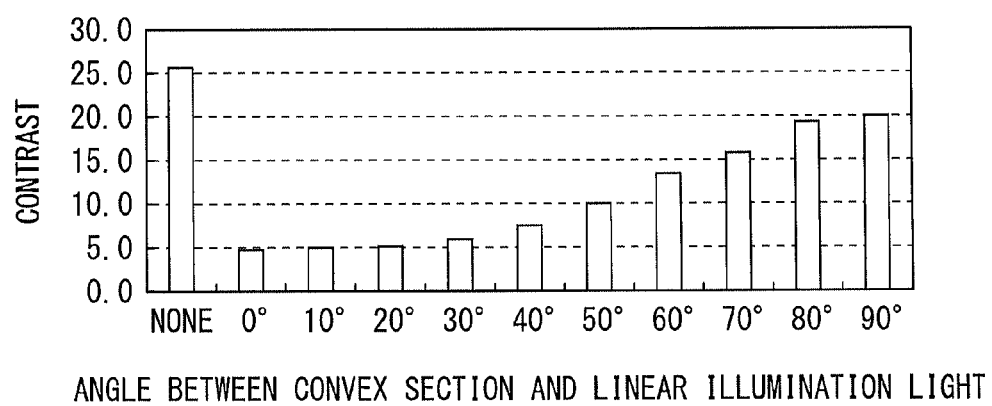
FIG. 32 is a diagram illustrating a relationship between an angle between a convex section and linear illumination light and contrast of a backlight.

FIG. 32 illustrates a relationship between an angle between the convex section 90A and the linear illumination light in a case where a section of the convex section 90A has a triangular shape with an apex angle of 90° and contrast of the illumination unit 1. In FIG. 32, "None" means that the optical sheet 90 is not provided. Moreover, in FIG. 32, "0°" means that the extending direction of the convex section 90A and the extending direction of the strip-like illumination light coincide with each other, and "90°" means that the extending direction of the convex section 90A and the extending direction of the strip-like illumination light are orthogonal to each other. As can be seen from FIG. 32, when the extending direction of the convex section 90A and the extending direction of the strip-like illumination light are orthogonal to each other, contrast is best. Moreover, as can be seen from FIG. 32, change in contrast is small in a range from 80° to 90°. Therefore, in terms of contrast, it is found out that an angle between the extending direction of the convex section 90A and the extending direction of the strip-like illumination light may be preferably in a range of 90°±10°.

Figure 33:
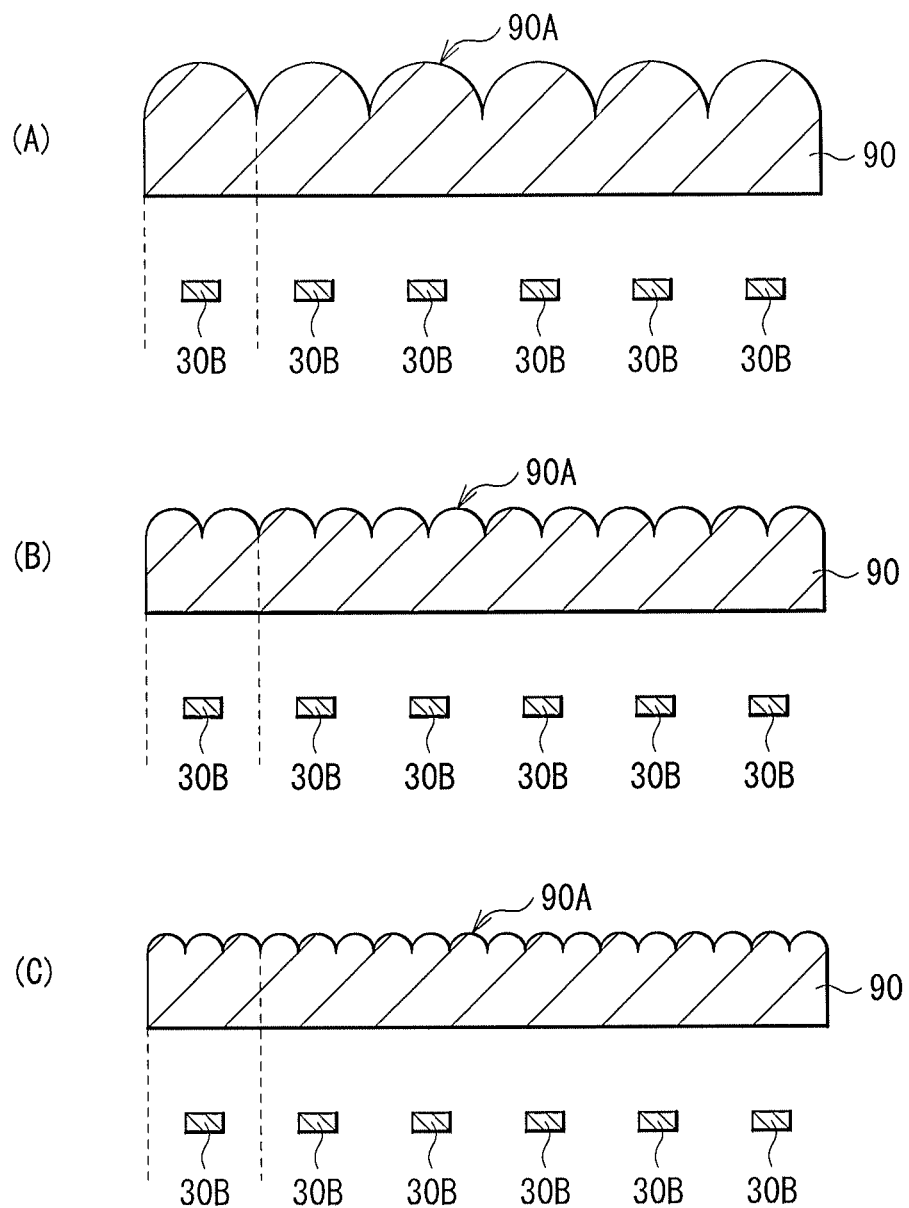
FIGS. 33A through 33C is a sectional view illustrating another example of an optical sheet in FIG. 51 with the scattering region.

Moreover, in a case where, for example, as illustrated in FIGS. 33(A) to (C), the convex section 90A has a strip-like cylindrical shape, the convex section 90A may preferably extend in a direction parallel to the extending direction of the strip-like scattering region 30B that generates strip-like illumination light. Then, as illustrated in FIGS. 33(A) to (C), a pitch of the strip-like illumination light may be preferably equal to an integral multiple (1-fold, 2-fold, 3-fold, or the like) of a pitch of the lens film, and the position of the strip-like illumination light may be preferably located at a position corresponding to an apex of the convex section 90A (for example, directly below the apex of the convex section 90A).

In such a case, directivity of the strip-like illumination light entering the lens film is allowed to be improved.

Incidentally, retardation of the above-described lens film may be preferably small. In a case where light polarized in a rubbing direction is mainly generated from the light modulation device 30, and a transmission axis AX10 of a polarizing plate 210B (refer to FIG. 81) located closer to a backlight 211 of a display panel 210 is aligned in the direction of the light, there may be preferably no (little) retardation changing a polarization state between the light modulation device 30 and the display panel 210. As a material of the above-described lens film, a COP (cyclo olefin polymer)-based resin, a COC (cyclo olefin copolymer)-based resin, a TAC (cellulose triacetate)-based resin, a polycarbonate-based resin, glass, or the like may be preferable. Moreover, a polarization axis of the above-described lens film may be preferably parallel to or perpendicular to the rubbing direction. In such a case, the light polarized in the rubbing direction does not substantially have retardation of the above-described lens film.

Third Modification Example

Moreover, in the above-described embodiment and the modification examples thereof, the upper electrode 36 is configured of a solid film formed on an entire surface, and the lower electrode 32 is configured of a plurality of strip-like sub-electrodes 32A; however, the upper electrode 36 may be configured of a plurality of strip-like sub-electrodes 32A, and the lower electrode 32 may be configured of a solid film formed on an entire surface. Further, for example, the lower electrode 32 may be configured of a plurality of strip-like sub-electrodes 32A, and the upper electrode 36 may be also configured of a plurality of strip-like sub-electrodes 32A.

Fourth Modification Example

Furthermore, in the above-described embodiment and the modification examples thereof, in a case where the lower electrode 32 is configured of a plurality of block-shaped sub-electrodes 32A arranged in a matrix form, a source or a drain of a TFT may be connected to each sub-electrode 32A, a scanning line may be connected to a gate of the TFT, and the source or the drain that is not connected to the sub-electrode 32A of the TFT may be connected to a data line. In this case, the drive circuit 50 may sequentially select a plurality of scanning lines, and may apply a signal voltage corresponding to an image signal to respective data lines. In other words, the drive circuit 50 may drive respective sub-electrodes 32A by an active-matrix driving method.

Fifth Modification Example

Moreover, in the above-described embodiment and the modification examples thereof, the drive circuit 50 may apply an equal voltage to the respective sub-electrodes 32A irrespective of the distance from the light source 20, or may apply, to each of the sub-electrodes 32A, a voltage varying with the distance from the light source 20. In such a case, when illumination light allowing a part of the top surface of the illumination unit 1 to have white luminance is emitted, a possibility of causing a difference in the magnitude of white luminance between a case where the part having white luminance is located close to the light source 20 and a case where the part having white luminance is located far from the light source 20 is allowed to be reduced.

Sixth Modification Example

Further, in the above-described embodiment and the modification examples thereof, one or both of the transparent substrate 31 and the transparent substrate 37 may be integrally formed with the light guide plate 10. For example, in the above-described embodiment and the modification examples thereof, in a case where the transparent substrate 37 is in contact with the light guide plate 10, the transparent substrate 37 may be integrally formed with the light guide plate 10. At this time, the transparent substrate 37 corresponds to a specific example of "first transparent substrate" or "second transparent substrate" in the present technology. Moreover, for example, in the above-described embodiment and the modification examples thereof, in a case where the transparent substrate 31 is in contact with the light guide plate 10, the transparent substrate 31 may be integrally formed with the light guide plate 10. At this time, the transparent substrate 31 corresponds to a specific example of "first transparent substrate" or "second transparent substrate" in the present technology. Further, for example, in the above-described embodiment and the modification examples thereof, in a case where the transparent substrates 31 and 37 are both in contact with the light guide plate 10, the transparent substrates 31 and 37 may be integrally formed with the light guide plate 10. At this time, the transparent substrate 31 or the transparent substrate 37 corresponds to a specific example of "first transparent substrate" or "second transparent substrate" in the present technology.

Seventh Modification Example

Figure 34:
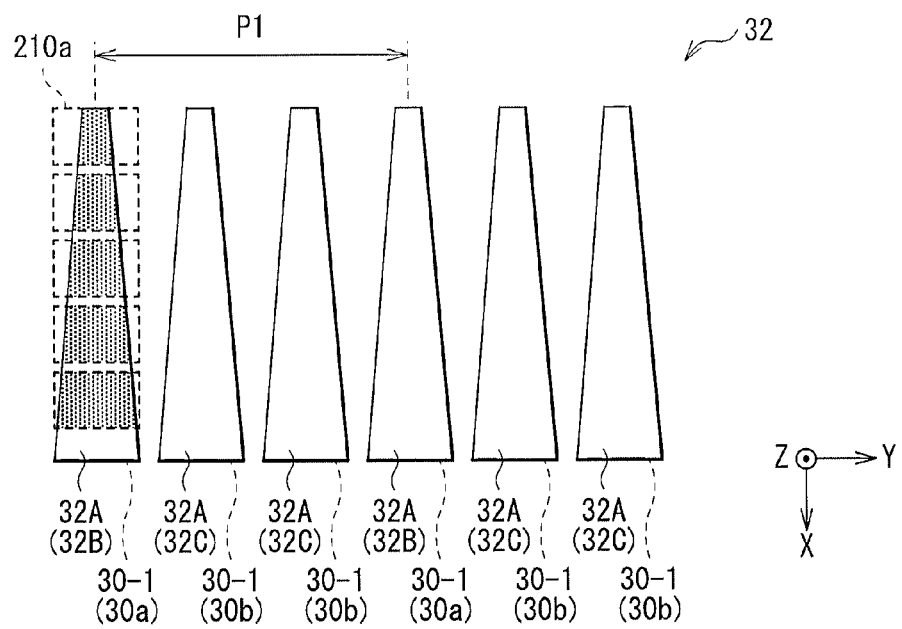
FIG. 34 is a top view illustrating a fourth modification example of the electrode configuration in FIG. 2.

Furthermore, in the above-described embodiment and the modification examples thereof, in a case where the sub-electrodes 32A may each have a strip-like shape extending in one direction in a plane as well as in a direction intersecting with or orthogonal (or substantially orthogonal) to the light incident surface 10A, for example, as illustrated in FIG. 34, in each of the sub-electrodes 32A, an area of a portion used for one pixel 210a in the display panel (an area of a gray portion in the drawing) may vary with a distance from the light source 20. At this time, a light emission area per unit area of each of the strip-like illumination light generated by the sub-electrode 32A also varies with the distance from the light source 20.

More specifically, a width of each sub-electrode 32A varies with the distance from the light source 20, and is relatively smaller at a shorter distance from the light source 20 and relatively larger at a longer distance from the light source 20. For example, as illustrated in FIG. 34, the width of each sub-electrode 32A is increased in proportion to the distance from the light source 20. At this time, the width of the strip-like illumination light generated by the sub-electrode 32A also varies with the distance from the light source 20, and is relatively smaller at a shorter distance from the light source 20 and relatively larger at a longer distance from the light source 20.

Figure 35:
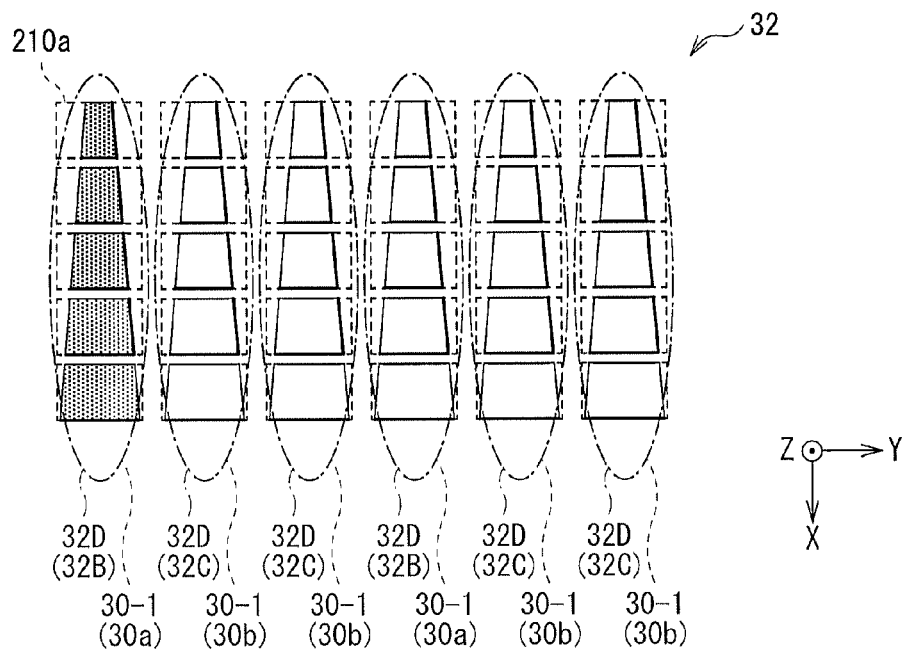
FIG. 35 is a top view illustrating a fifth modification example of the electrode configuration in FIG. 2.

Further, for example, in a case where the sub-electrodes 32A each have a block shape, and are a plurality of sub-electrodes 32A are two-dimensionally arranged, for example, as illustrated in FIG. 35, an area of a portion used for one pixel 210a (an area of a gray portion in the drawing) in the display panel 210 of each linear electrode 32D may vary with the distance from the light source 20.

Eighth Modification Example

Figure 36:
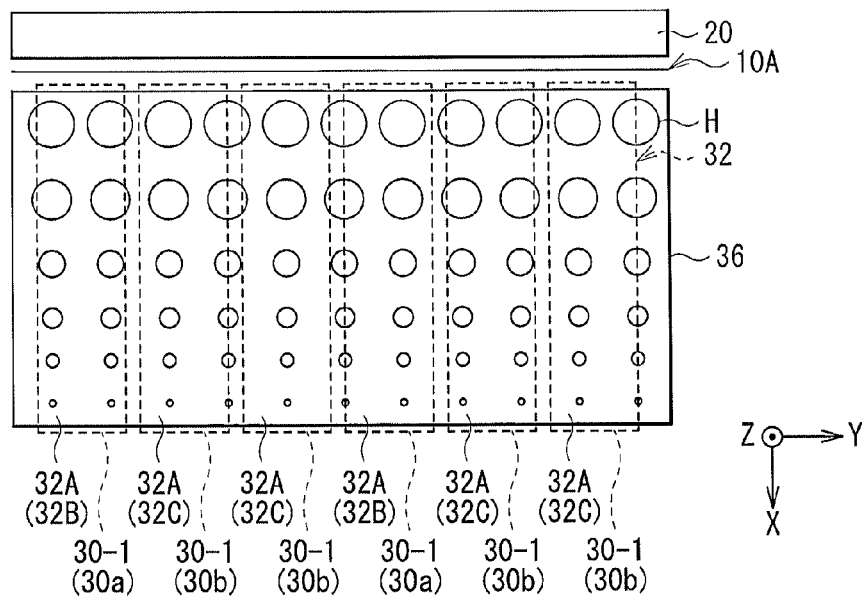
FIG. 36 is a top view illustrating a sixth modification example of the electrode configuration in FIG. 2.
Figure 37:
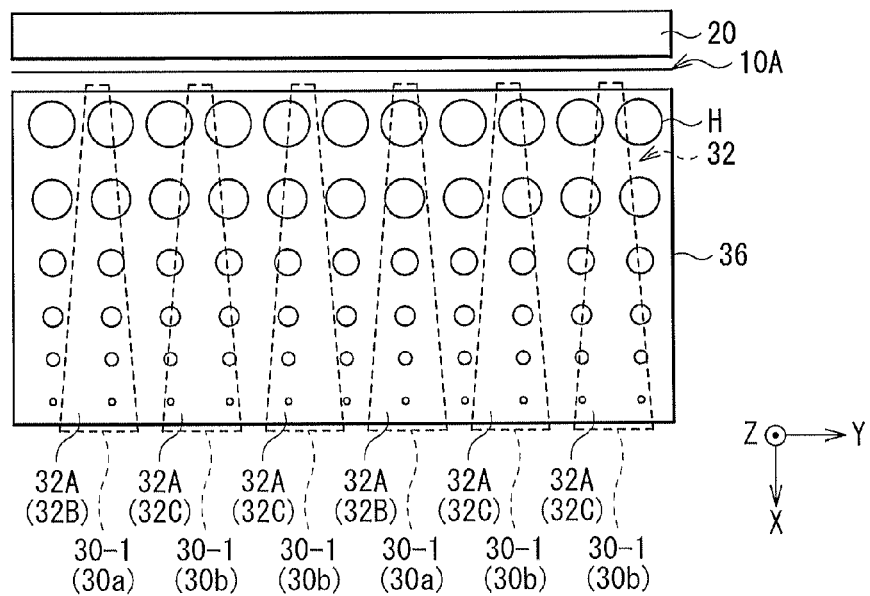
FIG. 37 is a top view illustrating a seventh modification example of the electrode configuration in FIG. 2.

Moreover, in the above-described embodiment and the modification examples thereof, in a case where the upper electrode 36 is configured of one solid film (a planar electrode) formed on an entire surface, patterning may be included in the planar electrode. For example, as illustrated in FIGS. 36 and 37, the upper electrode 36 may have a plurality of holes H. The holes H may have any one of various shapes including a circular shape, an ellipse shape, a square shape, and a polygonal shape.

In this case, the radius of the hole H may vary with a distance from the light source 20. For example, as illustrated in FIGS. 36 and 37, radius of the hole H in a direction orthogonal to the light incident surface 10A may be preferably larger at a shorter distance from the light source 20 and smaller at a larger distance from the light source 20. In such a case, in a direction orthogonal to the light incident surface 10A, luminance closer to the light source 20 is allowed to be reduced more than a case where the holes H are not provided, and luminance farther from the light source 20 is allowed to be increased more than the case where the holes H are not provided. As a result, for example, in a case where an entire light exit region of the illumination unit 1 is in a bright state, in-plane luminance is allowed to be uniformized. Moreover, for example, when white display is performed in a region close to the light source 20 and a region far from light source 20 in the direction orthogonal to the light incident surface 10A, both of the regions are allowed to have equal white luminance.

Moreover, in a case where the light source 20 is configured of a plurality of light source blocks 21 (or a plurality of light sources 21), when a distance between two adjacent light source blocks 21 (or between two adjacent light sources 21 of the plurality of light sources 21) is longer than a distance between two adjacent sub-electrodes 32A, radius of the hole H in a direction parallel to the light incident surface 10A may be preferably relatively larger at a shorter distance from the light source blocks 25 (or the light sources 21) and relatively smaller at a longer distance from the light source blocks 25 (or the light sources 21). In such a case, luminance close to the light source blocks 25 (or the light sources 21) in the direction parallel to the light incident surface 10A is allowed to be reduced more than a case where the holes H are not provided, and luminance far from the light source blocks 25 (or the light sources 21) is allowed to be increased more than the case where the holes H are not provided. As a result, for example, in a case where the entire light exit region of the illumination unit 1 is in the bright state, in-plane luminance is allowed to be uniformized. Moreover, for example, when white display is performed in a region close to the light source blocks 25 (or the light sources 21) and a region far from light source blocks 25 (the light sources 21) in the direction parallel to the light incident surface 10A, both of the regions are allowed to have equal white luminance.

Ninth Modification Example

Furthermore, in the above-described embodiment and the modification examples thereof, when the scattering region 30B generates point-like illumination light, the reflective plate 40 may have a part of a sphere as the reflective surface 40A. At this time, a position facing the scattering region 30B of the reflective plate 40 may be preferably deepest. Even if the reflective plate 40 has such a reflective surface 40A, in a case where the illumination unit 1 is applied as the backlight of the display unit for three-dimensional display, formation of a double image in three-dimensional display is allowed to be reduced. Therefore, display quality in three-dimensional display is improved.

Tenth Modification Example

Moreover, in the above-described embodiment and the modification examples thereof, horizontal alignment films are used as the alignment films 33 and 35; however, vertical alignment films may be used. However, in this case, as liquid crystal molecules included in the microparticles 34B, liquid crystal molecules having negative dielectric constant anisotropy (a so-called negative type liquid crystal) may be preferably used.

Eleventh Modification Example

Figure 38:
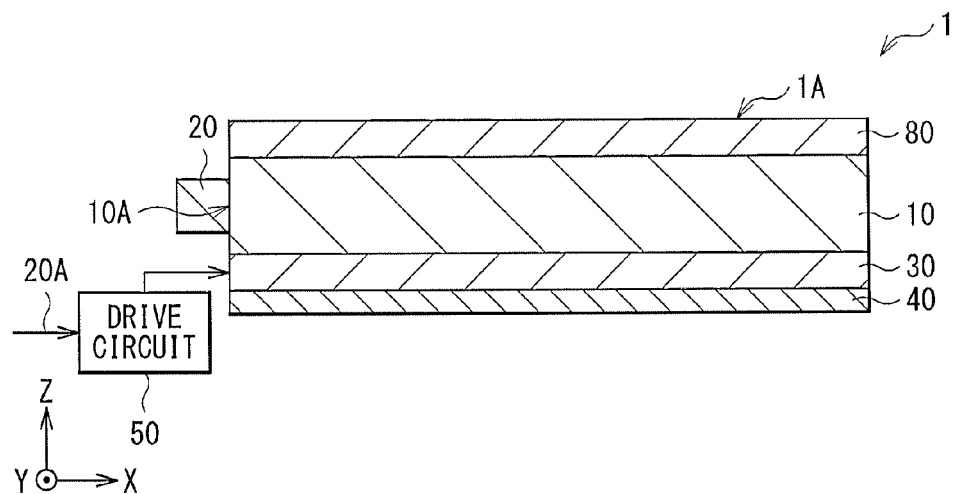
FIG. 38 is a sectional view illustrating a fourth modification example of the configuration of the illumination unit in FIG. 1.

Further, in the above-described embodiment and the modification examples thereof, for example, as illustrated in FIG. 38, a barrier layer 80 may be provided to the top surface of the light guide plate 10.

In a case where three-dimensional display is performed, the barrier layer 80 limits a light emission region of the illumination unit 1 to a region facing each scattering region 30B or a region corresponding thereto, thereby shielding noise light that may be emitted from a region (i.e., the transmission region 30A) adjacent to the scattering region 30B. Moreover, in a case where two-dimensional display is performed, the barrier layer 80 expands the light emission region of the illumination unit 1 to a region facing all of the scattering regions 30B or a region corresponding thereto, thereby allowing light emitted from all of the scattering regions 30B to pass therethrough.

Figure 39:
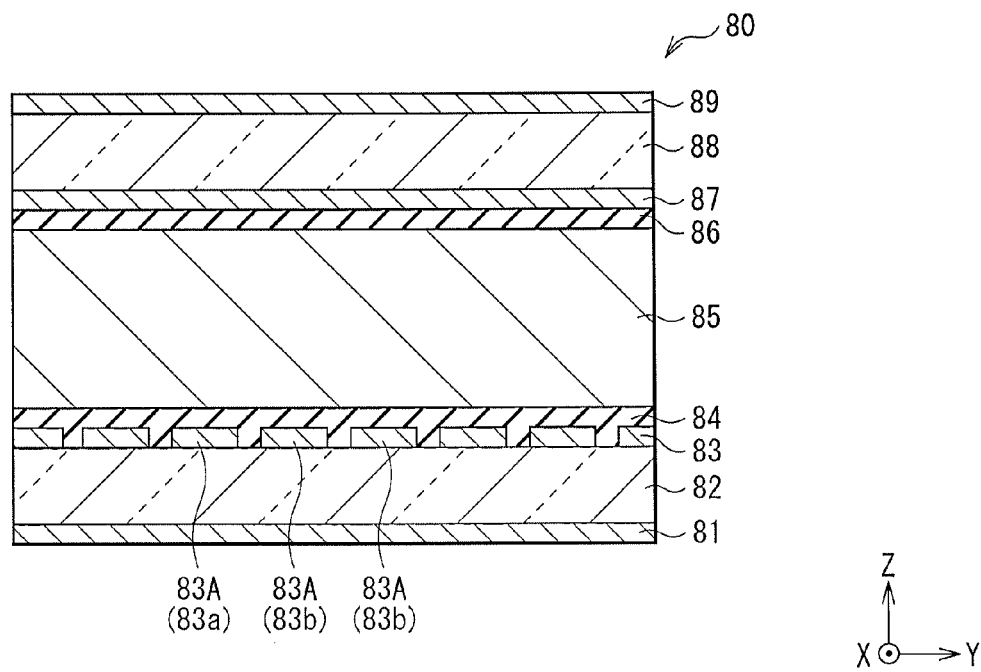
FIG. 39 is a sectional view illustrating an example of a barrier layer in FIG. 38.

For example, as illustrated in FIGS. 38 and 39, the barrier layer 80 may include a polarizing plate 81, a transparent substrate 82, a lower electrode 83, an alignment film 84, a liquid crystal layer 85, an alignment film 86, an upper electrode 87, a transparent substrate 88, and a polarizing plate 89 in order from the reflective plate 40.

The transparent substrates 82 and 88 are configured of substrates transparent to visible light, for example, plate glass. It is to be noted that, although not illustrated, for example, an active drive circuit including TFTs, wiring, and the like electrically connected to the lower electrode 83 is formed on the transparent substrate 82 located closer to the reflective plate 40. The lower electrode 83 and the upper electrode 87 may be made of, for example, ITO. For example, as illustrated in FIG. 39, the lower electrode 83 may be configured of a plurality of sub-electrodes 83A. The plurality of sub-electrodes 83A are formed on the transparent substrate 82.

Figure 40:
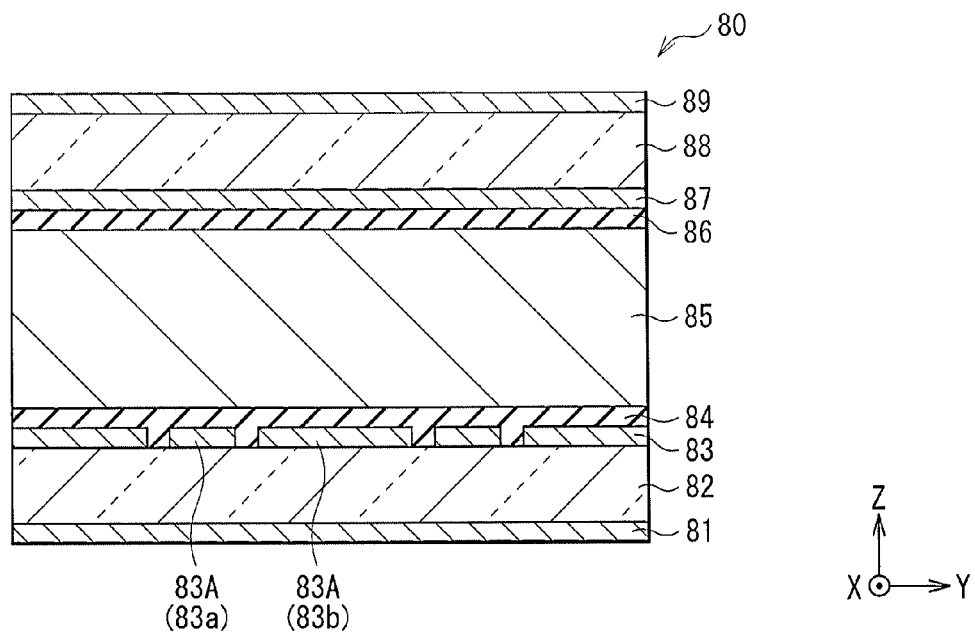
FIG. 40 is a sectional view illustrating another example of the barrier layer in FIG. 38.

The plurality of sub-electrodes 83A each have a strip-like shape extending in one direction in a plane (in a direction parallel to the light incident surface 10A). A Width of each of a plurality of specific sub-electrodes 83a selected from the plurality of sub-electrodes 83A is equal or substantially equal to a width of each of a plurality of sub-electrodes 83b except for the sub-electrodes 83a selected from the plurality of sub-electrodes 83A. It is to be noted that, as illustrated in FIG. 40, the width of the sub-electrode 83a may be smaller than the width of the sub-electrode 83b.

When three-dimensional display is performed on the display unit, the plurality of sub-electrodes 83a are used to allow linear illumination light to pass therethrough or to be shielded. The plurality of sub-electrodes 83a are arranged with a pitch corresponding to (equal to or close to) a pitch P3 (refer to FIG. 82) of a pixel when three-dimensional display is performed on the display unit. The plurality of sub-electrodes 83a and the plurality of sub-electrodes 83b are regularly arranged in an arrangement direction (a direction orthogonal to the light incident surface 10A). For example, a plurality of sub-electrode groups each configured of one sub-electrode 83a and two sub-electrodes 83b are arranged in a direction orthogonal to the light incident surface 10A. It is to be noted that, when two-dimensional display is performed on the display unit, all of the sub-electrodes 83A are used to generate planar illumination light.

The upper electrode 87 is formed on an entire surface of the transparent substrate 88, and functions as a common electrode facing the respective sub-electrodes 83A. The alignment films 84 and 86 may be made of, for example, a polymer material such as polyimide, and perform an alignment process on a liquid crystal. The liquid crystal layer 85 may be made of, for example, a VA mode, TN mode, or STN mode liquid crystal, and has a function of changing the direction of a polarizing axis of light from the light guide plate 10 in each of regions facing the sub-electrodes 83A by a voltage applied from the drive circuit 50. The polarization plates 81 and 89 are optical shutters of one kind, and allow only light (polarized light) in a certain vibration direction to pass therethrough. It is to be noted that the polarization plates 81 and 89 may be absorption polarizers absorbing light (polarized light) in a vibration direction other than a transmission axis, or reflective polarizers reflecting light toward the light guide plate 10. The polarization plates 81 and 89 are disposed to allow their polarizing axes to be different by 90° from each other, or to be parallel to each other, thereby allowing light from the light guide plate 10 to pass therethrough via the liquid crystal layer 85, or to be shielded.

When the drive circuit 50 receives a signal specifying three-dimensional display as a control signal 204A, the drive circuit 50 allows the barrier layer 80 to function as a slit-like light transmission section. More specifically, the drive circuit 50 applies, to the plurality of specific sub-electrodes 83a of the plurality of sub-electrodes 83A, a voltage allowing the barrier layer 80 to exhibit transparency, as well as applies, to the plurality of sub-electrodes 83b except for the plurality of sub-electrodes 83a of the plurality of sub-electrodes 83A, a voltage allowing the barrier layer 80 to exhibit a light-shielding effect.

Moreover, when the drive circuit 50 receives a signal specifying two-dimensional display as the control signal 204A, the drive circuit 50 allows the entire barrier layer 80 to function as a light transmission section. More specifically, the drive circuit 50 applies, to all of the sub-electrodes 83A, a voltage allowing the barrier layer 80 to exhibit transparency.

In this modification example, the barrier layer 80 is disposed on the light exit side of the illumination unit 1; therefore, when a plurality of linear illumination light beams are emitted from the light guide plate 10, noise light that may be emitted from a region adjacent to the scattering region 30B is allowed to be shielded. Thus, in three-dimensional display, light incident at an angle different from an incident angle where each of the linear illumination light beams enters a predetermined pixel is allowed to be reduced. As a result, a clear three-dimensional image is allowed to be obtained.

3. Second Embodiment

Figure 41:
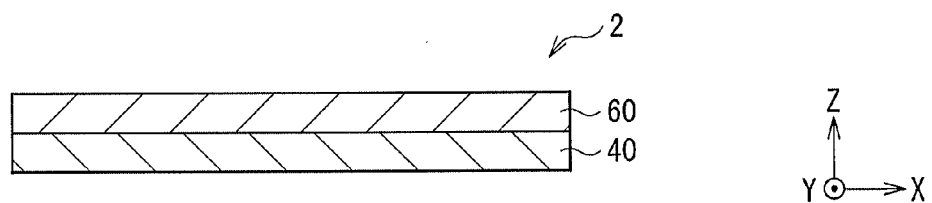
FIG. 41 is a sectional view illustrating an example of a configuration of an illumination unit according to a second embodiment of the present technology.

FIG. 41 illustrates a sectional configuration of an illumination unit 2 according to a second embodiment. The illumination unit 2 is applicable as a backlight of a display unit, and, for example, as illustrated in FIG. 41, the illumination unit 2 may include the reflective plate 40 and a light source 60 disposed above the reflective plate 40. It is to be noted that the light source 60 corresponds to a specific example of "illumination optical system" in the present technology.

Figure 42:
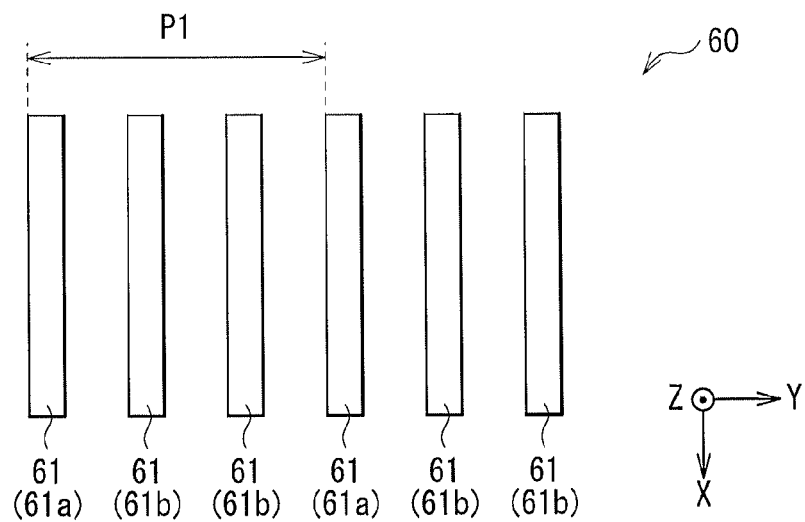
FIG. 42 is a top view illustrating an example of a light source in FIG. 41.

For example, as illustrated in FIG. 42, the light source 60 may be configured of a plurality of light sources 61. For example, as illustrated in FIG. 42, each of the light sources 61 may be a linear light source extending in one direction (for example, a direction parallel to the light incident surface 10A) in a plane. When three-dimensional display is performed on the display unit, a plurality of specific light sources 61 (hereinafter referred to as "light sources 61a") selected from the plurality of light sources 61 are used to generate linear illumination light. The plurality of light sources 61a are arranged with the pitch P1 corresponding to (equal or close to) the pitch P3 (refer to FIG. 82) of a pixel when three-dimensional display is performed on the display unit.

When two-dimensional display is performed on the display unit, a plurality of light sources 61 (hereinafter referred to as "light sources 61b") except for the light sources 61a selected from the plurality of light sources 61 are used with the light sources 61a to generate planar illumination light. In other words, when two-dimensional display is performed on the display unit, all of the light sources 61 are used to generate planar illumination light. The plurality of light sources 61a and the plurality of light sources 61b are regularly arranged in a direction orthogonal to the light incident surface 10A. For example, as illustrated in FIG. 42, a plurality of sub-electrode groups each configured of one light source 61a and two light sources 61b may be arranged in the direction orthogonal to the light incident surface 10A. A width of the light source 61 is narrower than a width of the pixel of the display unit.

Figure 43:
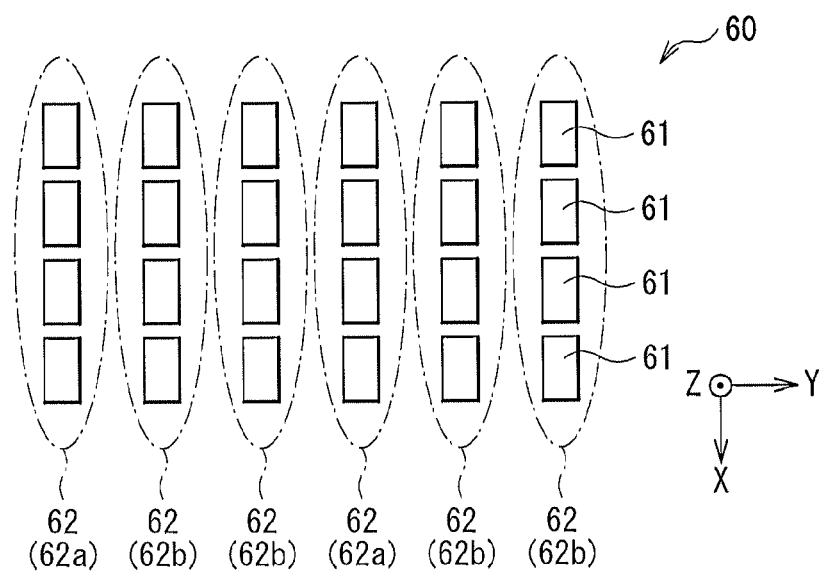
FIG. 43 is a top view illustrating a first modification example of the light source in FIG. 41.

For example, as illustrated in FIG. 43, each of the light sources 61 may have a block shape, and the plurality of light sources 61 may be two-dimensionally arranged. In this case, in a case where a group of a plurality of light sources 61 is considered as one linear light source 62, each linear light source 62 may be used as the above-described light sources 61a and 61b. For example, a plurality of specific linear light sources 62 (linear light sources 62a) selected from a plurality of linear light sources 62 may be used as light sources 61a. Moreover, for example, a plurality of linear light sources 62 (linear light sources 62b) except for the linear light sources used as the linear light sources 61a selected from the plurality of linear light sources 62 may be used as the light sources 61b.

It is to be noted that, in a case where each of the light sources 61 has a block shape and the plurality of light sources 61 are two-dimensionally arranged, when three-dimensional display is performed on the display unit, each of the light sources 61 may be used to generate point-like illumination light. Moreover, in a case where each of the light sources 61 has a block shape and the plurality of light sources 61 are two-dimensionally arranged, even when two-dimensional display capable of providing, from two perspectives, different two-dimensional images from each other is performed on the display unit, each of the light sources 61 may be used to generate point-like illumination light.

Figure 44:
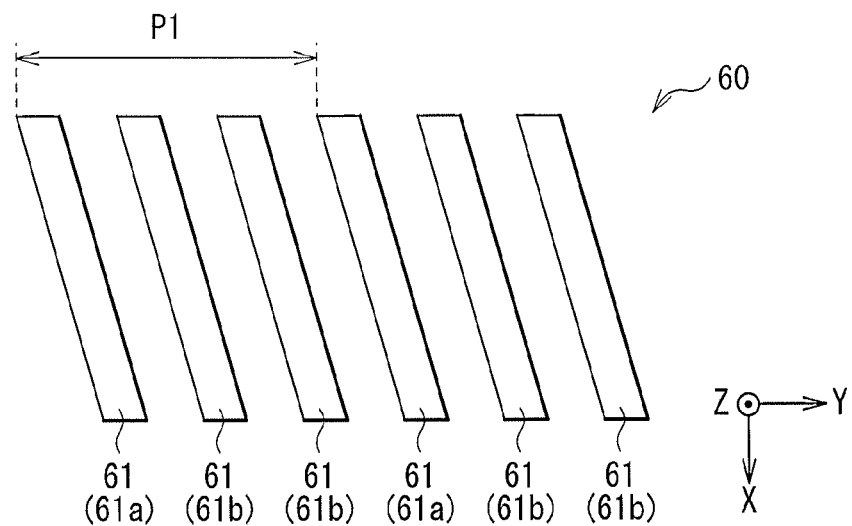
FIG. 44 is a top view illustrating a second modification example of the light source in FIG. 41.
Figure 45:
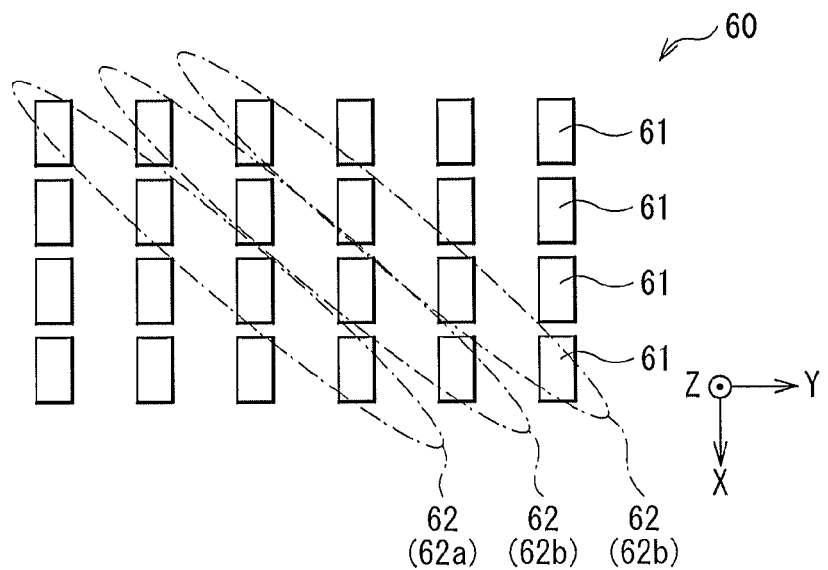
FIG. 45 is a top view illustrating a third modification example of the light source in FIG. 41.

Moreover, for example, as illustrated in FIG. 44, each of the light sources 61 may extend in a direction obliquely intersecting with the light incident surface 10A at an angle other than the right angle. Further, in a case where each of the light sources 61 has a block shape, and the plurality of light sources 61 are two-dimensionally arranged, for example, as illustrated in FIG. 45, each of the linear light sources 62 may extend in a direction obliquely intersecting with the light incident surface 10A at an angle other than the right angle.

In this embodiment, the reflective plate 40 is configured to return light from the light source 60 to the light source 60. The reflective plate 40 may have, for example, functions such as reflection, diffusion, and scattering. Therefore, the reflective plate 40 allows light emitted from the light source 60 to be efficiently used, and is also useful to improve front luminance. A surface with a fine shape of the reflective plate 40 may be preferably a mirror surface. In this case, light emitted from the light source 60 is allowed to be regularly reflected (specularly reflected), and is allowed to be efficiently reflected to the focal point C. The reflective plate 40 may be made of, for example, a material similar to that described in the above-described first embodiment.

Figure 46:
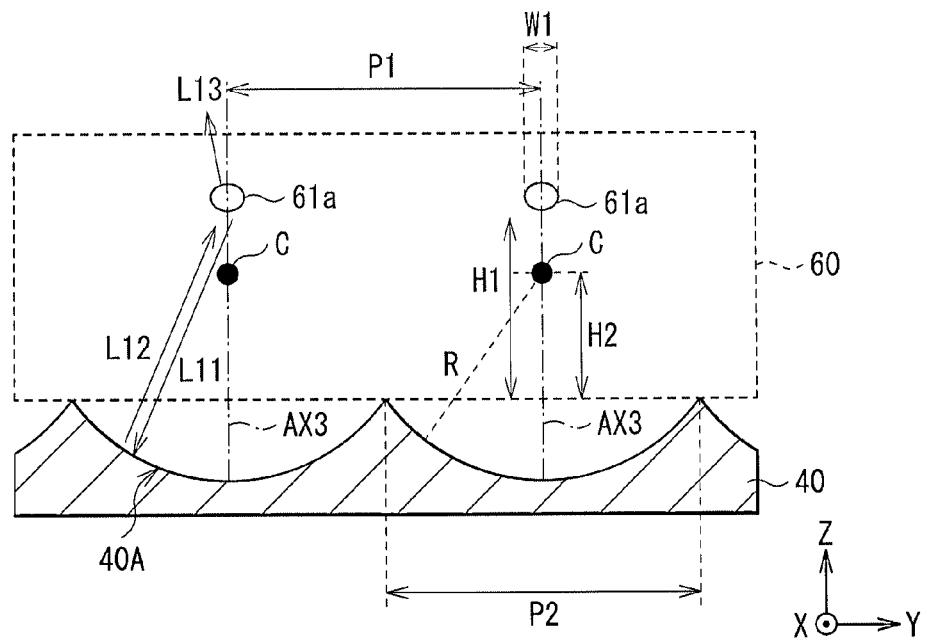
FIG. 46 is a sectional view illustrating an example of configurations of the light source and a reflective plate in FIG. 41.

For example, as illustrated in FIG. 46, the reflective plate 40 may be located at a position apart from the light source 61 by the distance H1, and may have the reflective surface 40A on a side closer to the light source 61. The reflective surface 40A is configured to reflect, to a top surface of the illumination unit 2, a part of light emitted from the light source 60. More specifically, when three-dimensional display is performed on the display unit, the reflective plate 40 reflects linear illumination light generated in the light source 61a to generate reflected light focused on a focal point.

It is to be noted that, when each of the light sources 61 generates point-like illumination light and three-dimensional display is performed on the display unit, the reflective plate 40 may reflect each point-like illumination light to generate linear reflected light focused on a focal point. Moreover, when each of the light sources 61 generates point-like illumination light and two-dimensional display in which two-dimensional images different from each other are viewable from two perspectives is performed on the display unit, the reflective plate 40 may reflect each point-like illumination light to generate linear reflected light focused on a focal point.

The reflective plate 40 reflects reflected light to or close to a plane passing through a part (the light source 61a) that generates linear illumination light and being perpendicular to a plane including the reflective plate 40. More specifically, in a case where a light component parallel to a plane perpendicular to the part (the light source 61a) that generates linear illumination light of the linear illumination light is considered, the reflective plate 40 has a convex-concave shape generating reflected light focused on a focal point located on or near a line segment passing through the part (the light source 61a) that generates linear illumination light and being parallel to a normal to the plane including the reflective plate 40. Moreover, in a case where a light component intersecting with the plane perpendicular to the part (the light source 61a) that generates linear illumination light of the linear illumination light is considered, the reflective plate 40 has a convex-concave shape reflecting light from the linear illumination light to or near the part (the light source 61a) that generates linear illumination light. In this case, in a case where the reflective surface 40A reflects generated light to a part where the light is generated, for example, following expressions may be established. In other words, the reflective plate 40 has a two-dimensional recursive reflection property.

Vector V of light before reflection=(Vx, Vy, Vz)
Vector V of light after reflection=(Vx, −Vy, −Vz)

For example, as illustrated in FIG. 46, in a case where a light component parallel to the plane perpendicular to the part (the light source 61a) that generates linear illumination light is considered, the reflective plate 40 may have a convex-concave shape allowing reflected light to be focused on the focal point C located on or near the line segment AX3 directly below the light source 61a. It is to be noted that the line segment AX3 is a line segment passing through the part (the light source 61a) that generates linear illumination light and being parallel to the normal to the plane including the reflective plate 40. At this time, the distance H2 between the position of the focal point C and the top surface of the reflective plate 40 is shorter than the distance H1, and may be preferably equal to or longer than (H1/nr−W1) and shorter than H1. It is to be noted that the term "nr" is a relative refractive index (n1/n2). The term "n1" is a refractive index of a region between the top surface of the reflective plate 40 and the part (the light source 61a) that generates linear illumination light (in FIG. 46, the part may be the focal point C). The term "n2" is a refractive index of a region between the reflective surface 40A and the top surface of the reflective plate 40. In a case where the region between the top surface of the reflective plate 40 and the part (the light source 61a) that generates linear illumination light is filled with atmospheric air, n1 is the refractive index (=1) of atmospheric air. Moreover, in a case where the region between the reflective surface 40A and the top surface of the reflective plate 40 is filled with atmospheric air, n2 is a refractive index (=1) of atmospheric air. Therefore, in a case where the entire region between the reflective surface 40A and the part (the light source 61a) that generates linear illumination light is filled with atmospheric air, the distance H2 may be preferably equal to or longer than (H1−W1) and shorter than H1.

Figure 47:
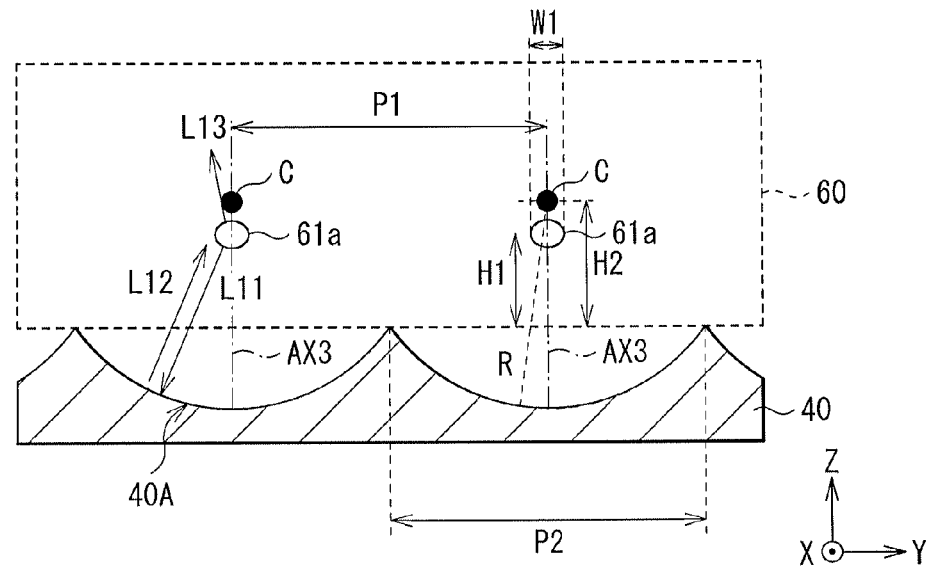
FIG. 47 is a sectional view illustrating a modification example of the configurations of the light source and the reflective plate in FIG. 41.
Figure 48:
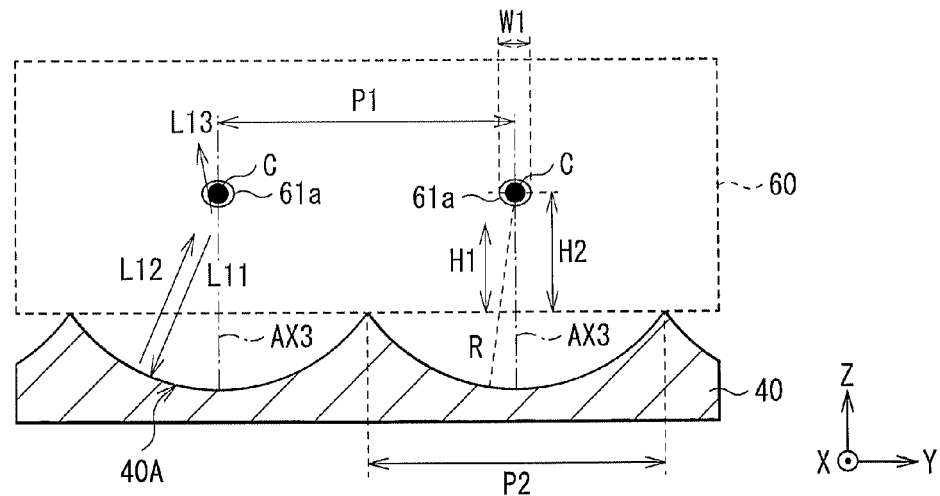
FIG. 48 is a sectional view illustrating another modification example of the configurations of the light source and the reflective plate in FIG. 41.

It is to be noted that, for example, as illustrated in FIG. 47, in a case where a light component parallel to the plane perpendicular to the part (the light source 61a) that generates linear illumination light is considered, the reflective plate 40 may have a convex-concave shape allowing reflected light to be focused on the focal point C located on or near the line segment AX3 directly above the light source 61a. At this time, the distance H2 is longer than the distance H1, and may be preferably longer than H1 and equal to or shorter than (H1/nr+W1). In this case, in a case where the entire region between the reflective surface 40A and the part (the light source 61a) that generates linear illumination light is filled with atmospheric air, the distance H2 may be preferably longer than H1 and equal to or shorter than (H1+W1). Moreover, for example, as illustrated in FIG. 48, in a case where a light component parallel to the plane perpendicular to the part (the light source 61a) that generates linear illumination light is considered, the reflective plate 40 may have a convex-concave shape allowing reflected light to be focused on the focal point C located on or near the line segment AX3 in the light source 61a. At this time, the distance H2 is substantially equal to the distance H1.

The reflective plate 40 includes, as the reflective surface 40A, a part of an inner surface of a cylinder with a central axis passing through the focal point C. A position facing the light source 61a of the reflective surface 40A may be preferably deepest.

When FIGS. 46, 47, and 48 are compared to one another, a position illustrated in FIG. 48 (in the light source 61a) may be most preferable as the position of the focal point C. The pitch P2 of the cubic shape in the reflective surface 40A of the reflective plate 40 may be most preferably equal or substantially equal to the pitch P1 of the light source 61 (the part that generates linear illumination light). Moreover, in this case, a radius of a portion corresponding to the part of the inner surface of the cylinder of the reflective surface 40A may be most preferably $(H2^2+(P1/2)^2)^{1/2}$. In such a case, light reflected by the reflective surface 40A travels to the focal point C, and recursively reaches the light source 61. It is to be noted that a front luminance distribution and an angle luminance distribution of reflected light generated by the reflective plate 40 in this embodiment are similar to those of light generated by the reflective plate 40 in the above-described first embodiment.

Next, functions and effects of the illumination unit 2 according to this embodiment will be described below.

In the illumination unit 2 according to this embodiment, in three-dimensional display, in the light source 60, the light sources 61a emit light, and the light sources 61b does not emit light. Light emitted from each of the light sources 61a is directly emitted to the front direction, and light reflected by the reflective plate 40 is emitted to the front direction. Therefore, linear illumination light is emitted to the front direction.

Moreover, in the illumination unit 2 according to this embodiment, in two-dimensional display, all of the light sources 61 in the light source 60 emit light. Light emitted from each of the light sources 61 is directly emitted to the front direction, and light reflected by the reflective plate 40 is emitted to the front direction. Therefore, planar illumination light is emitted to the front direction.

Incidentally, in this embodiment, in three-dimensional display, it is not necessary to provide a parallax barrier. Moreover, even if the parallax barrier is disposed on a light exit side of the illumination unit 2, a rate at which light emitted from the light source 60 is absorbed by the parallax barrier is allowed to be extremely low by allowing the light source 61 corresponding to a light transmission region of the parallax barrier selected from the plurality of light sources 61 to selectively emit light at this time. Further, in this embodiment, in three-dimensional display, a cylindrical lens is not necessary; therefore, there is little possibility that an issue of aberration caused by the cylindrical lens occurs.

Further, in this embodiment, linear illumination light is reflected by the reflective plate 40 to generate the reflected light L12 focused on a focal point. Thus, the front intensity distribution and the angle intensity distribution of the reflected light L12 are allowed to be brought close to the front intensity distribution and the angle intensity distribution of the light L13 emitted toward a direction opposite to the reflective plate 40 of the linear illumination light. As a result, compared to the case where the top surface of the reflective plate is configured of a flat surface (refer to FIG. 22) and the case where the top surface of the reflective plate is configured of a parabolic surface generating parallel light (refer to FIG. 20), in three-dimensional display, a rate at which the reflected light L13 passes through a region different from the light source 61 to exit from the top surface is allowed to be reduced. Moreover, a rate at which the reflected light L13 is emitted to an unnecessary angle direction for three-dimensional display is allowed to be reduced. Thus, in a case where such an illumination unit 2 is applied as a backlight of a display unit for three-dimensional display, formation of a double image in three-dimensional display is allowed to be reduced. Therefore, display quality in three-dimensional display is improved.

4. Modification Example of Second Embodiment

In the above-described second embodiment, when the light source 61 generates point-like illumination light, the reflective plate 40 may have a part of a sphere as the reflective surface 40A. At this time, a position facing the light source 61 of the reflective plate 40 may be preferably deepest. Even if the reflective plate 40 has such a reflective surface 40A, in a case where the illumination unit 2 is applied as the backlight of the display unit for three-dimensional display, formation of a double image in three-dimensional display is allowed to be reduced. Therefore, display quality in three-dimensional display is improved.

5. Third Embodiment

Figure 49:
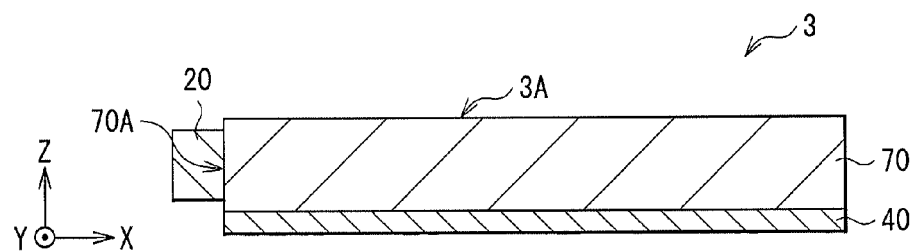
FIG. 49 is a sectional view illustrating an example of a configuration of an illumination unit according to a third embodiment of the present technology.

FIG. 49 illustrates a sectional configuration of an illumination unit 3 according to a third embodiment. The illumination unit 3 is applicable as a backlight of a display unit, and, for example, as illustrated in FIG. 49, the illumination unit 3 may include a light guide plate 70, a light source 20 disposed on a side surface of the light guide plate 70, and the reflective plate 40 disposed behind the light guide plate 70. It is to be noted that the light guide plate 70 and the light source 20 correspond to specific examples of "illumination optical system" in the present technology.

The light guide plate 70 is configured to guide light from the light source 20 disposed on the side surface of the light guide plate 70 to a top surface of the light guide plate 70 (for example, a light exit surface 3A of the illumination unit 3 (refer to FIG. 49)). The light guide plate 70 may have, for example, a shape corresponding to a target object for illumination (for example, the display panel 210 which will be described later) disposed on the top surface of the light guide plate 70, for example, a rectangular parallelepiped shape surrounded by a top surface, a bottom surface, and side surfaces. It is to be noted that a side surface where light from the light source 20 enters of the side surfaces of the light guide plate 70 is hereinafter referred to as "light incident surface 70A".

The light guide plate 70 may include, for example, a scattering section that scatters light propagating through the light guide plate 70. The scattering section may be, for example, a part including a filler, a part where a scattering material is printed, or a fine projection (a convex section). This embodiment will be described below, assuming that the light guide plate 70 includes, as the scattering sections, a plurality of convex sections 71 that are fine projections on a top surface thereof. It is to be noted that, in following description, the convex section 71 may be called "scattering section" instead.

Figure 50:
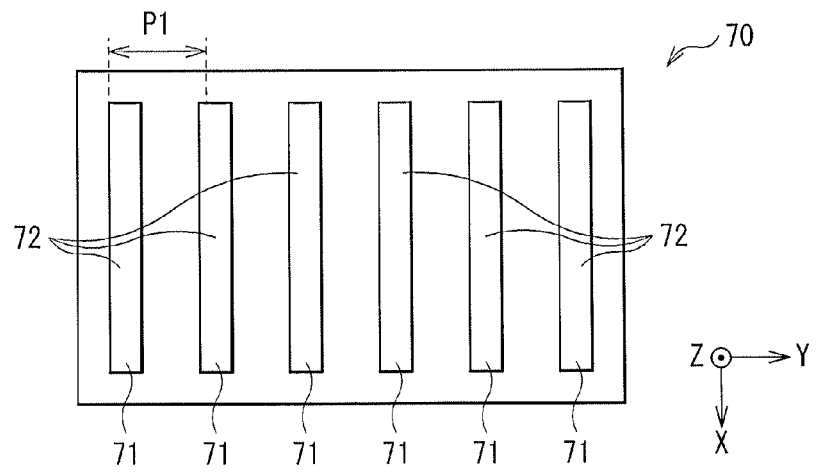
FIG. 50 is a top view illustrating an example of a light guide plate in FIG. 49.

For example, as illustrated in FIG. 50, each of the plurality of convex sections 71 may have a strip-like shape extending in one direction (for example, a direction parallel to the light incident surface 70A) in a plane. When three-dimensional display is performed on the display unit, each of the convex sections 71 is used to generate linear illumination light. The plurality of convex sections 71 are arranged with the pitch P1 corresponding to (equal or close to) the pitch P3 (refer to FIG. 82) of a pixel when three-dimensional display is performed on the display unit.

Figure 51:
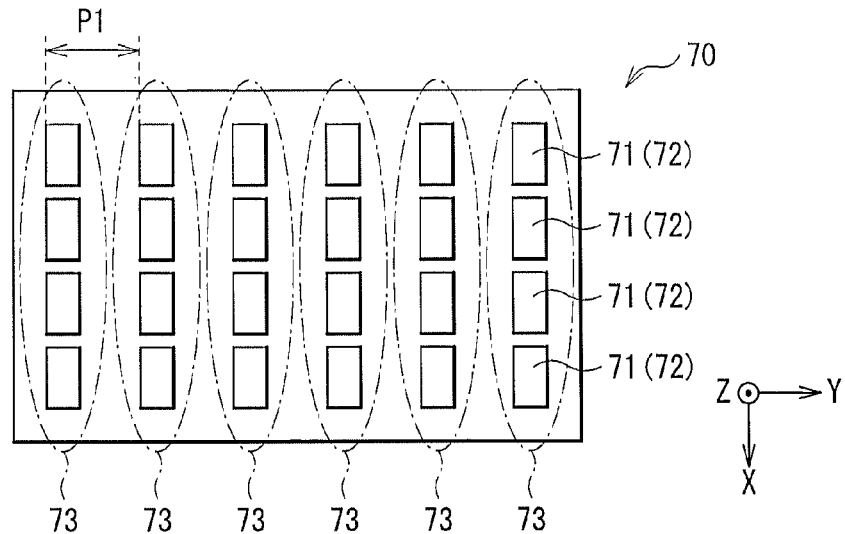
FIG. 51 is a top view illustrating another example of the light guide plate in FIG. 49.

Each of the convex sections 71 includes a material (for example, a filler) or a configuration (for example, a light scattering surface) that scatters light propagating through the light guide plate 70. Therefore, a whole or a part of each of the convex sections 71 serves as a scattering region 72. For example, as illustrated in FIG. 50, a whole of each of the convex sections 71 serves as the scattering region 72 in a plane of the light guide plate 70. At this time, each of the scattering regions 72 has a strip-like shape. It is to be noted that, although not illustrated, a part of each of the convex sections 71 may serve as the scattering region 72 in the plane of the light guide plate 70. At this time, each of the scattering regions 72 may have a block shape, and a plurality of scattering regions 72 may be two-dimensionally arranged in the plane of the light guide plate 70. For example, as illustrated in FIG. 51, each of the convex sections 71 may have a block shape, and a plurality of convex sections 71 may be two-dimensionally arranged. In this case, when a group of a plurality of convex sections 71 is considered as one linear light source 73, each linear light source 73 may be used as the convex section 71 in FIG. 50. A plurality of linear light sources 73 are arranged with the pitch P1 corresponding to (equal or close to) the pitch P3 (refer to FIG. 82) of a pixel when three-dimensional display is performed on the display unit.

In this embodiment, the reflective plate 40 is configured to return, to the light guide plate 70, light from the light source 20. The reflective plate 40 may have, for example, functions such as reflection, diffusion, and scattering. Therefore, the reflective plate 40 allows light emitted from the light source 20 to be efficiently used, and is also useful to improve front luminance. A surface with a fine shape of the reflective plate 40 may be preferably a mirror surface. In this case, light emitted from the light source 20 is allowed to be regularly reflected (specularly reflected), and is allowed to be efficiently reflected to the focal point C (which will be described later). The reflective plate 40 may be made of, for example, a material similar to that described in the above-described first embodiment.

Figure 52:
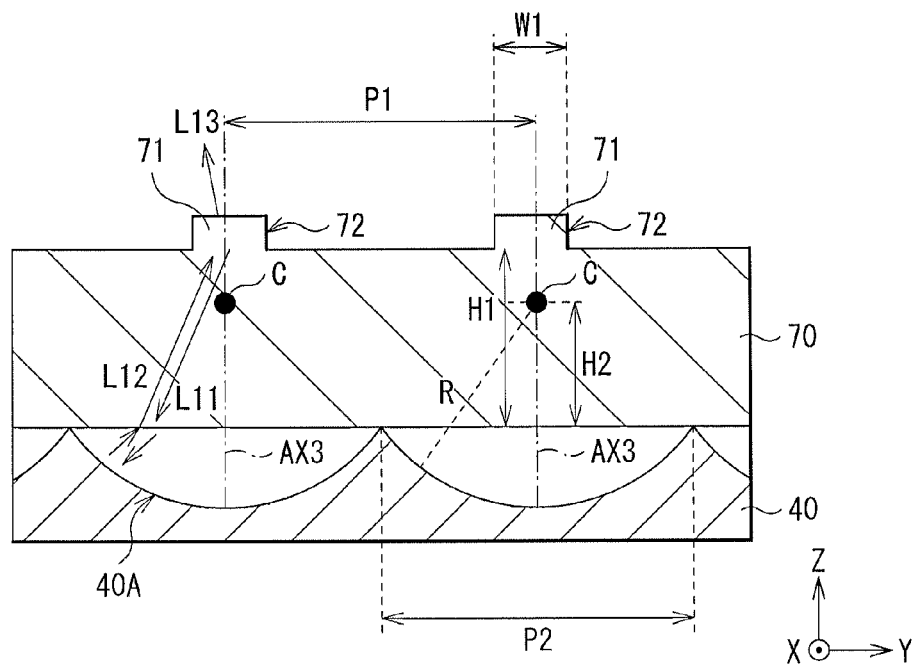
FIG. 52 is a sectional view illustrating an example of configurations of the light guide plate and a reflective plate in FIG. 49.

For example, as illustrated in FIG. 52, the reflective plate 40 may be located at a position apart from the scattering region 72 by the distance H1, and may have a reflective surface 40A on a side closer to the light guide plate 70. The reflective surface 40A is configured to reflect, to a top surface (more specifically, the light exit surface 3A) of the illumination unit 3, a part of light emitted from the light source 20.

It is to be noted that, when each of the scattering regions 72 generates point-like illumination light and three-dimensional display is performed on the display unit, the reflective plate 40 may reflect each point-like illumination light to generate linear reflected light focused on a focal point. Moreover, when each of the scattering regions 72 generates point-like illumination light and two-dimensional display in which two-dimensional images different from each other are viewable from two perspectives is performed on the display unit, the reflective plate 40 may reflect each point-like illumination light to generate linear reflected light focused on a focal point.

The reflective plate 40 reflects reflected light to or close to a plane passing through a part (the scattering region 72) that generates linear illumination light and being perpendicular to a plane including the reflective plate 40. More specifically, in a case where a light component parallel to a plane perpendicular to the part (the scattering region 72) that generates linear illumination light of the linear illumination light is considered, the reflective plate 40 has a convex-concave surface generating reflected light focused on a focal point located on or near a line segment passing through the part (the scattering region 72) that generates linear illumination light and being parallel to a normal to the plane including the reflective plate 40. Moreover, in a case where a light component interesting with the plane perpendicular to the part (the light source 61 the scattering region 72) that generates linear illumination light of linear illumination light is considered, the reflective plate 40 has a convex-concave surface reflecting light from the linear illumination light to or near the part (the scattering region 72) that generates linear illumination light. In this case, in a case where the reflective surface 40A reflects generated light to a part where the light is generated, for example, following expressions may be established. In other words, the reflective plate 40 has a two-dimensional recursive reflection property.

Vector V of light before reflection=(Vx, Vy, Vz)
Vector V of light after reflection=(Vx, −Vy, −Vz)

The reflective plate 40 has a convex-concave shape allowing reflected light to be focused on a focal point located on or near a line segment AX3 passing through the part (the scattering region 72) that generates linear illumination light and being parallel to the normal to the plane including the reflective plate 40. In other words, the reflective plate 40 has a recursive reflection property. For example, as illustrated in FIG. 52, the reflective plate 40 has a convex-concave shape allowing reflected light to be focused on the focal point C located on or near the line segment AX3 directly below the scattering region 72. At this time, the distance H2 between the position of the focal point C and the top surface of the reflective plate 40 is shorter than the distance H1, and may be preferably equal to or longer than (H1/nr−W1) and shorter than H1. It is to be noted that the term "nr" is a relative refractive index (n1/n2). The term "n1" is a refractive index of a region between the top surface of the reflective plate 40 and the part (the scattering region 72) that generates linear illumination light (in FIG. 52, the part may be the focal point C), and in this embodiment, the term "n1" is a refractive index of the light guide plate 70. The term "n2" is a refractive index of a region between the reflective surface 40A and the top surface of the reflective plate 40. In a case where the region between the reflective surface 40A and the top surface of the reflective plate 40 is filled with atmospheric air, n2 is the refractive index (=1) of atmospheric air. Therefore, in a case where the region between the top surface of the reflective plate 40 and the part (the scattering region 72) that generates linear illumination light is filled with the light guide plate 70 and the region between the reflective surface 40A and the top surface of the reflective plate 40 is filled with atmospheric air, the distance H2 may be preferably equal to or longer than (H1/n1−W1) and shorter than H1.

Figure 53:
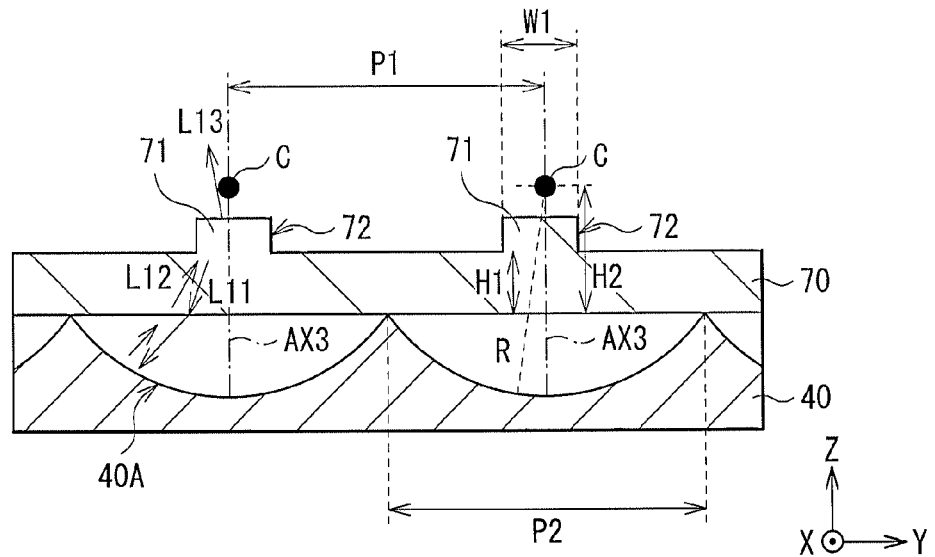
FIG. 53 is a sectional view illustrating a first modification example of the configurations of the light guide plate and the reflective plate in FIG. 49.
Figure 54:
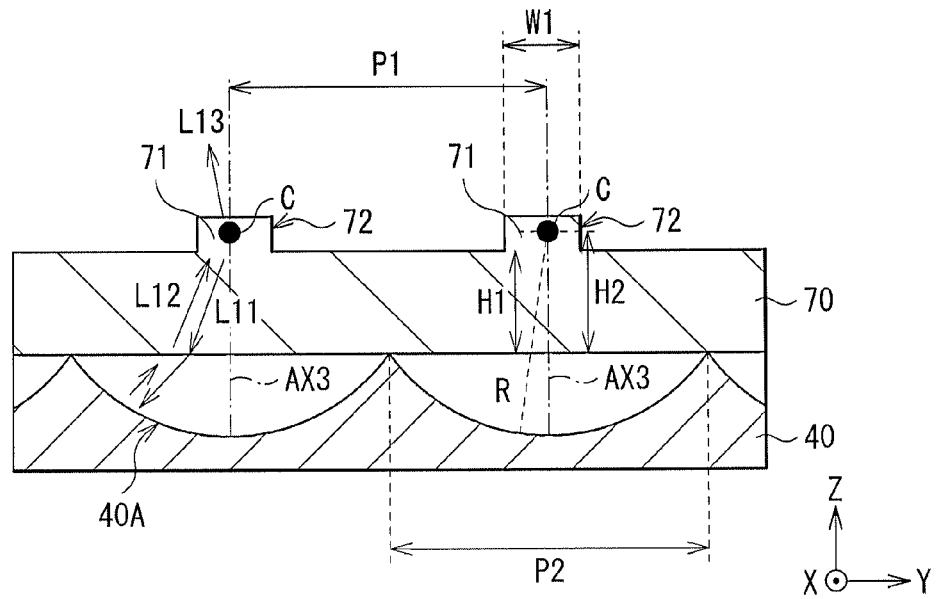
FIG. 54 is a sectional view illustrating a second modification example of the configurations of the light guide plate and the reflective plate in FIG. 49.

It is to be noted that, for example, as illustrated in FIG. 53, in a case where a light component parallel to the plane perpendicular to the part (the scattering region 72) that generates linear illumination light is considered, the reflective plate 40 may have a convex-concave shape allowing reflected light to be focused on the focal point C located on or near the line segment AX3 directly above the scattering region 72. At this time, the distance H2 is longer than the distance H1, and may be preferably longer than H1 and equal to or shorter than (H1/nr+W1). In this case, in a case where the region between the top surface of the reflective plate 40 and the part (the scattering region 72) that generates linear illumination light is filled with the light guide plate 70 and the region between the reflective surface 40A and the top surface of the reflective plate 40 is filled with atmospheric air, the distance H2 may be preferably longer than H1 and equal to or shorter than (H1/n1+W1). Moreover, for example, as illustrated in FIG. 54, in a case where a light component parallel to the plane perpendicular to the part (the scattering region 72) that generates linear illumination light is considered, the reflective plate 40 may have a concave-convex surface allowing reflected light to be focused on the focal point C located on or near the line segment AX3 in the scattering region 72. At this time, the distance H2 is substantially equal to the distance H1.

The reflective plate 40 includes, as the reflective surface 40A, a part of an inner surface of a cylinder with a central axis passing through the focal point C. A position facing the scattering region 72 of the reflective surface 40A may be preferably deepest.

When FIGS. 52, 53, and 54 are compared to one another, a position illustrated in FIG. 52 (directly below the scattering region 72) may be most preferable as the position of the focal point C. At this time, the focal point C may be more preferably located at a position satisfying H2=H1/nr. In this case, in a case where the region between the top surface of the reflective plate 40 and the part (the scattering region 72) that generates linear illumination light is filled with the light guide plate 70 and the region between the reflective surface 40A and the top surface of the reflective plate 40 is filled with atmospheric air, the focal point C may be most preferably located at a position satisfying H2=H1/n1. The pitch P2 of the cubic shape in the reflective surface 40A of the reflective plate 40 may be most preferably equal or substantially equal to the pitch P1 of the scattering region 72 in the light guide plate 70. Moreover, in this case, a radius of a portion corresponding to the part of the inner surface of the cylinder of the reflective surface 40A may be most preferably $(H2^2+(P1/2)^2)^{1/2}$. In such a case, light reflected by the reflective surface 40A travels to the focal point C, and is refracted by a bottom surface of the light guide plate 70 to recursively reach the scattering region 72.

Figure 55:
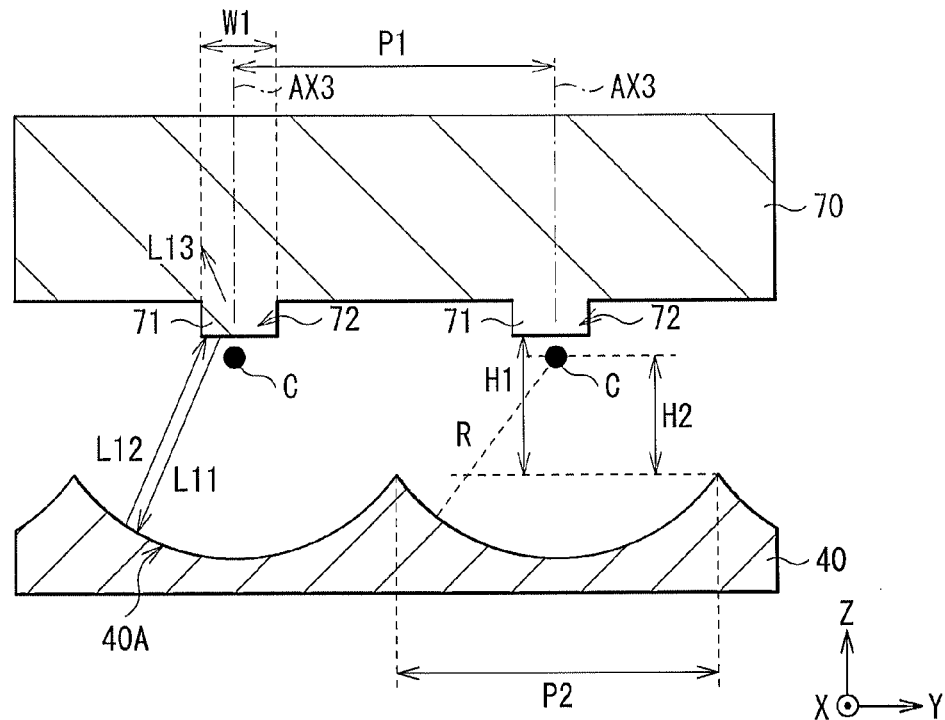
FIG. 55 is a sectional view illustrating a third modification example of the configurations of the light guide plate and the reflective plate in FIG. 49.
Figure 56:
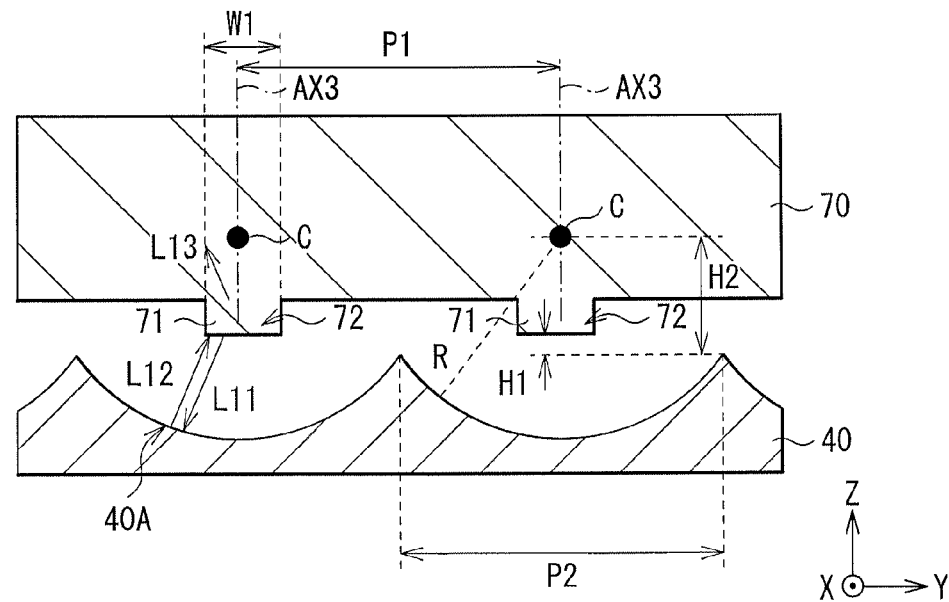
FIG. 56 is a sectional view illustrating a fourth modification example of the configurations of the light guide plate and the reflective plate in FIG. 49.
Figure 57:
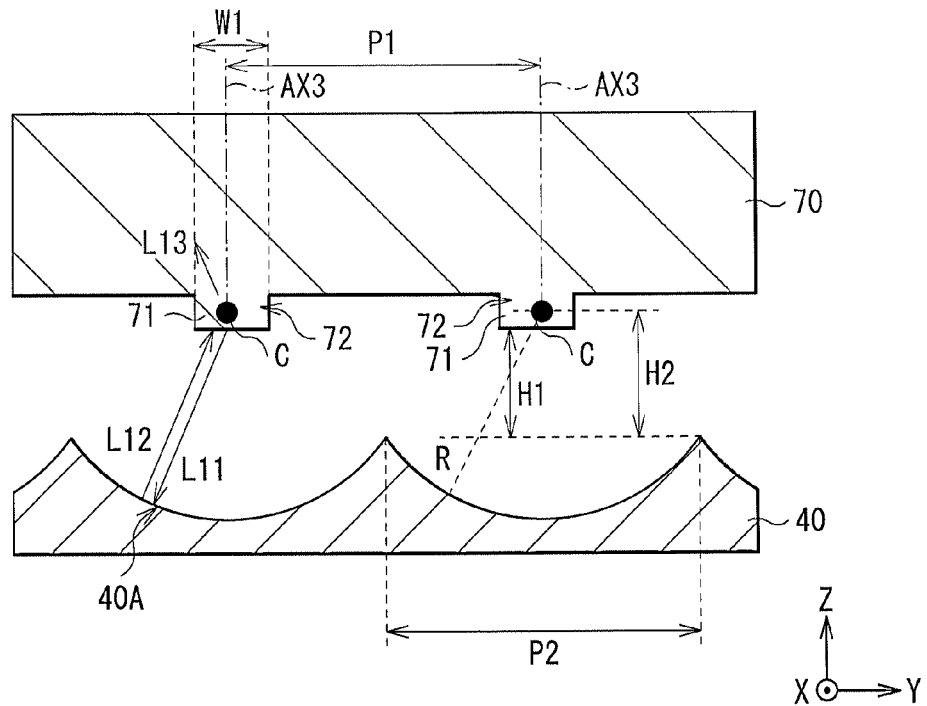
FIG. 57 is a sectional view illustrating a fifth modification example of the configurations of the light guide plate and the reflective plate in FIG. 49.

It is to be noted that, for example, as illustrated in FIGS. 55, 56, and 57, each of the convex sections 71 may be formed on the bottom surface of the light guide plate 70.

In FIG. 55, the distance H2 may be preferably equal to or longer than (H1/nr−W1) and shorter than H1. At this time, in a case where the entire region between the reflective surface 40A and the part (the scattering region 72) that generates linear illumination light is filled with atmospheric air, the distance H2 may be preferably equal to or longer than (H1−W1) and shorter than H1. Moreover, in FIG. 56, the distance H2 may be preferably longer than H1 and equal to or shorter than (H1/nr+W1). At this time, in a case where the entire region between the reflective surface 40A and the part (the scattering region 72) that generates linear illumination light is filled with atmospheric air, the distance H2 may be preferably longer than H1 and equal or shorter than (H1+W1).

In a case where each of the convex sections 71 is formed on the bottom surface of the light guide plate 70, the focal point C may be most preferably located at a position illustrated in FIG. 57 (in the scattering region 72). In a case where the focal point C is located at the position illustrated in FIG. 57, light reflected by the reflective plate 40 directly enters the scattering region 72 without being refracted by the bottom surface of the light guide plate 70; therefore, the illumination unit 3 is easily designed.

It is to be noted that, in this embodiment, the reflective plate 40 may be bonded to the light guide plate 70. For bonding between the reflective plate 40 and the light guide plate 70, entire bonding, outer-region bonding (bonding of a ring-shaped region other than a display region), or spot bonding (spot bonding of a region other than the display region) is considered. In a case where the reflective plate 40 and the light guide plate 70 are entirely bonded together, it is considered that an apex portion of the reflective plate 40 is bonded to the light guide plate 70. At this time, the apex portion of the reflective plate 40 may have a slightly flat surface.

Moreover, in this embodiment, although not illustrated, for example, as illustrated in FIG. 24, the reflective plate 40 may have the black 43 in a part in contact with the light guide plate 70. The black 43 may be, for example, a mixture of an adhesive for fixing the reflective plate 40 to a back surface of the light guide plate 70 with a black pigment.

In this embodiment, linear illumination light is emitted from the scattering region 72 provided to each of the convex sections 71 of the light guide plate 70. At this time, in this embodiment, linear illumination light is reflected by the reflective plate 40 to generate the reflected light L12 focused on a focal point. Thus, the front intensity distribution and the angle intensity distribution of the reflected light L12 are allowed to be brought close to the front intensity distribution and the angle intensity distribution of the light L13 emitted toward a direction opposite to the reflective plate 40 of the linear illumination light. As a result, compared to the case where the top surface of the reflective plate is configured of a flat surface (refer to FIG. 22) and the case where the top surface of the reflective plate is configured of a parabolic surface generating parallel light (refer to FIG. 20), in three-dimensional display, a rate at which the reflected light L13 passes through a region different from the scattering region 72 is allowed to be reduced. Thus, in a case where such an illumination unit 3 is applied as a backlight of a display unit for three-dimensional display, formation of a double image in three-dimensional display is allowed to be reduced. Therefore, display quality in three-dimensional display is improved.

6. Modification Examples of Third Embodiment

In the above-described third embodiment, the reflective plate 40 may be bonded to the light guide plate 70. For bonding between the reflective plate 40 and the light guide plate 70, entire bonding, outer-region bonding (bonding of a ring-shaped region other than a display region), or spot bonding (spot bonding of a region other than the display region) is considered. In a case where the reflective plate 40 and the light guide plate 70 are entirely bonded together, it is considered that an apex portion of the reflective plate 40 is bonded to the light guide plate 70. At this time, the apex portion of the reflective plate 40 may have a slightly flat surface.

Moreover, in the above-described third embodiment, for example, as illustrated in FIG. 24, the reflective plate 40 may have the black 43 in a part in contact with the light guide plate 70. The black 43 may be, for example, a mixture of an adhesive for fixing the reflective plate 40 to the back surface of the light guide plate 70 with a black pigment.

Further, in the above-described third embodiment and the modification examples thereof, in a case where a part of each of the convex sections 71 serves as the scattering region 72, the reflective plate 40 may have a part of a sphere as the reflective surface 40A. At this time, a position facing the scattering region 72 of the reflective plate 40 may be preferably deepest. Even if the reflective plate 40 has such a reflective surface 40A, in a case where the illumination unit 3 is applied as the backlight of the display unit for three-dimensional display, formation of a double image in three-dimensional display is allowed to be reduced. Therefore, display quality in three-dimensional display is improved.

7. Modification Examples Common to Above-described Embodiments

First Common Modification Example

Figure 58:
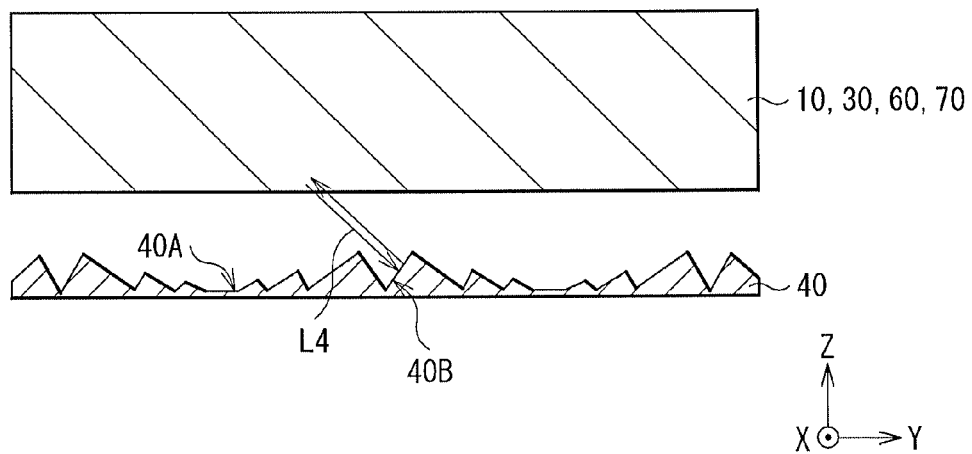
FIG. 58 is a sectional view illustrating a modification example of the configuration of the reflective plate in FIG. 1.

In the above-described respective embodiments and the modification examples thereof, for example, as illustrated in FIG. 58, the reflective surface 40A may be configured of a Fresnel lens. In such a case, light L4 propagating to a region that may convert the light L4 into stray light is allowed to be reflected (retro-reflected), with use of a surface 40B different from an arc-shaped surface of the reflective surface 40A, to a part where the light L4 is generated. As used herein, the "light L4 propagating to a region that may convert the light L4 into stray light" refers to light directly propagating over an arc-shaped surface (a region P2) directly below to an arc-shaped surface adjacent thereto of light emitted from the scattering region 30B, the light source 61a, or the scattering region 72. Moreover, the reflective plate 40 is allowed to be thinner.

Second Common Modification Example

Figure 59:
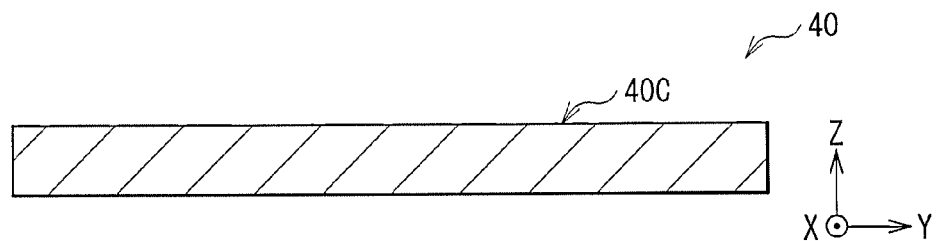
FIG. 59 is a sectional view illustrating another modification example of the configuration of the reflective plate in FIG. 1.

In the above-described respective embodiments and the modification examples thereof, for example, as illustrated in FIG. 59, the reflective plate 40 may have a reflective surface 40C instead of the reflective surface 40A.

The reflective surface 40C is configured to return light from the light source 20 or 60 to the light exit surface of the illumination unit 1, 2, or 3. The reflective surface 40C may have, for example, functions such as reflection, diffusion, and scattering. Therefore, the reflective surface 40C allows light emitted from the light source 20 or 60 to be efficiently used, and is also useful to improve front luminance. A surface with a fine shape of the reflective surface 40C may be preferably a mirror surface. In this case, light emitted from the light source 20 or 60 is allowed to be regularly reflected (specularly reflected), and is allowed to be efficiently reflected to the light exit surface. The reflective plate 40 may be made of, for example, the material described in the above-described embodiments.

When three-dimensional display is performed on the display unit, the reflective surface 40C is configured to recursively reflect light emitted from a part that generates linear illumination light to the part that generates the linear illumination light. It is to be noted that, when three-dimensional display is performed on the display unit, the reflective surface 40C may recursively reflect light emitted from a part that generates linear illumination light that is a group of a plurality of point-like illumination light beams to the part that generates the linear illumination light. Moreover, when two-dimensional display in which two-dimensional images different from each other are viewable from two perspectives is performed on the display unit, the reflective surface 40C may recursively reflect light emitted from a part that generates point-like illumination light to the part that generates the point-like illumination light.

The reflective surface 40C has a convex-concave surface allowing reflected light to pass through a part that generates linear illumination light or point-like illumination light. In a case where a light component parallel to a plane perpendicular to the part that generates linear illumination light of linear illumination light is considered, the reflective surface 40C has a convex-concave surface reflecting reflected light to or close to a line segment passing through the part that generates linear illumination light and being parallel to the normal to the plane including the reflective plate 40. Moreover, in a case where a light component intersecting with the plane perpendicular to the part that generates linear illumination light of the linear illumination light is considered, the reflective plate 40 has a concave-convex surface reflecting light from the linear illumination light to or close to the part that generates the linear illumination light. In this case, in a case where the reflective surface 40C reflects generated light to a part where the light is generated, for example, following expressions may be established. In other words, the reflective surface 40C has a two-dimensional recursive reflection property.

Vector V of light before reflection=(Vx, Vy, Vz)
Vector V of light after reflection=(Vx, −Vy, −Vz)

Figure 60:
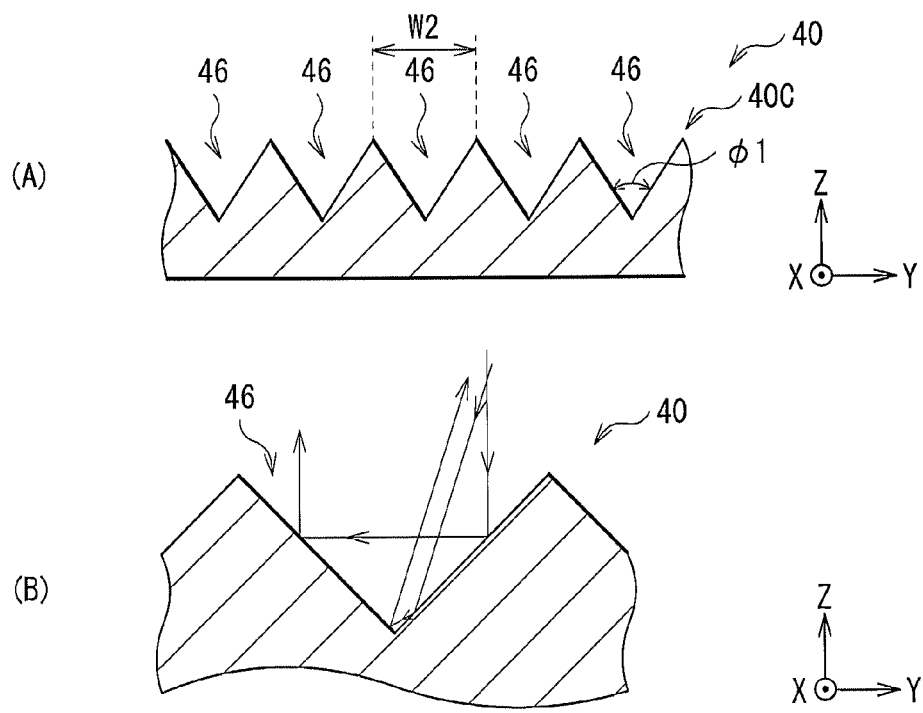
FIGS. 60A and 60B is a sectional view illustrating an example of the configuration of the reflective plate in FIG. 59.

For example, as illustrated in FIG. 60(A), the reflective surface 40C has a plurality of groove sections 46 extending in a direction parallel or substantially parallel to an extending direction of the part that generates linear illumination light (or linear illumination light that is a group of a plurality of point-like illumination light beams). The plurality of groove sections 46 are arranged in a direction intersecting with the extending direction of the groove sections 46. The recursive reflection property in the reflective surface 40C is not changed by a difference in a positional relationship between the groove sections 46 and the part that generates linear illumination light (or the linear illumination light that is a group of a plurality of point-like illumination light beams). Therefore, positions of the groove sections 46 in the reflective surface 40C are allowed to be located irrespective of the position of the part that generates linear illumination light (or the linear illumination light that is a group of a plurality of point-like illumination light beams). Therefore, alignment of the reflective plate 40 is not necessary, except that the extending direction of the groove sections 46 corresponds to the extending direction of the linear illumination light (or the linear illumination light that is a group of a plurality of point-like illumination light beams).

Each of the groove sections 46 is a strip-like depression having an inner surface configured of two flat surfaces combined with each other at a predetermined angle, and, for example, as illustrated in FIG. 60(A), each of the groove section 46 has a strip-like concave shape having, in an inner wall thereof, a part including an apex of an inner surface of a triangular prism with a width W2 and an apex angle θ1. For example, as illustrated in FIG. 60(B), as a result of reflecting light twice on the flat surfaces of the groove section 46, the groove section 46 returns incident light from the arrangement direction of the groove sections 46 to a direction where the incident light came. Thus, the groove section 46 recursively reflects the incident light from the arrangement direction of the groove sections 46. Therefore, the groove sections 46 are capable of recursively reflecting linear light (or linear light that is a group of a plurality of point-like light beams). However, an optical path of reflected light is slightly displaced from an optical path of incident light during reflection. Displacement of the optical path may cause reduction in luminance or contrast; therefore, the width W2 of the groove section 46 may be preferably reduced as small as possible so as to keep the optical path of the reflected light and the optical path of the incident light as close as possible. However, when the width W2 is too narrow, there is a possibility that diffraction occurs. Therefore, it is found out that the width W2 has a preferable range. More specifically, the width W2 may be preferably twice or less as large as a width W1 of the part that generates linear illumination light, and more preferably equal to or smaller than (W1−1/2).

Figure 61:
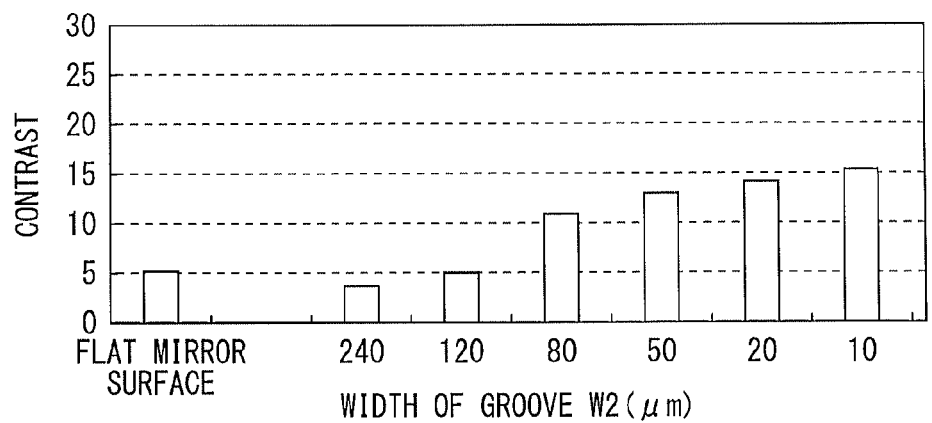
FIG. 61 is a diagram illustrating an example of a relationship between a width of a groove in the reflective plate in FIG. 60 and contrast.

FIG. 61 illustrates an example of a relationship between the width W2 of the groove section 46 and contrast when the groove section 46 has the above-described concave shape and W1 is 45 μm. As can be seen from FIG. 61, contrast is sharply changed when the width W2 is within a range of 80 μm to 120 μm both inclusive. Therefore, in a relationship in a case where the reflective surface is a flat and mirror surface, the width W2 may be preferably equal to or smaller than (W1×2). Moreover, as can be seen from FIG. 61, when the width W2 is around 20 μm, a rise in contrast starts being saturated. Therefore, the width W2 may be preferably equal to or smaller than (W1×1/2).

Figure 62:
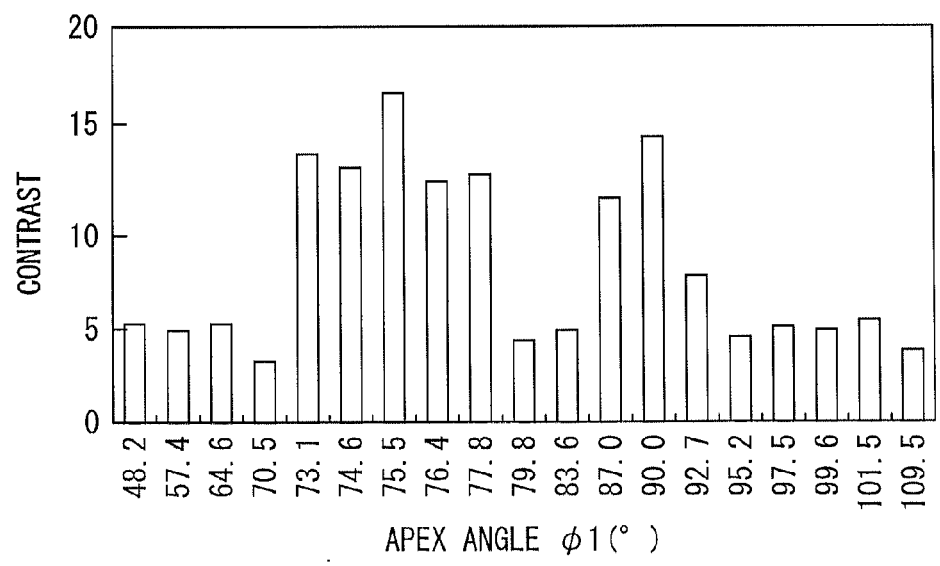
FIG. 62 is a diagram illustrating an example of a relationship between an apex angle in the reflective plate in FIG. 60 and contrast.

The apex angle ϕ1 may be preferably 90°. FIG. 62 illustrates an example of a relationship between the apex angle ϕ1 and contrast. As can be seen from FIG. 62, the apex angle ϕ1 may be preferably within a range of 90°±3° (from 87° to 93° both inclusive). It is to be noted that in a case where the apex angle ϕ1 is 75.5° or within a range of 75.5°±3° (from 72.5° to 78.5° both inclusive), as in a case where the apex angle ϕ1 is 90° or within a range of 90°±3° (from 87° to 93° both inclusive), the reflective surface 40C performs reflection with less stray light, compared to a case where the reflective surface is a flat surface. However, in a case where the apex angle ϕ1 is 75.5° or within a range of 75.5°±3° (from 72.5° to 78.5° both inclusive), the reflective surface 40C performs reflection on a principle different from recursive reflection. Therefore, the case where the apex angle ϕ1 is 75.5° or within a range of 75.5°±3° (from 72.5° to 78.5° both inclusive) will be described in a following third common modification example.

FIG. 63 illustrates an example of luminance (3D luminance) and contrast when three-dimensional display was performed on a display unit to which the illumination unit 1, 2, or 3 according to this modification example was applied and a calculation result of luminance (2D luminance) when two-dimensional display was performed on the display unit to which the illumination unit 1, 2, or 3 was applied. In FIG. 63, in Example 1, a width W1 of linear illumination light (or linear illumination light that was a group of a plurality of point-like light beams) was 45 μm, a substrate located closer to the reflective plate 40 of the liquid crystal panel was a glass substrate with a thickness of 0.7 mm, a substrate on a light exit side of the liquid crystal panel was a glass substrate with a thickness of 0.2 mm, and the width W2 of the groove section 46 was 20 μm. Moreover, in FIG. 63, in Comparative Example 1, a light absorption plate was provided instead of the reflective plate 40 in Example 1, and in Comparative Example 2, a reflective plate with a flat and mirror surface was provided instead of the reflective plate 40 in Example 1.

As can be seen from FIG. 63, when the configuration in Example 1 is adopted, compared to Comparative Example 2 using the reflective plate with a flat and mirror surface, reduction in contrast is allowed to be suppressed, and luminance substantially equal to that in Comparative Example 2 is allowed to be obtained.

Next, functions and effects of the display unit according to this modification example will be described below. In this modification example, linear illumination light is emitted from the part that generates linear illumination light (or linear illumination light that is a group of a plurality of point-like illumination light beams). At this time, the linear illumination light is reflected by the reflective plate 40 to generate recursively reflected light. Thus, a front intensity distribution and an angle intensity distribution of the reflected light are allowed to be brought close to a front intensity distribution and an angle intensity distribution of light emitted toward a direction opposite to the reflective plate 40 of the linear illumination light. As a result, compared to the case where the top surface of the reflective plate is configured of a flat surface (refer to FIG. 22) and the case where the top surface of the reflective plate is configured of a parabolic surface generating parallel light (refer to FIG. 20), in three-dimensional display, a rate at which the reflected light passes through a region different from the part that generates linear illumination light (or linear illumination light that is a group of a plurality of point-like illumination light beams) to exit from the top surface is allowed to be reduced. Thus, in a case where such an illumination unit is applied as a backlight of a display unit for three-dimensional display, formation of a double image in three-dimensional display is allowed to be reduced. Moreover, as can be seen from FIG. 63, while reduction in contrast is suppressed, high luminance is allowed to be obtained. Therefore, display quality in three-dimensional display is improved.

Third Common Modification Example

In the above-described second common modification example, the apex angle φ1 may be an angle out of a range of 90°±3°. More specifically, the apex angle φ1 is an angle within a range where light emitted from a part (a first part) that generates linear illumination light is reflected to a part (a second part) that generates linear illumination light and is adjacent to the first part. For example, in a case where a pitch of the part that generates linear illumination light is 240 μm, and a distance H2 between the part that generates linear illumination light and the reflective surface 40C is 700 μm, the apex angle φ1 is 75.5° or within a range of 75.5°±3° (from 72.5° to 78.5° both inclusive). It is to be noted that, as illustrated in FIG. 64, the first part and the second part each correspond to the scattering region 30B, the light source 61a, or the scattering region 72.

Also, in this modification example, the reflective surface 40C is configured to reflect reflected light to or close to the plane passing through the part (30B, 61a, or 72) that generates linear illumination light and being perpendicular to the plane including the reflective plate 40. More specifically, in a case where a light component parallel to a plane perpendicular to the part (30B, 61a, or 72) that generates linear illumination light of linear illumination light is considered, the reflective plate 40 has a convex-concave shape generating reflected light focused on a focal point located on or near a line segment passing through the part (30B, 61a, or 72) that generates linear illumination light and being parallel to a normal to the plane including the reflective plate 40. Moreover, in a case where a light component intersecting with the plane perpendicular to the part (30B, 61a, or 72) that generates linear illumination light of linear illumination light is considered, the reflective plate 40 has a convex-concave shape reflecting light from the linear illumination light to or close to the part (30B, 61a, or 72) that generates the linear illumination light.

Figure 64:
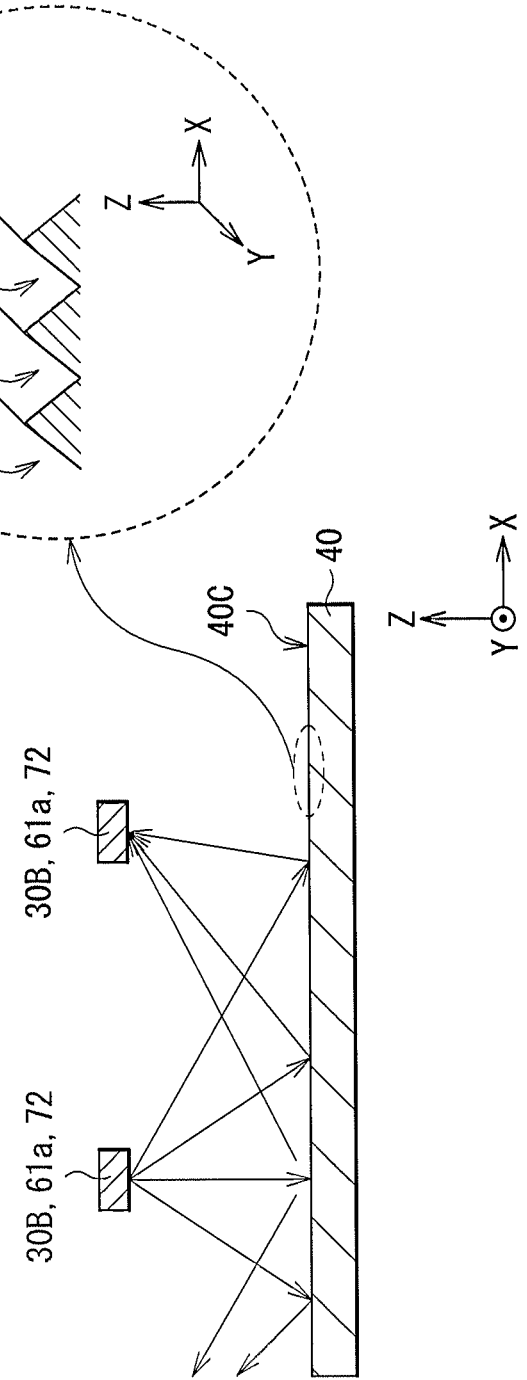
FIG. 64 is a diagram illustrating an example of a function of the reflective plate when an apex angle of the groove is different from 90° in FIG. 60.
Figure 65:
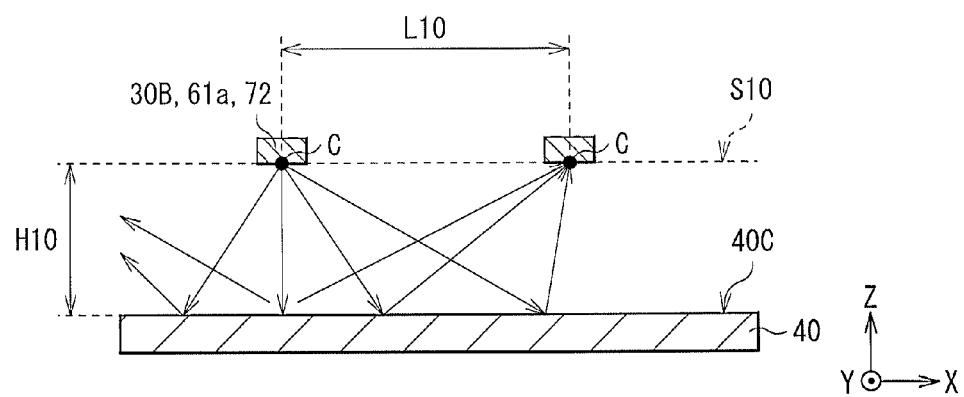
FIG. 65 is a diagram for describing reflected light when the reflective plate in FIG. 64 is used.
Figure 66:
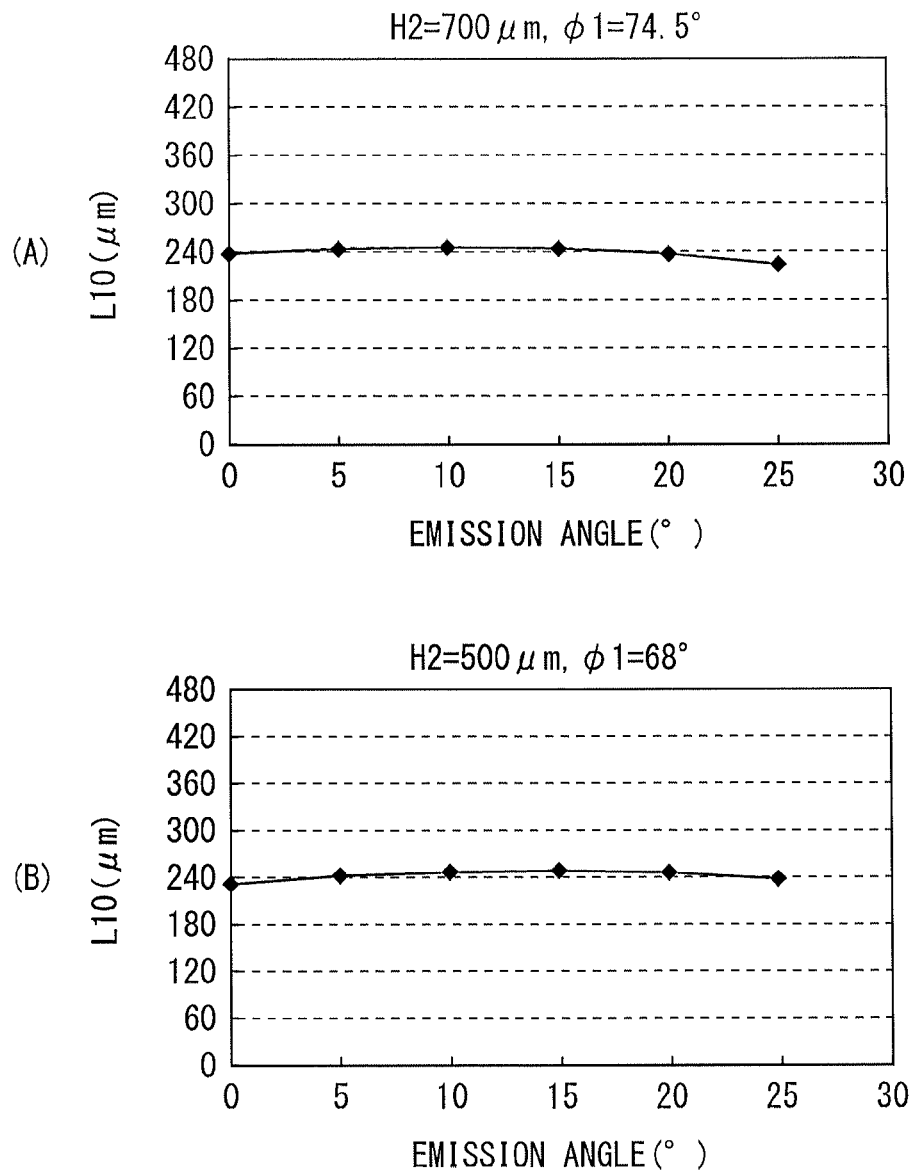
FIGS. 66A and 66B is a diagram illustrating an example of a relationship between H10 and L10 when the reflective plate in FIG. 64 is used.

In this modification example, as illustrated in FIG. 64, as an incident angle with respect to the reflective surface 40C is larger, the reflective surface 40C reflects light emitted from the first part at an angle closer to the right angle (a smaller exit angle). In this case, as illustrated in FIG. 65, a distance between the part (30B, 61a, or 72) that generates linear illumination light and the reflective surface 40C is H10, and a distance between the part (30B, 61a, or 72) that generates the linear illumination light and a point where light emitted from the part (30B, 61a, or 72) that generates the linear illumination light is reflected by the reflective surface 40C to reach a surface S10 including the part (30B, 61a, or 72) that generates the linear illumination light again is L10. At this time, a relationship between an emission angle of light emitted the part (30B, 61a, or 72) that generates the linear illumination light and the distance L10 is as illustrated in FIGS. 66(A) and (B). FIG. 66(A) illustrates a case of H2=700 μm and φ1=74.5°, and FIG. 66(B) illustrates a case of H2=500 μm and φ1=68°. As can be seen from FIGS. 66(A) and (B), L10 is substantially constant, irrespective of the emission angle.

Figure 67:
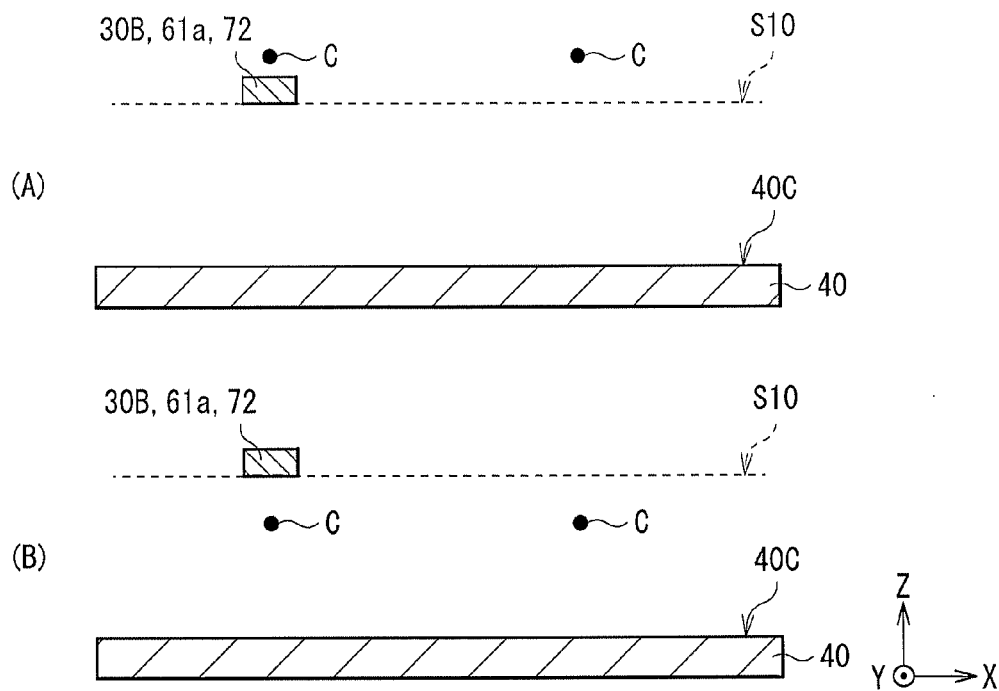
FIGS. 67A and 67B is a diagram for describing a focal point of the reflective plate in FIG. 64.

In other words, in this modification example, in a case where there is no boundary at which a refractive index changes between the part that generates linear illumination light and the reflective surface 40C, the part (the focal point C) where reflected light is focused serves as the part (30B, 61a, or 72) that generates linear illumination light. On the other hand, in this modification example, in a case where there is one boundary at which the refractive index changes between the part that generates linear illumination light and the reflective surface 40C, for example, as illustrated in FIGS. 67(A) and (B), the part (the focal point C) where reflected light is focused is located above or below the part (30B, 61a, or 72) that generates linear illumination light. Moreover, in a case where the refractive index changes in order of high, low, and high between the part that generates linear illumination light and the reflective plate 40, the part (the focal point C) where reflected light is focused serves as the part (30B, 61a, or 72) that generates linear illumination light.

Figure 68:
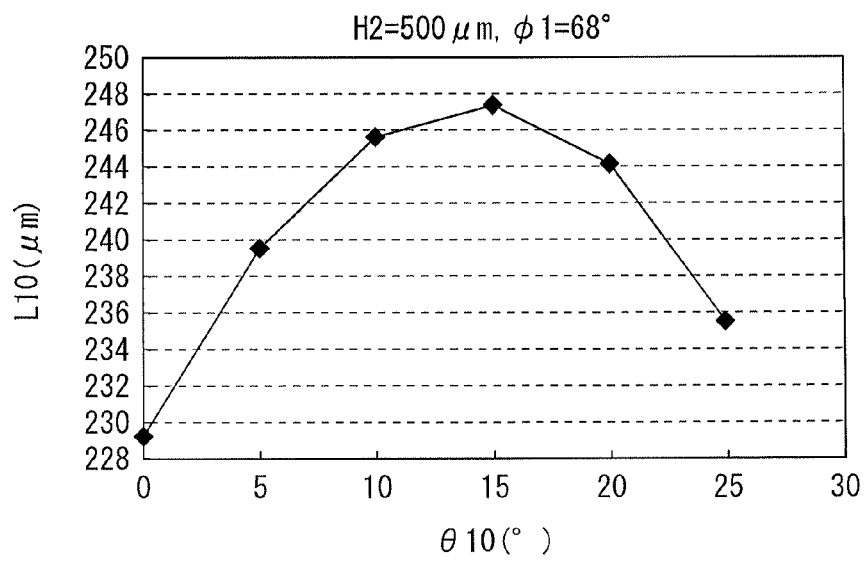
FIG. 68 is a diagram illustrating an example of a relationship between θ10 and L10 when the reflective plate in FIG. 64 is used.
Figure 69:
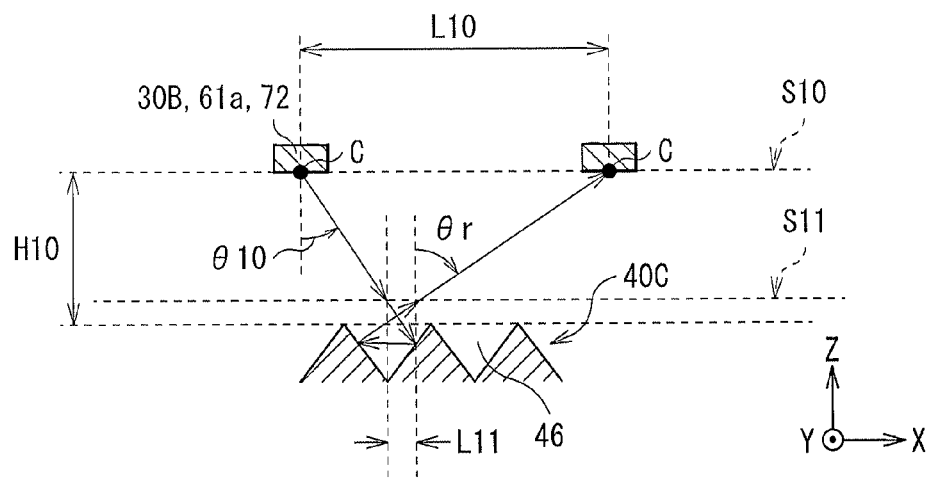
FIG. 69 is a diagram for describing a position where light that is to be incident on the reflective plate in FIG. 69 passes and a position where light reflected by the reflective plate passes.

Incidentally, in a case of H2=500 μm and φ1=68°, a relationship between the above-described distance L10 and an emission angle θ10 of light emitted from the part (30B, 61a, or 72) that generates linear illumination light may be, for example, as illustrated in FIG. 68. As can be seen from FIG. 68, the distance L10 is increased with an increase in the emission angle θ10, and reaches a peak around 15°, and is gradually decreased when the emission angle θ10 is equal to or larger than this angle. Actually, an average of the emission angle θ10 is about 5°. Therefore, the distance L10 is represented by an expression (A), where the emission angle θ10 is 5°, an emission angle of reflected light after reflected light generated by reflecting light emitted from the part (30B, 61a, or 72) that generates linear illumination light passes through the top surface of the reflective plate 40 is θr. At this time, sin(θr) is represented by an expression (B); therefore, θr is represented by an expression (C). It is to be noted that "n" in the expressions (B) and (C) is a refractive index around the part (30B, 61a, or 72) that generates linear illumination light. As illustrated in FIG. 69, in a case where there is a boundary surface S11 where a refractive index changes between the part (30B, 61a, or 72) that generates linear illumination light and the reflective surface 40C, "n" in the expressions (B) and (C) is represented by a relative refractive index (n3/n4). As used herein, the term "n3" is a refractive index of a material with which a region between the part (30B, 61a, or 72) that generates linear illumination light and the boundary surface S11 is filled. The term "n4" is a refractive index between the reflective surface 40C and the boundary surface S11. Incidentally, in a precise sense, a position where light emitted from the part (30B, 61a, or 72) that generates linear illumination light passes through the boundary surface S11 and a position where reflected light passes through the boundary surface S11 are different from each other. However, the distance L11 is much narrower than the width of the groove section 46, and compared to the distance L10, the distance L11 is vanishingly small.

$$L10 = H10 \times \sin(5°) + H10 \times \sin(\theta r) \quad (A)$$

$$\sin(\theta r) = (1/n) \times \sin(180 - 2\theta r - \arcsin[(1/n) \times \sin(5°)]) \quad (B)$$

$$\theta r = 90 - (1/2) \times [\arcsin[n \times (L10/H10 - \sin(5°)) + \arcsin[(1/n) \times \sin(5°)]] \quad (C)$$

Next, functions and effects of the display unit according to this modification example will be described below. In this modification example, linear illumination light is emitted from the part that generates linear illumination light (or linear illumination light that is a group of a plurality of point-like illumination light beams). At this time, light emitted from the part (the first part) that generates linear illumination light is reflected to the part (the second part) that generates linear illumination light and is adjacent to the first part. Thus, a front intensity distribution and an angle intensity distribution of the reflected light are allowed to be brought close to a front intensity distribution and an angle intensity distribution of light emitted toward a direction opposite to the reflective plate 40 of the linear illumination light. As a result, compared to the case where the top surface of the reflective plate is configured of a flat surface (refer to FIG. 22) and the case where the top surface of the reflective plate is configured of a parabolic surface generating parallel light (refer to FIG. 20), in a three-dimensional display, a rate at which the reflected light passes through a region different from the part that generates linear illumination light (or linear illumination light that is a group of a plurality of point-like illumination light beams) to exit from the top surface is allowed to be reduced. Thus, in a case where such an illumination unit is applied as a backlight of a display unit for three-dimensional display, formation of a double image in three-dimensional display is allowed to be reduced. Moreover, as with the second common modification example, while reduction in contrast is suppressed, high luminance is allowed to be obtained. Therefore, display quality in three-dimensional display is improved.

Fourth Common Modification Example

Figure 70:
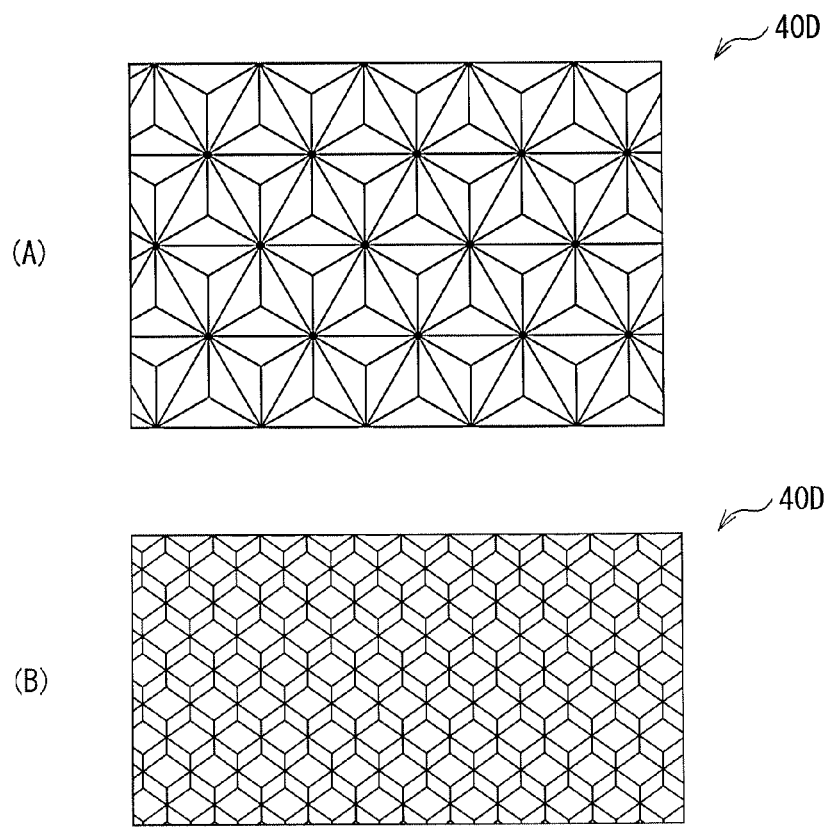
FIGS. 70A and 70B is a plan view illustrating another example of the configuration of the reflective plate in FIG. 59.

In the above-described second common modification example, a reflective surface 40D may be provided instead of the reflective surface 40C. For example, as illustrated in FIG. 70(A) or FIG. 70(B), the reflective surface 40D may have a shape in which a large number of corner cubes are close-packed in a plane. Each of the corner cubes is a depression having an inner surface configured of three flat surfaces combined with one another at a predetermined angle φ2. The corner cube illustrated in FIG. 70(A) is a depression having an inner surface configured of three triangular flat surfaces combined with one another at the predetermined angle φ2. A hole of the corner cube at this time also has a triangular shape. The corner cube illustrated in FIG. 70(B) is a depression having an inner surface configured of three square flat surfaces combined with one another at the predetermined angle φ2. A hole of the corner cube at this time has a hexagonal shape.

Figure 71:
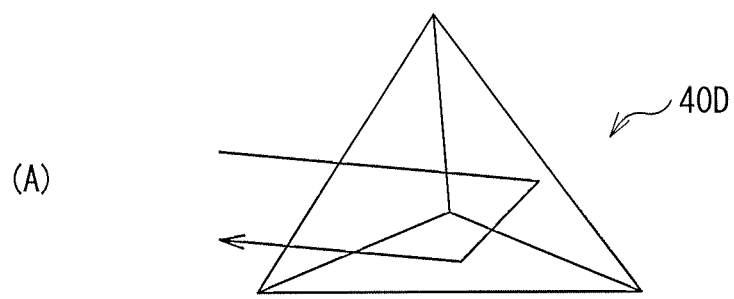
FIGS. 71A and 71B is a diagram illustrating an example of a function of the reflective plate in FIG. 70.
Figure 71:
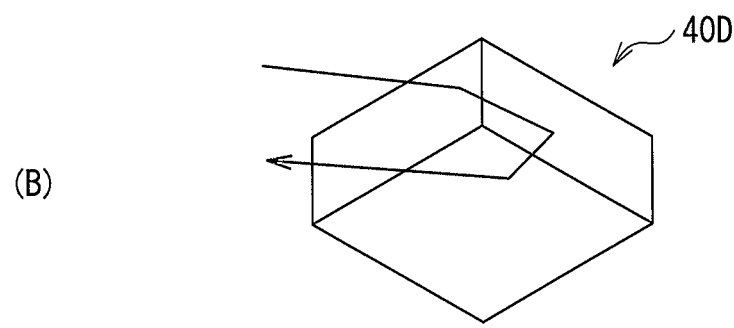

For example, as illustrated in FIGS. 71(A) and (B), as a result of reflecting light three times on the flat surfaces of the corner cube, the corner cube returns incident light from an arbitrary direction to a direction where the light came. Thus, the corner cube three-dimensional-recursively reflects the incident light from the arbitrary direction. Therefore, the corner cubes are capable of recursively reflecting not only linear light but also point-like light. This may be represented by, for example, following expressions.

Vector V of light before reflection=(Vx, Vy, Vz)
Vector V of light after reflection=(−Vx, −Vy, −Vz)

However, an optical path of reflected light is slightly displaced from an optical path of incident light during reflection. Displacement of the optical path may cause reduction in luminance or contrast; therefore, a pitch of the corner cube may be preferably reduced as small as possible so as to keep the optical path of the reflected light and the optical path of the incident light as close as possible. However, when the pitch of the corner cube is too narrow, there is a possibility that diffraction occurs. Therefore, it is found out that the pitch of the corner cube may have a preferable range. More specifically, the pitch of the corner cube may be preferably twice or less as large as the width W1 of the part that generates linear illumination light (or linear illumination light that is a group of a plurality of point-like illumination light beams), and more preferably equal to or smaller than (W1×½).

Figure 72:
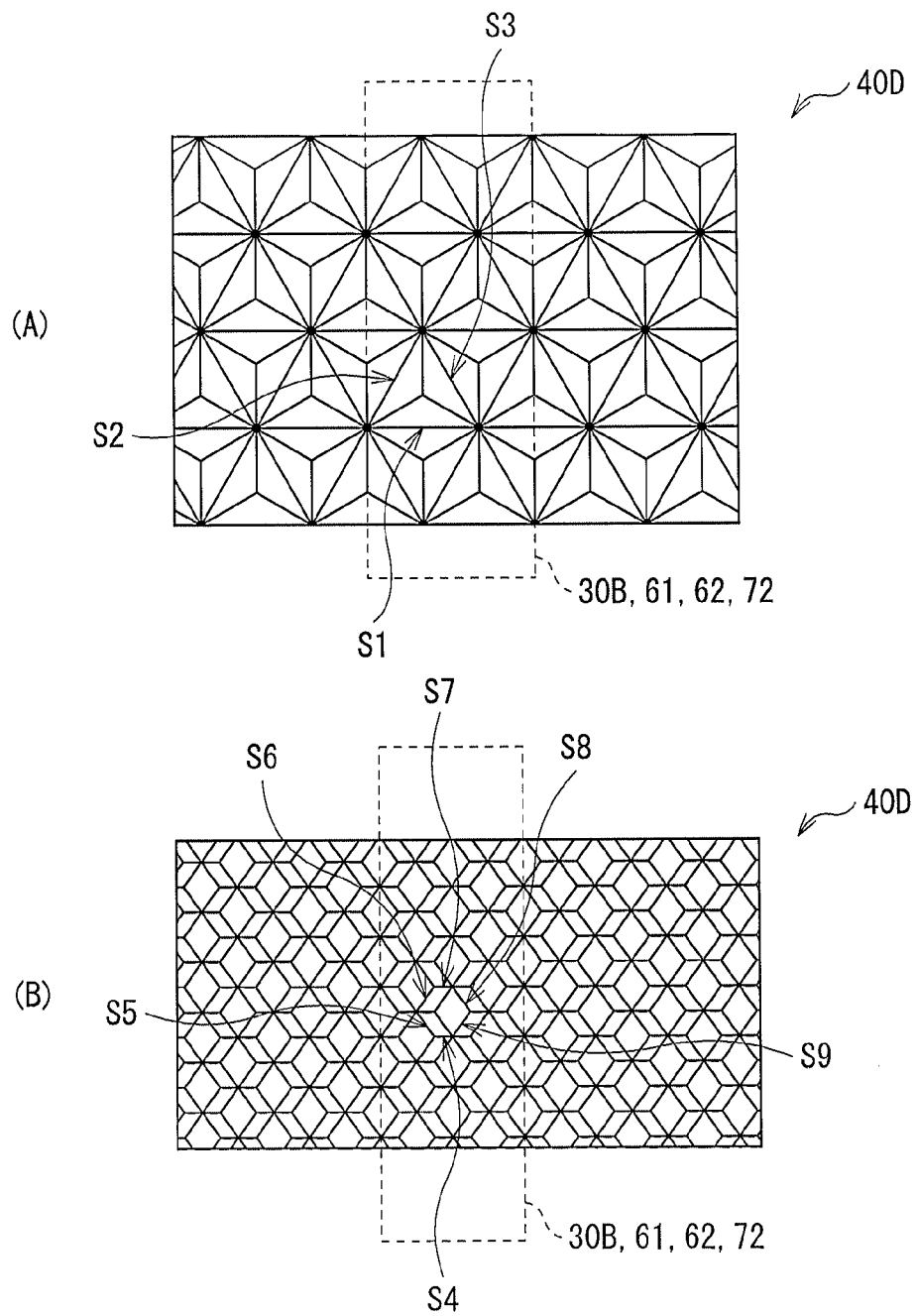
FIGS. 72A and 72B is a diagram illustrating an example of a positional relationship between the reflective plate and a linear light source in FIG. 70.

For example, as illustrated in FIGS. 72(A) and (B), the corner cubes may be so arranged as to allow an extending direction of each of side sections of the holes of the corner cubes and an extending direction of the part (30B, 61, 62, or 72) that generates linear illumination light (or linear illumination light that is a group of a plurality of point-like illumination light) to intersect with each other. At this time, for example, as illustrated in FIG. 72(A), the corner cubes may be preferably so arranged as to allow an extending direction of one side section S1 of three side sections S1 to S3 configuring the hole of each of the corner cubes and the extending direction of the part (30B, 61, 62, or 72) that generates linear illumination light (or linear illumination light that is a group of a plurality of point-like illumination light beams) to be orthogonal to each other. Moreover, for example, as illustrated in FIG. 72(B), the corner cubes may be preferably so arranged as to allow an extending direction of two side sections S4 and S7 of six side sections S4 to S9 configuring the hole of each of the corner cubes and the extending direction of the part (30B, 61, 62, or 72) that generates linear illumination light (or linear illumination light that is a group of a plurality of point-like illumination light beams) to be orthogonal to each other.

Figure 73:
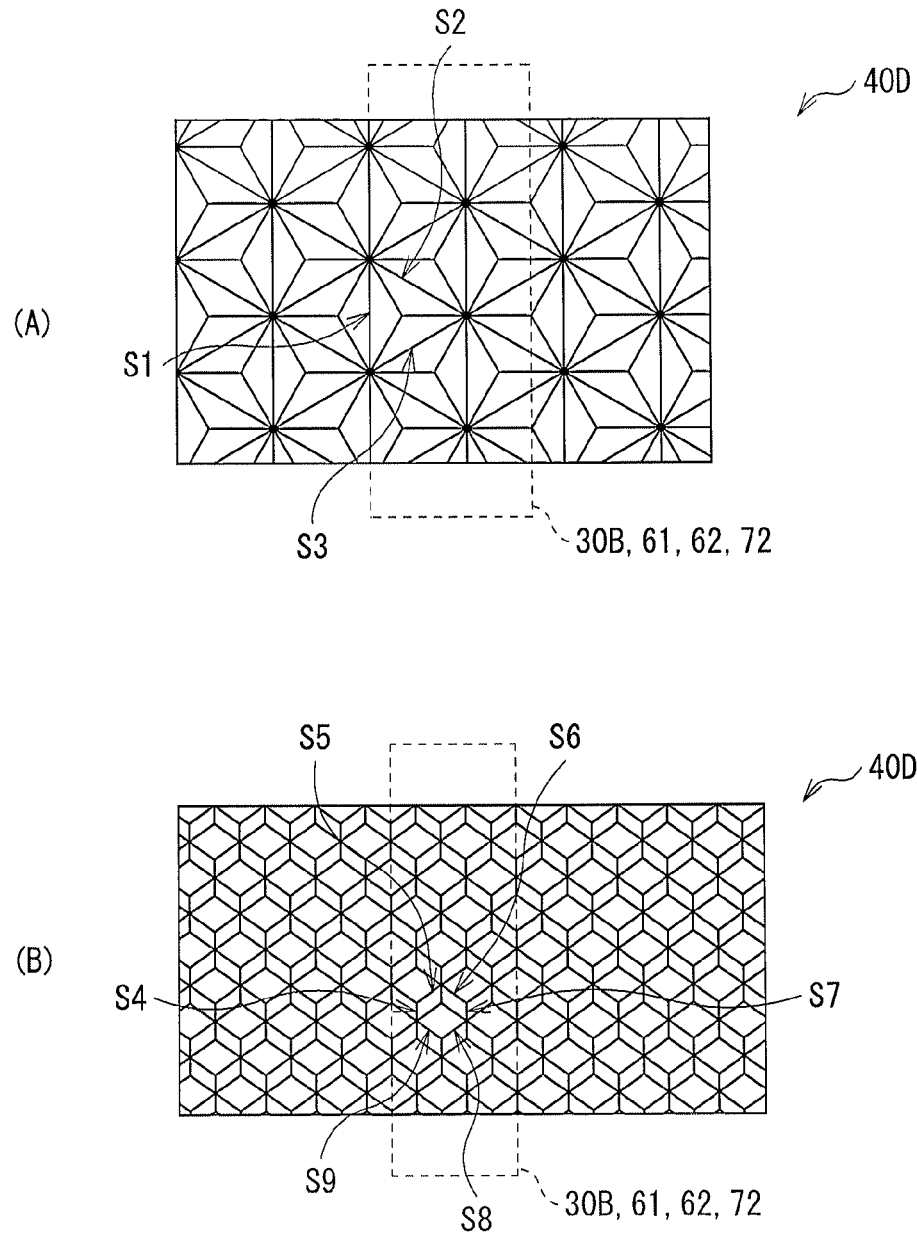
FIGS. 73A and 73B is a diagram illustrating another example of the positional relationship between the reflective plate and the linear light source in FIG. 70.

For example, as illustrated in FIG. 73(A), the corner cubes may be so arranged as to allow an extending direction of one side section S1 of three side sections S1 to S3 configuring the hole of each of the corner cubes and the extending direction of the part that generates linear illumination light (or linear illumination light that is a group of a plurality of point-like illumination light beams) to be parallel to each other. For example, as illustrated in FIG. 73(B), the corner cubes may be so arranged as to allow an extending direction of two side sections S4 and S7 of six side sections S4 to S9 configuring the hole of each of the corner cubes and the extending direction of the part that generates linear illumination light (or linear illumination light that is a group of a plurality of point-like illumination light beams) to be parallel to each other.

A recursive reflection property in the corner cube is not changed by a difference in a positional relationship between the corner cubes and the part that generates linear illumination light (or the linear illumination light that is a group of a plurality of point-like illumination light beams). Therefore, the positions of the corner cubes in the reflective surface 40D are allowed to be located irrespective of the position of the part that generates linear illumination light (or the linear illumination light that is a group of a plurality of point-like illumination light beams). Therefore, alignment of the reflective plate 40 is not necessary, except that the extending direction of the side sections of the holes of the corner cubes is directed to the above-described direction with respect to the extending direction of linear illumination light (or linear illumination light that is a group of a plurality of point-like illumination light beams).

Figure 74:
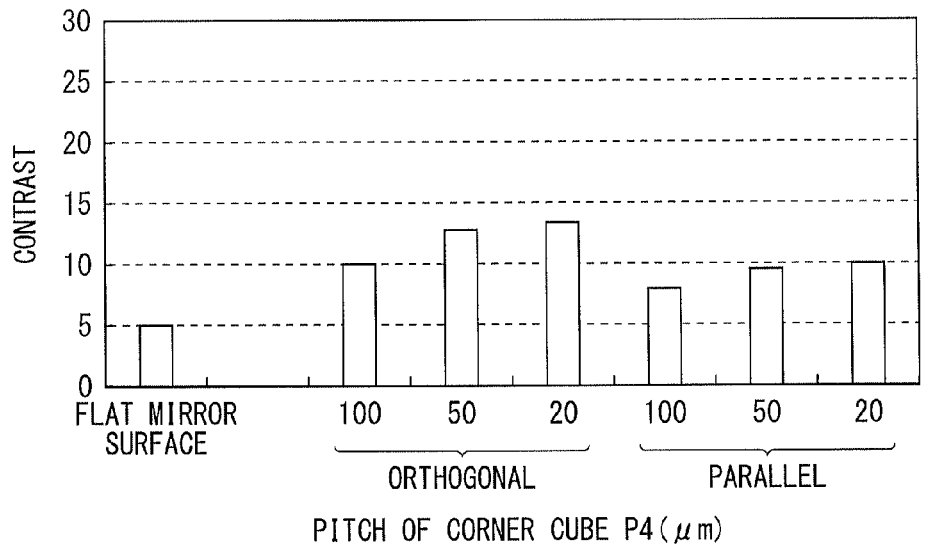
FIG. 74 is a diagram illustrating an example of a relationship between a pitch in the reflective plates in FIGS. 72 and 73 and contrast.

FIG. 74 illustrates an example of a relationship between the pitch of the corner cube and contrast when the corner cube is a depression having an inner surface configured of three right-triangular flat surfaces combined with one another at the right angle and W1 is 45 µm. It is to be noted that, "orthogonal" in FIG. 74 indicates a result in a case where the corner cubes are so arranged as to allow the extending direction of one side section S1 (or two side sections S) of the hole of each of the corner cubes and the extending direction of the part (30B, 61, 62, or 72) that generates linear illumination light (or linear illumination light that is a group of a plurality of point-like illumination light beams) to be orthogonal to each other. Moreover, "parallel" in FIG. 74 indicates a result in a case where the corner cubes are so arranged as to allow the extending direction of one side section S1 (or two side sections S) of the hole of each of the corner cubes and the extending direction of the part (30B, 61, 62, or 72) that generates linear illumination light (or linear illumination light that is a group of a plurality of point-like illumination light beams) to be parallel to each other.

As can be seen from FIG. 74, in the "orthogonal" case, high contrast is obtained, compared to the "parallel" case. Moreover, as can be seen from FIG. 74, when the pitch of the corner cube is 100 µm or less, high contrast is obtained. Further, as can be seen from FIG. 74, when the pitch of the corner cube is less than 100 µm, contrast higher than 10 is obtained. Therefore, the pitch of the corner cube may be preferably 100 µm or less, and more preferably equal to or smaller than (W1×2). Furthermore, as can be seen from FIG. 74, when the pitch of the corner cube is around 20 µm, a rise in contrast starts being saturated. Therefore, the pitch of the corner cube may be preferably (W1×½) or less.

Figure 75:
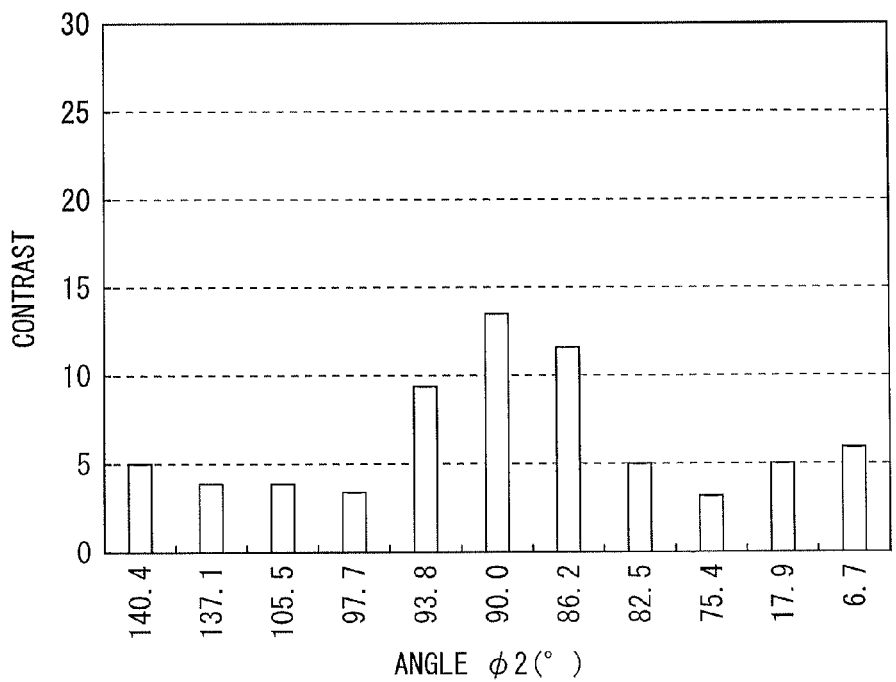
FIG. 75 is a diagram illustrating an example of a relationship between an angle in the reflective plates in FIGS. 72 and 73 and contrast.

The angle $\phi2$ of the corner cube may be preferably 90°. FIG. 75 illustrates an example of a relationship between the angle $\phi2$ and contrast when W1 is 45 µm and the pitch of the corner cube is 20 µm. It is to be noted that the corner cube is a depression having an inner surface configured of three right-rectangular flat surfaces combined with one another at the right angle. Moreover, the corner cubes are so arranged as to allow the extending direction of one side section of the hole of each of the corner cubes and the extending direction of the part that generates linear illumination light (or linear illumination light that is a group of a plurality of point-like illumination light beams) to be orthogonal to each other. As can be seen from FIG. 75, the angle $\phi2$ may be preferably 90°±3.8°.

FIG. 76 illustrates an example of luminance (3D luminance) and contrast when three-dimensional display was performed on a display unit to which the illumination unit 1, 2, or 3 according to this modification example was applied and a calculation result of luminance (2D luminance) when two-dimensional display was performed on the display unit to which the illumination unit 1, 2, or 3 was applied. In FIG. 76, in Example 2, the width W1 of linear illumination light (or linear illumination light that is a group of a plurality of point-like light beams) was 45 µm, a substrate located closer to the reflective plate 40 of the liquid crystal panel was a glass substrate with a thickness of 0.7 mm, a substrate on a light exit side of the liquid crystal panel was a glass substrate with a thickness of 0.2 mm, and the pitch of the corner cube was 20 µm. It is to be noted that, in Example 2, each of the corner cubes was a depression having an inner surface configured of three right-triangular flat surfaces combined with one another at the right angle. Moreover, the corner cubes were so arranged as to allow the extending direction of one side section of the hole of each of the corner cubes and the extending direction of the part that generates linear illumination light (or linear illumination light that was a group of a plurality of point-like illumination light beams) to be orthogonal to each other. Further, in FIG. 76, in Comparative Example 3, a light absorption plate was provided instead of the reflective plate 40 in Example 2, and in Comparative Example 4, a reflective plate with a flat and mirror surface was provided instead of the reflective plate 40 in Example 2.

As can be seen from FIG. 76, when a configuration in Example 2 is adopted, compared to Comparative Example 4 using the reflective plate having a flat and mirror surface, reduction in contrast is allowed to be suppressed, and luminance substantially equal to that in Comparative Example 4 is allowed to be obtained.

Next, functions and effects of the display unit according to this modification example will be described below. In this modification example, linear illumination light is emitted from the part that generates linear illumination light (or linear illumination light that is a group of a plurality of point-like illumination light beams). At this time, the linear illumination light is reflected by the reflective plate 40 to generate recursively reflected light. Thus, a front intensity distribution and an angle intensity distribution of the reflected light are allowed to be brought close to a front intensity distribution and an angle intensity distribution of light emitted toward a direction opposite to the reflective plate 40 of the linear illumination light. As a result, compared to the case where the top surface of the reflective plate is configured of a flat surface (refer to FIG. 22) and the case where the top surface of the reflective plate is configured of a parabolic surface generating parallel light (refer to FIG. 20), in three-dimensional display, a rate at which the reflected light passes through a region different from the part that generates linear illumination light (or linear illumination light that is a group of a plurality of point-like illumination light beams) to exit from the top surface is allowed to be reduced. Thus, in a case where such an illumination unit is applied as a backlight of a display unit for three-dimensional display, formation of a double image in three-dimensional display is allowed to be reduced. Moreover, as can be seen from FIG. 76, while reduction in contrast is suppressed, high luminance is allowed to be obtained. Therefore, display quality in three-dimensional display is improved.

Fifth Common Modification Example

Figure 77:
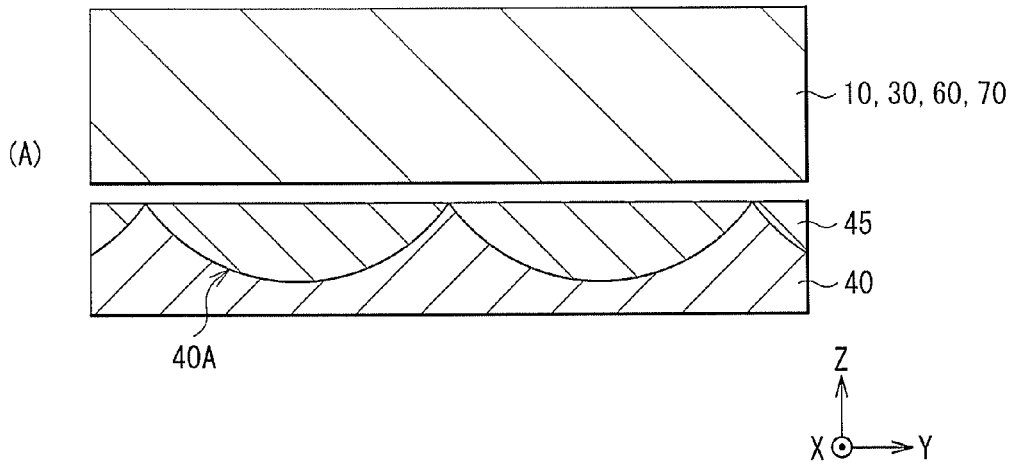
FIGS. 77A and 77B is a sectional view illustrating another modification example of the configuration of the reflective plate in FIG. 1.

Moreover, in the above-described respective embodiments and the modification examples thereof, for example, as illustrated in FIGS. 77(A) and 77(B), the reflective plate 40 may have an embedding layer 45 allowing the top surface of the reflective plate 40 to be planarized and being embedded in the reflective surface 40A. However, in this case, it is necessary to have a gap (atmospheric air) between the embedding layer 45 and the light guide plate 10, the light modulation device 30, the light source 60, or the light guide plate 70.

In this case, a refractive index of a region between the back surface of the light guide plate 10 (or the transparent substrate 31) and the position of the focal point C is n5, a refractive index between the reflective surface 40A and the top surface of the reflective plate 40 is n6, and nr=n5/n6. At this time, in a case where the focal point C is located directly below the part (30B, 61, 62, or 72) that generates linear illumination light (or linear illumination light that is a group of a plurality of point-like illumination light beams), the distance H2 may be preferably equal to or longer than (H1/nr−W1), and shorter than H1. In a case where the focal point C is located directly above the part (30B, 61, 62, or 72) that generates linear illumination light (or linear illumination light that is a group of a plurality of point-like illumination light beams), the distance H2 may be preferably longer than H1, and equal to or shorter than (H1/nr+W1). It is to be noted that a thickness of the gap (atmospheric air) located directly above the embedding layer 45 is vanishingly small in a relationship with the distance H2.

In a case of n5=n6, an optical path of light L11 emitted from the scattering region 30B, the light source 61a, or the scattering region 72 and an optical path of light L12 reflected by the reflective plate 40 are parallel to each other. Therefore, in a case where reflected light is focused on a focal point, the focal point C may be most preferably located in the scattering region 30B, the light source 61a, or the scattering region 72. On the other hand, in a case of n5≠n6, the focal point C may be most preferably located at a position satisfying H2=H1/nr.

Moreover, in this modification example, the planarized top surface of the reflective plate 40 may be preferably subjected to anti-reflection processing. It is because reflection on the top surface other than recursive reflection by shape is allowed to be reduced. As the anti-reflection processing, for example, coating or sputtering with an antireflective film or formation of a fine shape such as a moth eye shape may be considered.

8. Fourth Embodiment

Next, a television broadcast signal transmitter-and-receiver system including the illumination unit 1, 2, or 3 according to any one of the above-described respective embodiments and the modification examples thereof will be described below.

Figure 78:
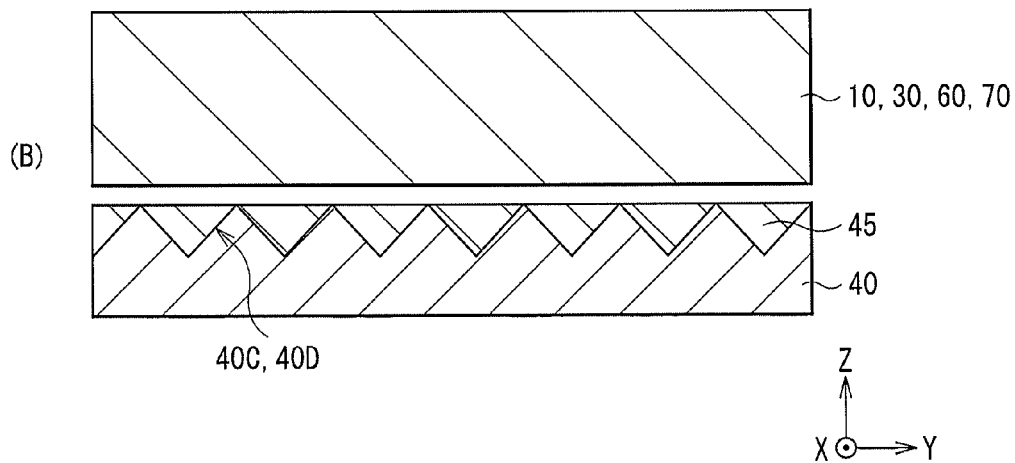
FIG. 78 is a diagram illustrating an example of a television broadcast signal transmitter-and-receiver system according to a fourth embodiment of the present technology.

FIG. 78 is a block diagram illustrating a configuration example of a transmitter-and-receiver system for a television broadcast signal 100A according to a fourth embodiment. The transmitter-and-receiver system includes a transmitter-side unit 100 configured to transmit the television broadcast signal through, for example, wired communication (such as cable TV) or wireless communication (such as terrestrial digital waves or satellite waves), and the receiver-side unit 200 configured to receive the television broadcast signal from the transmitter-side unit 100 through the above-described wired or wireless communication. It is to be noted that the receiver-side unit 200 corresponds to a specific example of "display unit" in the present technology.

The television broadcast signal 100A includes image data for two-dimensional display (planar display) or image data for three-dimensional display (stereoscopic display). As used herein, the image data for two-dimensional display refers to two-dimensional image data without perspective information. Moreover, the image data for three-dimensional display refers to two-dimensional image data with perspective information, and the image data for three-dimensional display includes plural sets of two-dimensional image data with perspectives different from one another. The transmitter-side unit 100 may be, for example, a television broadcast signal transmitter installed in a broadcasting station, or a server on the Internet.

(Functional Block of Receiver-Side Unit 200)

Figure 79:
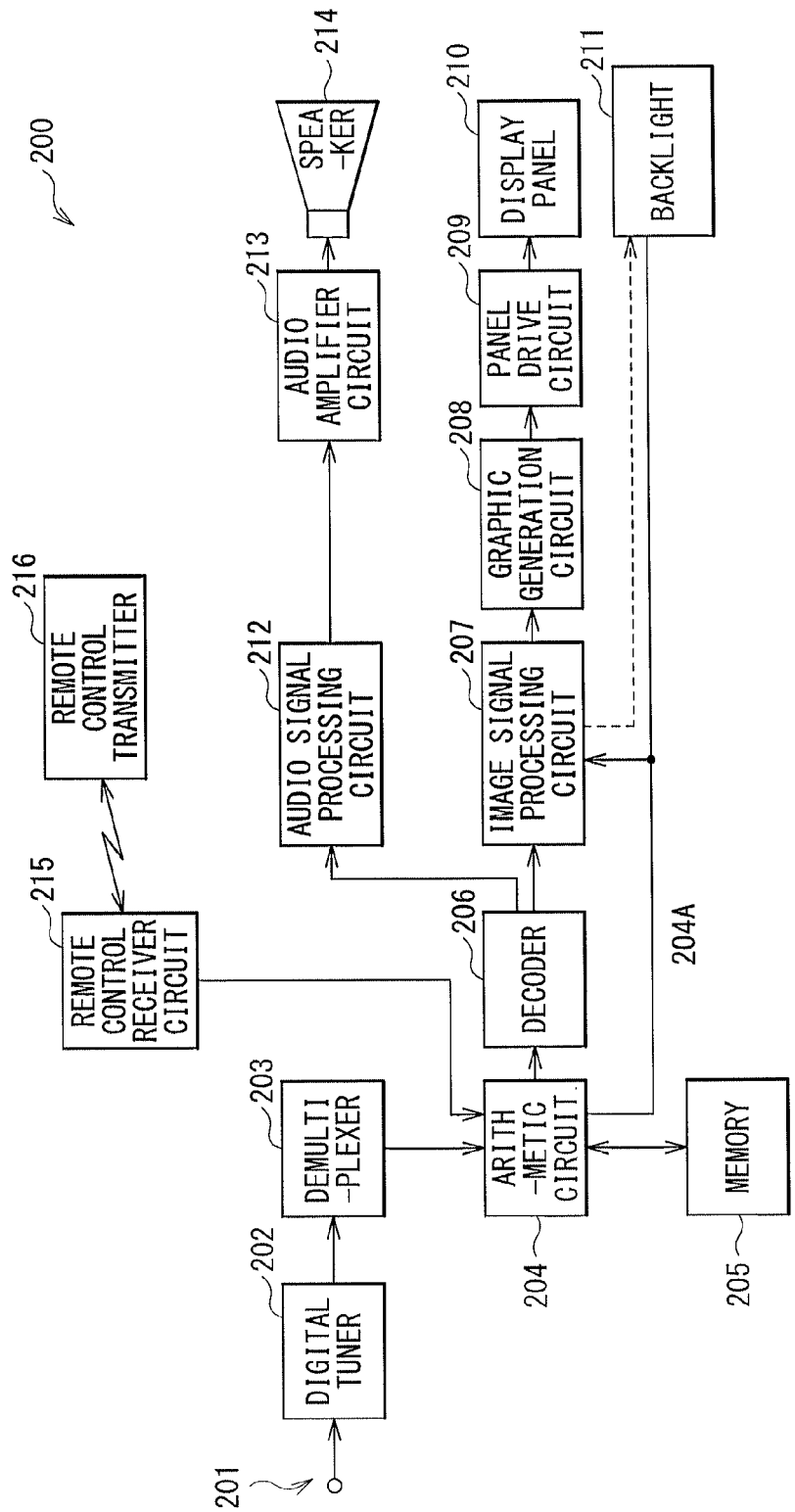
FIG. 79 is a diagram illustrating an example of functional blocks of a receiver-side unit in FIG. 78.

FIG. 79 is a block diagram of a configuration example of the receiver-side unit 200. The receiver-side unit 200 may be, for example, a television capable of being connected to the above-described wired or wireless communication. The receiver-side unit 200 may include, for example, an antenna terminal 201, a digital tuner 202, a demultiplexer 203, an arithmetic circuit 204, and a memory 205. The receiver-side unit 200 may further include, for example, a decoder 206, an image signal processing circuit 207, a graphic generation circuit 208, a panel drive circuit 209, a display panel 210, a backlight 211, an audio signal processing circuit 212, an audio amplifier circuit 213, and a speaker 214. The receiver-side unit 200 may further include, for example, a remote control receiver circuit 215 and a remote control transmitter 216.

It is to be noted that the backlight 211 corresponds to the illumination unit 1, 2, or 3 according to any one of the above-described respective embodiments and the modification examples thereof. Moreover, the display panel 210 corresponds to a specific example of "display panel" in the present technology, and the backlight 211 corresponds to a specific example of "illumination unit" in the present technology.

The antenna terminal 201 is a terminal configured to receive the television broadcast signal received by a receiving antenna (not illustrated). For example, the digital tuner 202 is configured to process the television broadcast signal having entered into the antenna terminal 201 to output a predetermined transport stream associated with a channel selected by a user. For example, the demultiplexer 203 extracts a partial TS (Transport Stream) associated with the channel selected by the user from the transport stream obtained in the digital tuner 202.

The arithmetic circuit 204 is configured to control operations of respective components of the receiver-side unit 200. For example, the arithmetic circuit 204 may store the partial TS obtained by the demultiplexer 203 in the memory 205, or may transmit the partial TS read from the memory 205 to the decoder 206. Moreover, for example, the arithmetic circuit 204 may transmit a control signal 204A specifying two-dimensional display or three-dimensional display to the image signal processing circuit 207 and the backlight 211. The arithmetic circuit 204 sets the above-described control signal 204A based on, for example, setting information stored in the memory 205, predetermined information included in the partial TS, or setting information supplied from the remote control receiver circuit 215.

For example, the memory 205 is configured to hold the setting information of the receiver-side unit 200 and to manage data. The memory 205 may be allowed to hold, for example, the partial TS obtained by the demultiplexer 203 or setting information such as display method.

For example, the decoder 206 may perform a decoding process on an image PES (Packetized Elementary Stream)

packet included in the partial TS that is obtained by the demultiplexer 203 to obtain image data. For example, the decoder 206 may also perform a decoding process on an audio PES packet included in the partial TS that is obtained by the demultiplexer 203 to obtain audio data. As used herein, the image data refers to image data for two-dimensional display or image data for three-dimensional display.

For example, the image signal processing circuit 207 and the graphic generation circuit 208 may perform, as necessary, multiple image processing, a graphic data superimposing process, or the like on the image data obtained by the decoder 206.

In a case where the image signal processing circuit 207 receives a signal specifying three-dimensional display as the control signal 204A from the arithmetic circuit 204, and image data supplied from the decoder 206 is image data for three-dimensional display, the image signal processing circuit 207 generates, for example, one set of two-dimensional image data with use of plural sets of two-dimensional image data with perspectives different from one another included in the image data for three-dimensional display supplied from the decoder 206, to select the generated two-dimensional image data as image data that is to be supplied to the graphic generation circuit 208. For example, in a case where the image data for three-dimensional display includes two sets of two-dimensional image data with perspectives different from each other, the image signal processing circuit 207 performs a process of alternately arranging the two sets of two-dimensional image data in a horizontal direction from one row to another to generate one set of image data in which the two sets of two-dimensional image data are alternately arranged in the horizontal direction. Likewise, for example, in a case where the image data for three-dimensional display includes four sets of two-dimensional image data with perspectives different from one another, the image signal processing circuit 207 performs a process of periodically alternately arranging the four sets of two-dimensional image data in the horizontal direction from one row to another to generate one set of image data in which four sets of two-dimensional image data are periodically alternately arranged in the horizontal direction.

In a case where the image signal processing circuit 207 receives a signal specifying two-dimensional display as the control signal 204A from the arithmetic circuit 204, and image data supplied from the decoder 206 is image data for three-dimensional display, for example, the image signal processing circuit 207 may select, as image data that is to be supplied to the graphic generation circuit 208, one set of image data from plural sets of two-dimensional image data with perspectives different from one another that are included in image data for three-dimensional display supplied from the decoder 206. In a case where the image signal processing circuit 207 receives the signal specifying two-dimensional display as the control signal 204A from the arithmetic circuit 204, and the image data supplied from the decoder 206 is image data for two-dimensional display, for example, the image signal processing circuit 207 may select image data for two-dimensional display supplied from the decoder 206 as image data that is to be supplied to the graphic generation circuit 208.

The graphic generation circuit 208 is configured to generate, for example, a UI (User Interface) screen that is to be used for screen display. For example, the panel drive circuit 209 is configured to drive the display panel 210 based on image data output from the graphic generation circuit 208.

A configuration of the display panel 210 will be described in detail later. For example, the audio signal processing circuit 212 is configured to perform a process such as D/A conversion on audio data obtained by the decoder 206. The audio amplifier circuit 213 is configured to amplify, for example, an audio signal output from the audio signal processing circuit 212 to supply the amplified audio signal to the speaker 214.

The remote control receiver circuit 215 is configured to receive, for example, a remote control signal transmitted from the remote control transmitter 216 to supply the remote control signal to the arithmetic circuit 204. The arithmetic circuit 204 is configured to control, for example, respective components of the receiver-side unit 200 in response to the remote control signal.

(Sectional Configuration of Receiver-Side Unit 200)

Figure 80:
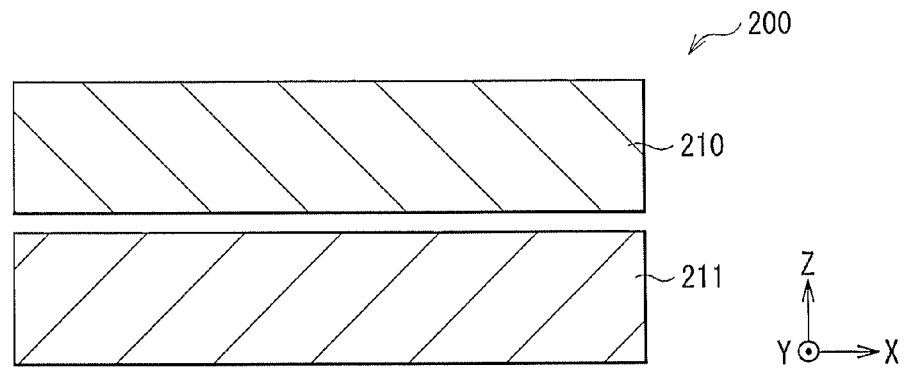
FIG. 80 is a sectional view illustrating an example of a configuration of a display section in the receiver-side unit in FIG. 78.

FIG. 80 illustrates an example of a sectional configuration of a display section of the receiver-side unit 200. It is to be noted that FIG. 80 is a schematic illustration, and dimensions and shapes in the illustration are not necessarily the same as actual dimensions and shapes. The receiver-side unit 200 includes the display panel 210 and the backlight 211 disposed behind the display panel 210.

The display panel 210 includes a plurality of pixels that are two-dimensionally arranged, and is configured to display an image by driving respective pixels or specific pixels. The display panel 210 may be, for example, a transmissive liquid crystal display panel (LCD) in which respective pixels or specific pixels are driven based on an image signal, and may have a configuration in which a liquid crystal layer is sandwiched between a pair of transparent substrates. Although not illustrated, the display panel 210 may include, for example, a polarization plate, a transparent substrate, pixel electrodes, an alignment film, a liquid crystal layer, an alignment film, a common electrode, a color filter, a transparent substrate, and a polarization plate in order from the backlight 211. It is to be noted that, in the display panel 210, a laminate configured of the transparent substrate, the pixel electrodes, the alignment film, the liquid crystal layer, the alignment film, the common electrode, the color filter, and the transparent substrate corresponds to a liquid crystal panel 210A in FIG. 81. Moreover, the polarizing plate located closer to the backlight 211 corresponds to a polarizing plate 210B in FIG. 81, and the polarizing plate on a side opposite to the backlight 211 corresponds to a polarizing plate 210C in FIG. 81.

The transparent substrates are configured of substrates transparent to visible light, for example, plate glass. It is to be noted that, although not illustrated, an active drive circuit including TFTs (thin film transistors), wiring, and the like electrically connected to the pixel electrodes is formed on the transparent substrate located closer to the backlight 211. The pixel electrodes and the common electrode may be made of, for example, indium tin oxide (ITO). The pixel electrodes are two-dimensionally arranged on the transparent substrate, and function as electrodes for respective pixels. On the other hand, the common electrode is formed on an entire surface of the color filter, and functions as a common electrode facing the respective pixel electrodes. The alignment films may be made of a polymer material such as polyimide, and perform an alignment process on a liquid crystal.

The liquid crystal layer may be made of, for example, a VA (Vertical Alignment) mode, TN (Twisted Nematic) mode, or STN (Super Twisted Nematic) mode liquid crystal, and has a function of changing the direction of a polarizing axis of emitted light from the backlight 211 in each pixel by a voltage applied from the drive circuit (not illustrated). It is to be noted that liquid crystal alignment is changed in a stepwise manner to adjust the direction of a transmission axis of each pixel in a stepwise manner. In the color filter, color filters separating light having passed through the liquid crystal layer into, for example, three primary colors of red (R), green (G), and blue (B), or four colors such as R, G, B, and white (W), respectively, are arranged corresponding to the arrangement of the pixel electrodes.

The polarization plates are optical shutters of one kind, and allow only light (polarized light) in a certain vibration direction to pass therethrough. It is to be noted that the polarization plates may be absorption polarizers absorbing light (polarized light) in a vibration direction other than a transmission axis, but the polarization plates may be preferably reflective polarizers reflecting light toward the backlight 211 in terms of an improvement in luminance. The two polarization plates are disposed to allow their polarizing axes to be different by 90° from each other, thereby allowing emitted light from the backlight 211 to pass therethrough via the liquid crystal layer, or to be shielded.

Figure 81:
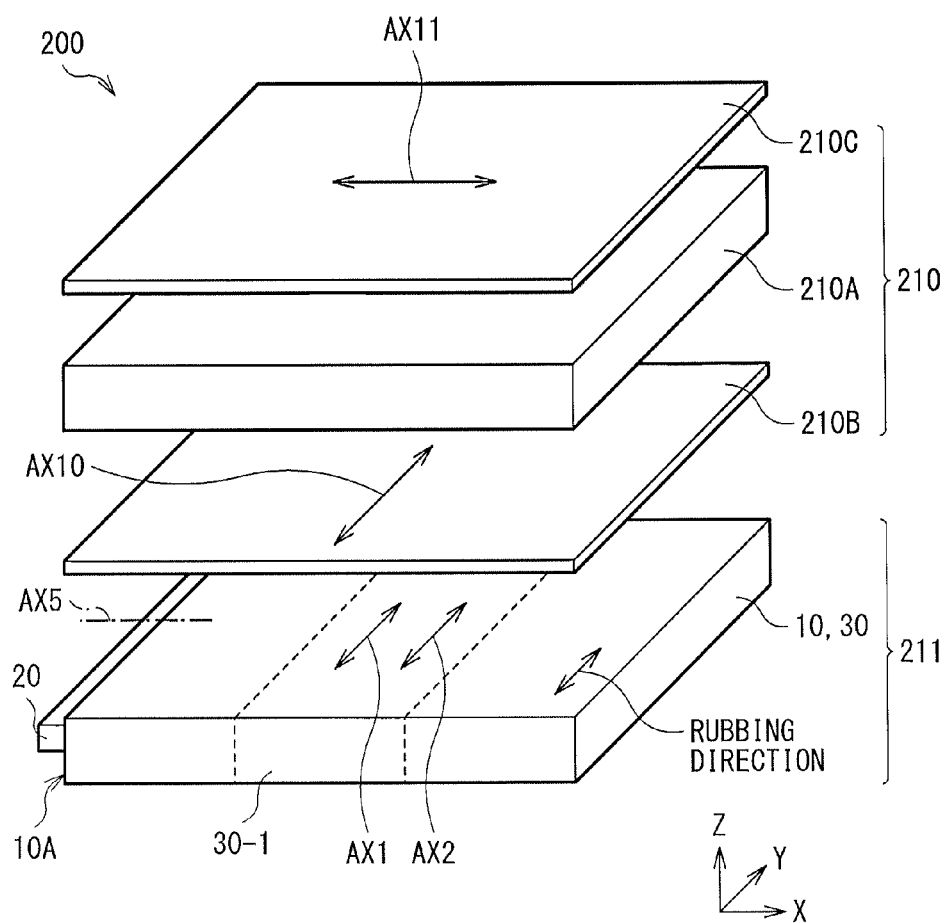
FIG. 81 is a perspective view illustrating an example of a relationship between a rubbing direction and a transmission axis of a planarizing plate in the receiver-side unit in FIG. 78.

Incidentally, in this embodiment, under no voltage application, the optical axis AX1 of the bulk 34A and the optical axis AX2 of the microparticle 34B each mainly have an optical-axis component in a same direction, and, for example, as illustrated in FIG. 81, the optical axes AX1 and AX2 may be preferably oriented in a rubbing direction of the alignment films 33 and 35. Moreover, for example, as illustrated in FIG. 81, under no voltage application, the optical axes AX1 and AX2 may preferably mainly have an optical-axis component in a direction parallel to the transmission axis AX10 of the polarizing plate 210B located closer to the backlight 211. For example, as illustrated in FIG. 81, the transmission axis AX10 may be preferably oriented in the rubbing direction of the alignment films 33 and 35.

For example, as illustrated in FIG. 81, under no voltage application, the optical axes AX1 and AX2 may be preferably oriented in a direction intersecting with or orthogonal (or substantially orthogonal) to a normal AX5 to the light incident surface 10A. Moreover, for example, as illustrated in FIGS. 2 and 81, under no voltage application, the optical axes AX1 and AX2 may be preferably parallel or substantially parallel to the transparent substrate 31. In other words, under no voltage application, the optical axes AX1 and AX2 may be preferably oriented substantially in a Y-axis direction in FIG. 81. A Reason for this is described in [Anisotropic Scattering] in the above-described first embodiment.

Moreover, as described above, under voltage application, the optical axis AX1 may be preferably oriented in the same direction or substantially the same direction as that under no voltage application. Under voltage application, the optical axis AX1 mainly has an optical-axis component in a direction parallel to the transmission axis AX10 of the polarizing plate 210B, and may be preferably oriented in a direction parallel to the transmission axis AX10. Under voltage application, the optical axis AX1 is oriented in a direction intersecting with or orthogonal (or substantially orthogonal) to an optical axis AX5 of the light source 20, and may be preferably parallel or substantially parallel to the transparent substrate 31.

On the other hand, under voltage application, the optical axis AX2 may be preferably displaced in a predetermined direction by an influence of an electric field generated by a voltage applied to the lower electrode 32 and the upper electrode 36. Under voltage application, the optical axis AX2 may preferably intersect with or may be preferably orthogonal (or substantially orthogonal) to the transparent substrate 31. In other words, the optical axis AX2 may be preferably displaced in a direction where an angle between the optical axis AX2 and the normal to the transparent substrate 31 is reduced by voltage application to the lower electrode 32 and the upper electrode 36. At this time, the optical axis AX2 intersects with or is orthogonal (or substantially orthogonal) to the optical axis AX1, and may preferably intersect with or may be preferably orthogonal (or substantially orthogonal) to the transparent substrate 31.

Next, functions and effects of the receiver-side unit 200 according to this embodiment will be described below.

In the receiver-side unit 200 according to this embodiment, any of the illumination unit 1, the illumination unit 2, and the illumination unit 3 according to the above-described embodiments and the modification examples thereof is used as the backlight 211. Therefore, in three-dimensional display, a plurality of linear illumination light beams are emitted from a predetermined region of a light exit surface of the backlight 211 to a front direction. Thus, each of linear illumination light beams emitted to the front direction enters a back surface of the display panel 210.

Figure 82:
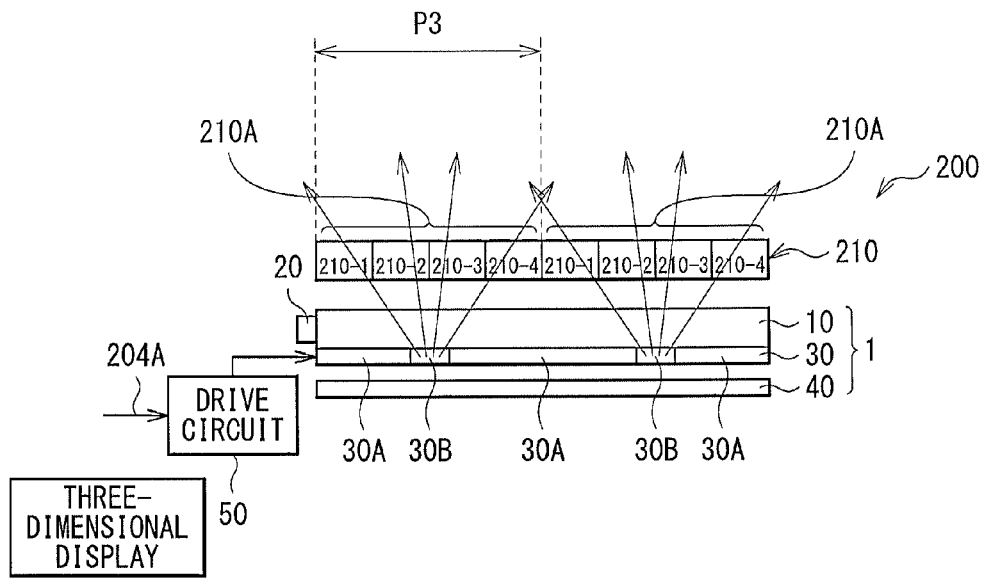
FIG. 82 is a schematic view for describing three-dimensional display in the display section in FIG. 78.

In this case, in a case where two-dimensional image data for three-dimensional display is generated in the image signal processing circuit 207 to allow respective pixel rows in a pixel arrangement corresponding to respective linear illumination light beams to serve as three-dimensional pixels 210D, for example, as illustrated in FIG. 82, the respective linear illumination light beams enter, at a substantially equal angle, into pixels (for example, 210-1, 210-2, 210-3, or 210-4 in FIG. 82) in the same position in respective three-dimensional pixels 210D. As a result, image light modulated by the pixels in the same position in respective three-dimensional pixels 210D is emitted from the pixels at a predetermined angle. At this time, a viewer views different images having a parallax therebetween with his right and left eyes; therefore, the viewer perceives that a three-dimensional image (a stereoscopic image) is displayed on the display panel 210. It is to be noted that, in FIG. 82, a case where the illumination unit 1 is used as the backlight 211 is exemplified; however, other illumination units 2 and 3 may be used as the backlight 211.

Moreover, in the receiver-side unit 200 according to this embodiment, in two-dimensional display, light is emitted from the entire light exit surface of the backlight 211 to emit planar illumination light to the front direction. Therefore, the planar illumination light emitted to the front direction enters the back surface of the display panel 210.

Figure 83:
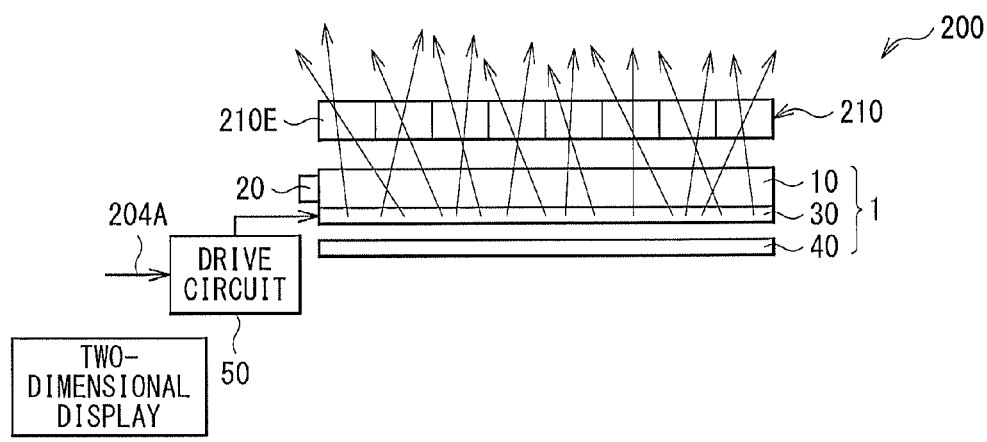
FIG. 83 is a schematic view for describing two-dimensional display in the display section in FIG. 78.

In this case, when two-dimensional image data for two-dimensional display associated with respective pixels 210E is generated in the image signal processing circuit 207, for example, as illustrated in FIG. 83, planar illumination light enters into the respective pixels 210E at all angles, and image light modulated by the respective pixels 210E is emitted from the respective pixels 210E. At this time, since the viewer views the same image with both eyes, the viewer perceives that a two-dimensional image (a planar image) is displayed on the display panel 210. It is to be noted that, in FIG. 83, a case where the illumination unit 1 is used as the backlight 211 is exemplified; however, other illumination units 2 and 3 may be used as the backlight 211.

Incidentally, in this embodiment, in the backlight 211, linear illumination light is reflected by the reflective plate 40 to generate reflected light L12 focused on a focal point. Thus, the front intensity distribution and the angle intensity distribution of the reflected light L12 are allowed to be brought close to the front intensity distribution and the angle intensity distribution of light L13 emitted toward a direction opposite to the reflective plate 40 of the linear illumination light. As a result, compared to the case where the top surface of the reflective plate is configured of a flat surface (refer to FIG. 22) and the case where the top surface of the reflective plate is configured of a parabolic surface generating parallel light (refer to FIG. 20), in three-dimensional display, a rate at which the reflected light L13 passes through a part different from a part that generates linear illumination light to exit from the top surface is allowed to be reduced. Moreover, a rate at which the reflected light L13 is emitted to an unnecessary angle direction for three-dimensional display is allowed to be reduced. Thus, in a case where such an illumination unit 1, such an illumination unit 2, or such an illumination unit 3 is applied as the backlight 211 of the receiver-side unit 200, formation of a double image in three-dimensional display is allowed to be reduced. Therefore, display quality in three-dimensional display is improved.

9. Modification Examples of Fourth Embodiment

First Modification Example

Figure 84:
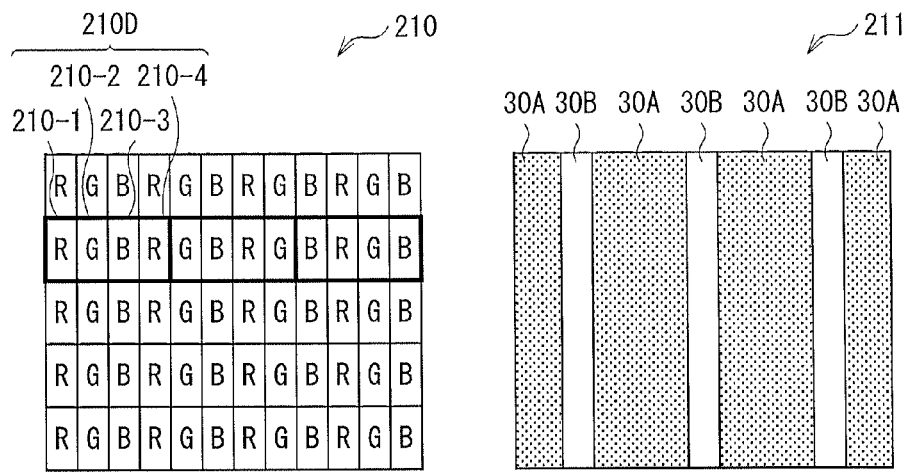
FIGS. 84A through 84D is a schematic view illustrating an example of a relationship between pixels in a display panel and backlight light.
Figure 84:
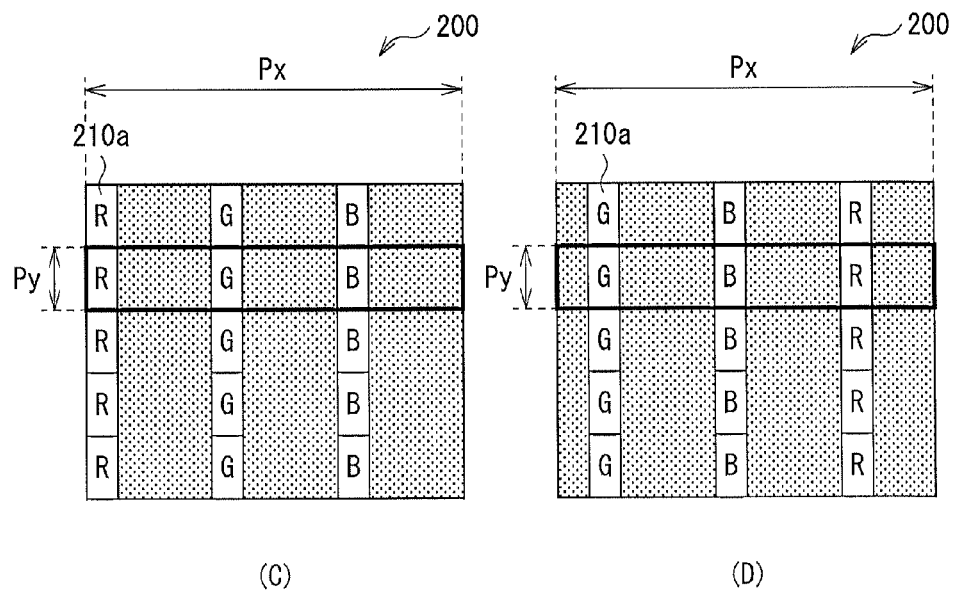

In the above-described fourth embodiment, for example, as illustrated by a thick-frame in FIG. 84(A), in three-dimensional display, a combination of four pixels 210-1 to 210-4 of the display panel 210 is driven as one three-dimensional pixel 210D. At this time, for example, as illustrated in FIG. 84(B), the backlight 211 forms one scattering region 30B per three-dimensional pixel 210D to allow backlight light to enter the pixels 210-1 to 210-4 at different incident angles. Therefore, strip-like illumination light beams enter into pixels (for example, in FIG. 82, pixels 210-1, 210-2, 210-3, or 210-4) in the same position in respective three-dimensional pixels 210D at a substantially same angle. As a result, the pixels in the same position in respective three-dimensional pixels 210D outputs image light modulated by the pixels at a predetermined angle. At this time, the viewer concurrently views, for example, image light from the pixel 210a illustrated in FIG. 84(C) with his right eye and image light from the pixel 210a illustrated in FIG. 84(D) with his left eye. In other words, the viewer views different images having a parallax therebetween with his right and left eyes. As a result, the viewer perceives that a three-dimensional image (a stereoscopic image) is displayed on the display panel 210.

When a pixel pitch Px in a horizontal direction and a pixel pitch Py in a vertical direction are compared to each other, the pixel pitch Py in the vertical direction is several times as large as the pixel pitch Px in the horizontal direction. Therefore, the viewer views an image with pixel pitches in the vertical direction and the horizontal direction that are greatly different from each other. At this time, the viewer may perceive that image quality is degraded.

Figure 85:
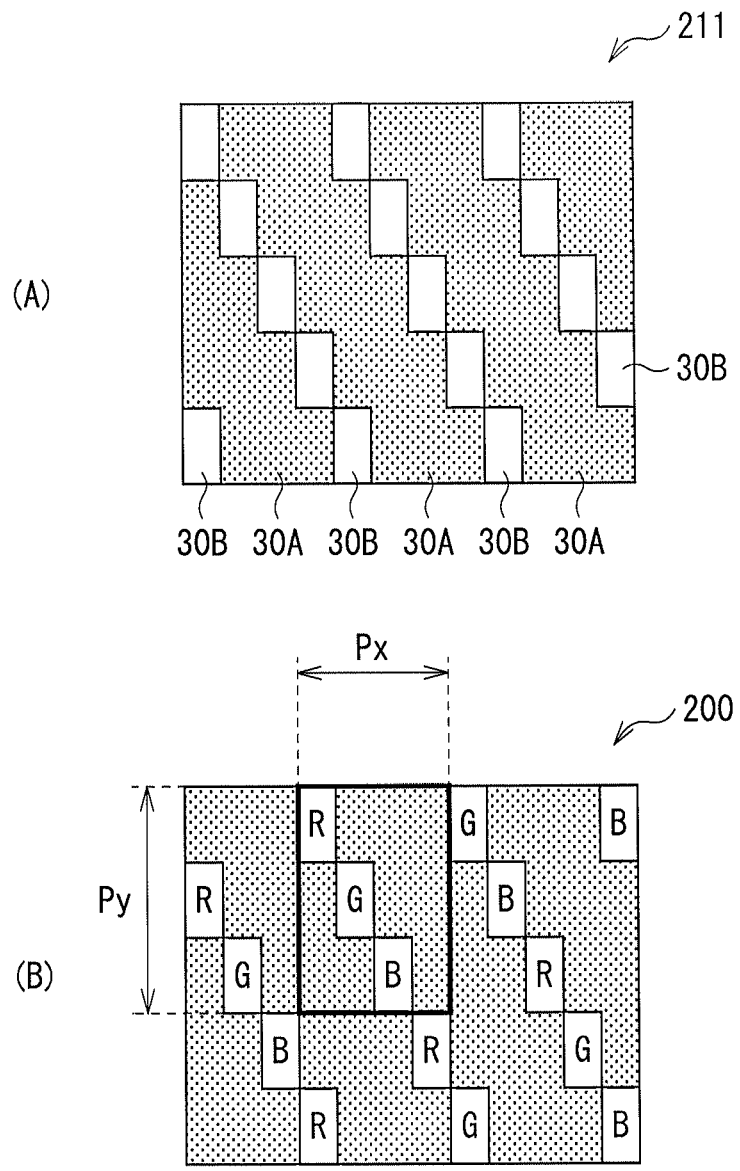
FIGS. 85A and 85B is a schematic view illustrating another example of the relationship between pixels in the display panel and backlight light.

Therefore, for example, as illustrated in FIG. 85(A), respective scattering regions 30B are displaced, in relation to other adjacent scattering regions 30B, by the width of the pixel 210a in the horizontal direction (the Y-axis direction). In such a case, as illustrated in FIG. 85(B), the pixel pitch Px in the horizontal direction and the pixel pitch Py in the vertical direction are allowed to be closer to each other, compared to the case in FIGS. 84(C) and (D). As a result, degradation in image quality is allowed to be suppressed.

Figure 86:
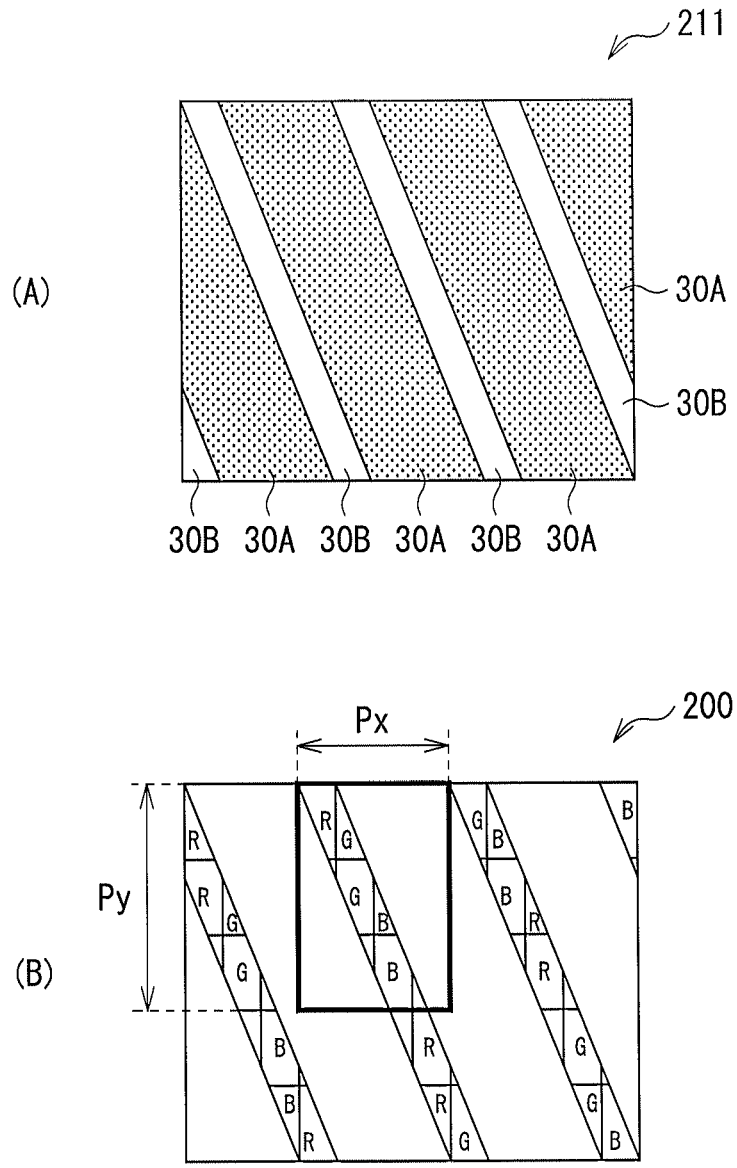
FIGS. 86A and 86B is a schematic view illustrating still another example of the relationship between pixels in the display panel and backlight light.
Figure 87:
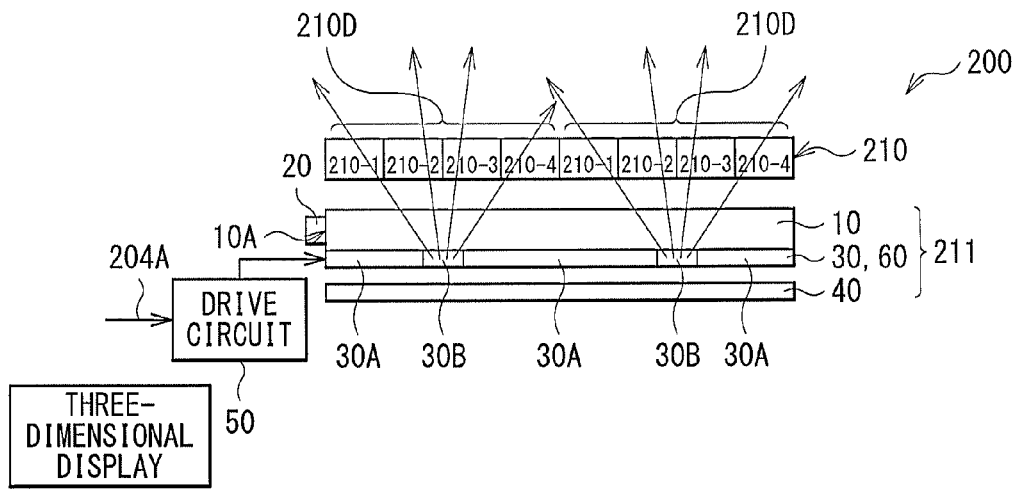
FIG. 87 is a schematic view illustrating an example of time-divisional drive in three-dimensional display.
Figure 88:
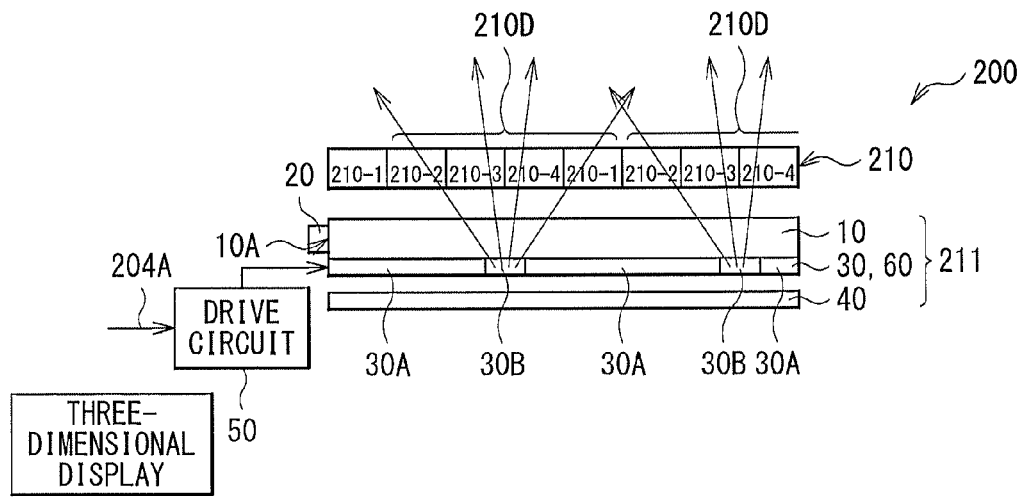
FIG. 88 is a schematic view illustrating an example of the time-divisional drive following FIG. 87.
Figure 89:
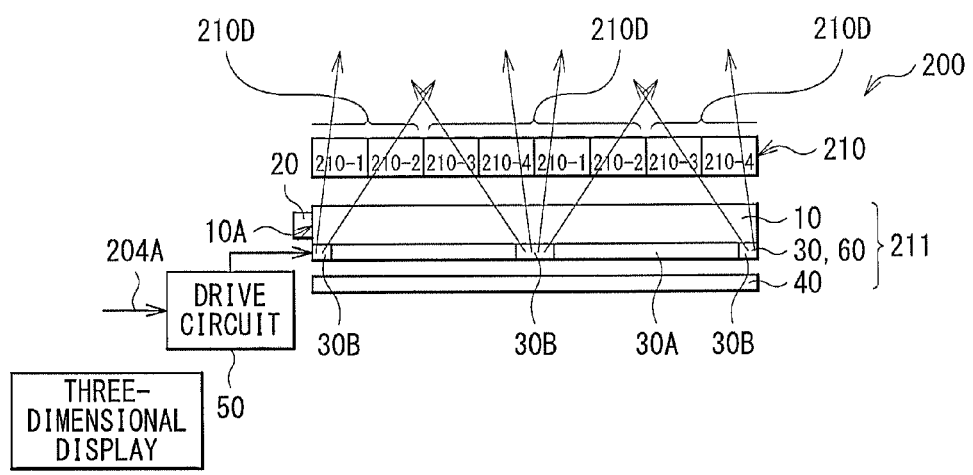
FIG. 89 is a schematic view illustrating an example of the time-divisional drive following FIG. 88.
Figure 90:
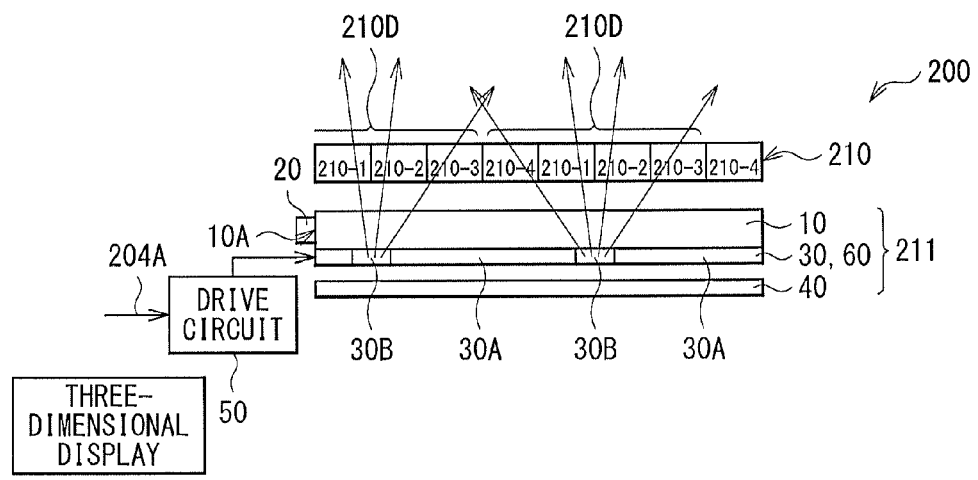
FIG. 90 is a schematic view illustrating an example of the time-divisional drive following FIG. 89.

It is to be noted that, as illustrated in FIG. 86(A), respective scattering regions 30B may be arranged in oblique stripes. In such a case, as illustrated in FIG. 86(B), the pixel pitch Px in the horizontal direction and the pixel pitch Py in the vertical direction are allowed to be closer to each other, compared to the case in FIGS. 84(C) and (D). As a result, degradation in image quality is allowed to be suppressed. It is to be noted that, in the case of a display panel having a panel size of 3.5 inches and 800 (vertical)×480 (horizontal)×3 (RGB) pixels, a tilt angle of each scattering region 30B is 71.57° in 4 parallaxes.

Second Modification Example

In the above-described fourth embodiment and the modification examples thereof, a drive circuit (not illustrated) driving the display panel 210 may time-divisionally drive the display panel 210. In this case, the drive circuit 50 switches emission points for strip-like illumination light beams from the backlight 211 in synchronization with sequential display switching in the display panel 210 from one pixel row to another in an equal number of pixel rows to the number of parallaxes within a predetermined period. For example, as illustrated in FIGS. 87, 88, 89, and 90 in order, the drive circuit 50 switches the emission points for strip-like illumination light beams from the backlight 211 in synchronization with sequential display switching in the display panel 210 from one pixel row to another in four pixel rows within one frame period (1/60 seconds). At this time, the drive circuit (not illustrated) driving the display panel 210 applies a voltage corresponding to an image signal to each pixel to perform sequential display switching in the display panel 210 from one pixel row to another in an equal number of pixel rows to the number of parallaxes within one frame period (1/60 seconds). When such switching is performed at high speed, a viewer perceives a number of pixels that is four times as large as the number of pixels illuminating at a moment, thereby allowing substantial resolution to be enhanced.

10. Examples

Next, an example of the backlight 211 according to the above-described embodiments and the modification examples thereof will be described below.

Figure 91:
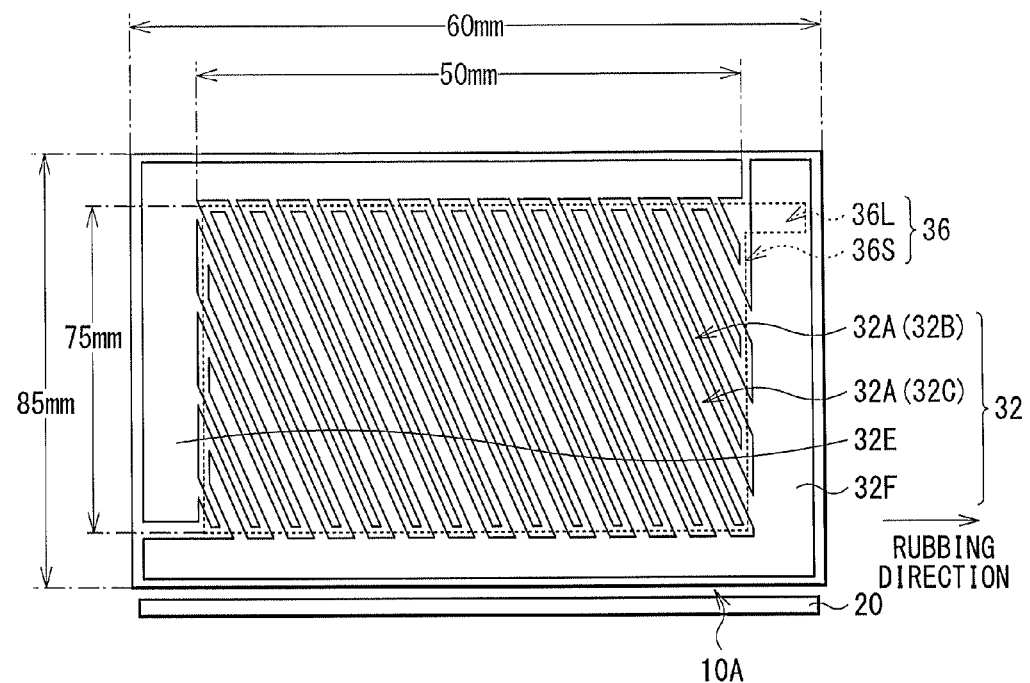
FIG. 91 is a top view illustrating an example of an electrode configuration in an illumination unit according to an example.
Figure 92:
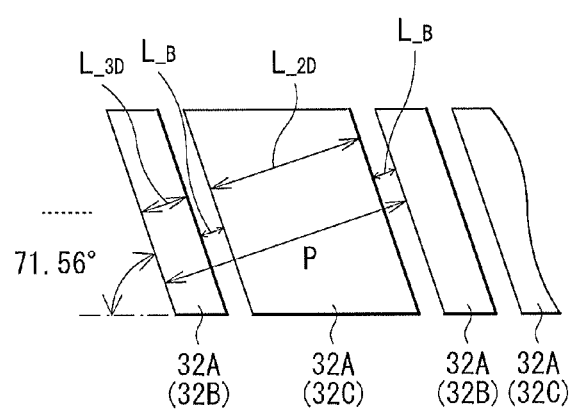
FIG. 92 is an enlarged top view illustrating an example of the electrode configuration in FIG. 91.

FIG. 91 illustrates an example of a layout of the lower electrode 32 and the upper electrode 36 of the backlight 211 according to this example. FIG. 92 illustrates an enlarged view of a part of the lower electrode 32 in FIG. 91. It is to be noted that the lower electrode 32 was configured of a plurality of groups each including one sub-electrode 32B and three sub-electrodes 32C. Moreover, the lower electrode 32 had a wiring line 32E connected to respective sub-electrodes 32B and a wiring line 32F connected to respective sub-electrodes 32C out of a display region.

The lower electrode 32 was formed by forming an ITO film on a substrate with a size of 60 mm wide×85 mm high×0.7 mm thick and performing patterning. At that time, the lower electrode 32 was configured of one sub-electrode 32B used for three-dimensional display and two-dimensional display and three sub-electrodes 32C used only for two-dimensional display, and the sub-electrodes 32B and 32C were tilted in a direction intersecting with the light incident surface 10A at 71.56°. A maximum width (L_3D) of each sub-electrode 32B was 45 μm, and a maximum width (L_2D) of each sub-electrode 32C was 165 μm. Moreover, a width (L_B) of a gap between the sub-electrode 32B and the sub-electrode 32C was 15 μm, and a pitch (P) of the sub-electrode 32B was 240 μm. Then, the sub-electrodes 32B and 32C were disposed in a region with a size of 50 mm wide×75 mm high.

Moreover, the upper electrode 36 was formed by forming an ITO film on a substrate with a size of 60 mm wide×85 mm high×0.7 mm thick and performing patterning. At that time, the upper electrode 36 was configured of a planar electrode 36S with a size of 50 mm wide×75 mm high and a wiring line 36L extracted from the planar electrode 36S.

After surfaces of the lower electrode 32 and the upper electrode 36 were coated with alignment films, the respective alignment films were rubbed in a predetermined direction (refer to FIG. 91), and 4-μm spacers were sprayed on a surface of the alignment film located on the lower electrode 32, and a ring-shaped sealant was drawn on a surface of the alignment film located on the upper electrode 36. After that, the lower electrode 32 and the upper electrode 36 were bonded together to allow the planar electrode 36S to be disposed in a region facing the sub-electrodes 32B and 32C, as well as to allow the wiring line 36L to be disposed in a region facing the wiring line 32E or the wiring line 32F at a longest possible distance from the light source 20. Next, a PDLC was vacuum-injected in a gap between the lower electrode 32 and the upper electrode 36 to complete a display panel. Next, seven LED light sources were disposed at intervals of 7 mm on an end surface having a length of 60 mm, and a black plate was disposed on a back surface of the display panel to complete an illumination unit. It is to be noted that a glass substrate with a refractive index of 1.515 was used as the transparent substrate 31.

Moreover, as the reflective plate 40, a reflective plate with a configuration illustrated in FIG. 16 was used, and as respective dimensions, H1=700 μm, H2=387 μm to 567 μm (where n=1.515, and in a case of H2=462 μm, H2=H1/n), a distance (radius R) between the focal point C and the reflective surface 40A=368 μm to 555 μm, P1=P2=240 μm, and W1=45 μm were adopted. It is to be noted that values of R and H2 in respective Examples 1 to 7 were illustrated in Table 1. In Comparative Example 1 in Table 1, a barrier layer was used instead of the PDLC, and the surface of the reflective plate was a flat surface (specular reflection). Moreover, in Comparative Example 2 in Table 1, the PDLC was used as with Examples 1 to 7, and the surface of the reflective plate was a flat light absorption surface. Further, in Comparative Example 3 in Table 1, the PDLC was used as with Examples 1 to 7, and the surface of the reflective plate was a flat surface (specular reflection).

TABLE 1

|  | PDLC or Barrier Layer | Reflective Plate 40 | Result 1 Luminance (a.u.) | Result 2 Contrast Ratio |
|---|---|---|---|---|
| Comparative Example 1 | Barrier Layer | Flat Surface, Specular Reflection | 0.6 | 33 |
| Comparative Example 2 | PDLC | Flat Surface, Light Absorption | 1 (Standardization) | 24.1 |
| Comparative Example 3 | PDLC | Flat Surface, Specular Reflection | 1.4 | 3.9 |
| Example 1 | PDLC | R = 567 μm, H2 = 555 μm | 2.0 | 8.4 |
| Example 2 | PDLC | R = 522 μm, H2 = 508 μm | 2.1 | 16.8 |
| Example 3 | PDLC | R = 500 μm, H2 = 485 μm | 2.0 | 16.5 |
| Example 4 | PDLC | R = 477 μm, H2 = 462 μm | 1.9 | 15.9 |
| Example 5 | PDLC | R = 454 μm, H2 = 439 μm | 1.8 | 15.7 |
| Example 6 | PDLC | R = 432 μm, H2 = 415 μm | 1.8 | 16.2 |
| Example 7 | PDLC | R = 387 μm, H2 = 368 μm | 1.6 | 10.1 |

In this illumination unit, in three-dimensional display, the sub-electrodes 32B were driven with a 60-Hz 100-V pulse, and the sub-electrodes 32C and the upper electrode 36 were GNDs. Moreover, as necessary, the display panel was disposed on the illumination unit to form a display unit, and evaluation as the display unit was performed. Respective examples will be described in detail below.

It was found out from Table 1 that, in all of Examples 1 to 7, luminance was higher than that in Comparative Examples 1, 2, and 3, and a contrast ratio was higher than that in Comparative Example 3. Moreover, it was found out from Table 1 that, in Examples 2 to 6, the contrast ratio was substantially equal, and even though R or H2 was changed within the above-described range, the contrast ratio was not largely changed. Therefore, it was found out that, when the radius R was within a range of 477 μm±W1(45 μm) and H2 was within a range of 462 μm±W1(45 μm), a contrast ratio substantially equal to the result illustrated in Example 4 was obtained. In this case, H2=462 μmn=H1/n and the radius R=477 μm= $((H1/n)^2+(P1/2)^2)^{1/2}$ were established.

Moreover, the present technology is allowed to have following configurations.

(1) An illumination unit including:

an illumination optical system configured to generate linear illumination light formed by two-dimensionally arranging a plurality of linear illumination light beams or a plurality of point-like illumination light beams; and a reflective plate configured to reflect the linear illumination light, in which the reflective plate reflects the linear illumination light to or close to a plane passing through a part that generates the linear illumination light and being perpendicular to a plane including the reflective plate.

(2) The illumination unit according to (1), in which the reflective plate generates reflected light focused on a focal point located on or near a line segment passing through the part that generates the linear illumination light and being parallel to a normal to the plane including the reflective plate, when a light component parallel to a plane perpendicular to the part that generates the linear illumination light of the linear illumination light is considered.

(3) The illumination unit according to (2), in which the reflective plate has, directly below the part that generates the linear illumination light, a surface shape where the reflected light is focused.

(4) The illumination unit according to (2), in which the reflective plate has a surface shape allowing the reflected light to be focused on a focal point at a position satisfying a following expression:

$$H1/nr-W1 \leq H2 \leq H1/nr+W1$$

where H1 is a distance between a first plane including a plurality of apexes formed on a top surface of the reflective plate and the part that generates the linear illumination light, H2 is a distance between the first plane and the position of the focal point, nr is a relative refractive index (n1/n2), n1 is a refractive index of a region between the first plane and the part that generates the linear illumination light, n2 is a refractive index of a region between the first plane and a reflective surface of the reflective plate, and W1 is a width of the part that generates the linear illumination light.

(5) The illumination unit according to (2), in which the reflective plate has a surface shape allowing the reflected light to be focused on a focal point located at a position satisfying a following expression:

$$H2=H1/nr$$

where H1 is a distance between a first plane including a plurality of apexes formed on a top surface of the reflective plate and the part that generates the linear illumination light, H2 is a distance between the first plane and the position of the focal point, nr is a relative refractive index (n1/n2), n1 is a refractive index of a region between the first plane and the part that generates the linear illumination light, and n2 is a refractive index of a region between the first plane and a reflective surface of the reflective plate.

(6) The illumination unit according to any one of (2) to (5), in which the reflective plate has, as a reflective surface, a part of an inner surface of a cylinder at a position facing the part that generates the linear illumination light.

(7) The illumination unit according to any one of (2) to (6), in which a pitch of a cubic shape in the reflective surface is equal to a pitch of the part that generates the linear illumination light.

(8) The illumination unit according to (6), in which a radius r of a part corresponding to the part of the inner surface of the cylinder in the reflective surface satisfies a following expression:

$$r=(H2^2+(P1/2)^2)^{1/2}$$

where H2 is a distance between a first plane including a plurality of apexes formed on a top surface of the reflective plate and the position of the focal point, and P1 is a pitch of the part that generates the linear illumination light.

(9) The illumination unit according to (2), in which the reflective plate has a surface shape where the reflected light is focused on a focal point located at a position satisfying a following expression (A), and has, as a reflective surface, a part of an inner surface of a cylinder at a position facing the part that generates the linear illumination light, a pitch of a cubic shape in the reflective surface is equal to a pitch of the part that generates the linear illumination light, and a radius r of a part corresponding to the part of the inner surface of the cylinder satisfies a following expression (B):

$$H2=H1/nr \quad (A)$$

$$r=(H2^2+(P1/2)^2)^{1/2} \quad (B)$$

where H1 is a distance between a first plane including a plurality of apexes formed on a top surface of the reflective plate and the part that generates the linear illumination light, H2 is a distance between the first plane and the position of the focal point, nr is a relative refractive index (n1/n2), n1 is a refractive index of a region between the first plane and the position of the focal point, n2 is a refractive index of a region between the first plane and the reflective surface of the reflective plate, and P1 is a pitch of the part that generates the linear illumination light.

(10) The illumination unit according to (1), in which the reflective plate has a regular convex-concave shape with a pitch that is twice or less as large as a width of the part that generates the linear illumination light.

(11) The illumination unit according to (10), in which the reflective plate has a regular convex-concave shape with a pitch that is ½ times or less as large as the part that generates the linear illumination light.

(12) The illumination unit according to (10) or (11), in which the reflective plate has a convex-concave shape in which a plurality of depressions are close-packed, each of the depressions having an inner surface configured of three flat surfaces combined with one another at a predetermined angle.

(13) The illumination unit according to (12), in which the depressions are arranged to allow an extending direction of one or two side sections of a hole of each of the depressions and an extending direction of the part that generates the linear illumination light to be orthogonal to each other.

(14) The illumination unit according to (12), in which the predetermined angle is an angle within a range of 90°±3.8°.

(15) The illumination unit according to (10) or (11), in which the reflective plate has a convex-concave shape in which a plurality of strip-like depressions are arranged, each of the strip-like depressions having an inner surface configured of two flat surfaces combined with each other at a predetermined angle.

(16) The illumination unit according to (15), in which the predetermined angle is an angle within a range of 90°±3°.

(17) The illumination unit according to (15), in which the predetermined angle is an angle within a range where light emitted from a first part generating the linear illumination light is reflected to a second part generating the linear illumination light and being adjacent to the first part.

(18) The illumination unit according to any one of (1) to (17), in which a reflective surface of the reflective plate is a convex-concave surface, and the reflective plate includes a resin layer that is embedded in the convex-concave surface.

(19) The illumination unit according to any one of (1) to (18), in which a reflective surface of the reflective plate is a convex-concave surface, and a surface of the convex-concave surface is a mirror surface.

(20) The illumination unit according to any one of (1) to (19), in which the illumination optical system includes a light guide plate, a reflective surface of the reflective plate is a convex-concave surface, and the reflective plate includes an adhesive layer on an apex of the convex-concave surface, the adhesive layer allowing the apex of the convex-concave surface and the light guide plate to be bonded together.

(21) The illumination unit according to any one of (1) to (19), in which the illumination optical system includes a light guide plate, and the reflective plate includes an adhesive layer allowing the reflective plate and a part or a whole of an outer edge of the light guide plate to be bonded together.

(22) The illumination unit according to any one of (1) to (21), in which the illumination optical system includes a first transparent substrate and a second transparent substrate arranged to face each other with the part that generates the linear illumination light in between, an electrode disposed on a surface of at least one of the first transparent substrate and the second transparent substrate, a light source configured to emit light to an end surface of the first transparent substrate, a light modulation layer disposed in a gap between the first transparent substrate and the second transparent substrate, and configured to exhibit a scattering property or transparency with respect to light from the light source, depending on magnitude of an electric field, and a driving section configured to drive the electrode, the light modulation layer exhibits the transparency with respect to the light from the light source when the electric field is relatively small, and exhibits the scattering property with respect to light from the light source when the electric field is relatively large, and the driving section generates a plurality of first regions exhibiting the scattering property in the light modulation layer by driving the electrode, and then allowing the first regions to emit the linear illumination light.

(23) The illumination unit according to (22), in which the driving section generates the first regions in the entire light modulation layer by driving the electrode, and then allows the entire light modulation layer to emit planar illumination light.

(24) A display unit including:
a display panel including a plurality of pixels, the pixels being driven based on an image signal; and
an illumination unit configured to illuminate the display panel, the illumination unit including
an illumination optical system configured to generate linear illumination light formed by two-dimensionally arranging a plurality of linear illumination light beams or a plurality of point-like illumination light beams; and
a reflective plate configured to reflect the linear illumination light,
in which the reflective plate reflects the linear illumination light to or close to a plane passing through a part that generates the linear illumination light and being perpendicular to a plane including the reflective plate.

(25) The display unit according to (24), in which
the illumination unit includes
a first transparent substrate and a second transparent substrate arranged to face each other with the part that generates the linear illumination light in between,
an electrode disposed on a surface of at least one of the first transparent substrate and the second transparent substrate,
a light source configured to emit light to an end surface of the first transparent substrate,
a light modulation layer disposed in a gap between the first transparent substrate and the second transparent substrate, and configured to exhibit a scattering property or transparency with respect to light from the light source, depending on magnitude of an electric field, and
a driving section configured to drive the electrode, based on an image signal,
the light modulation layer exhibits the transparency with respect to the light from the light source when the electric field is relatively small, and exhibits the scattering property with respect to light from the light source when the electric field is relatively large, and
the driving section generates a plurality of scattering regions exhibiting the scattering property in the light modulation layer by driving the electrode in a three-dimensional display mode, and then allowing the scattering regions to emit the linear illumination light.

(26) The display unit according to (25), further including a pair of polarizing plates facing each other with the display panel in between,
in which the light modulation layer includes a first region and a second region, the first region having optical anisotropy and relatively high responsivity with respect to an electric field, the second region having optical anisotropy and relatively low responsivity with respect to an electric field,
the first region and the second region each mainly have an optical-axis component in a direction parallel to a transmission axis of one polarizing plate located closer to the illumination unit of the pair of polarizing plates, when the light modulation layer exhibits the transparency, and
the second region mainly has an optical-axis component in a direction parallel to the transmission axis of the polarizing plate located closer to the illumination unit of the pair of polarizing plate, and the first region has an optical axis in a direction intersecting with or orthogonal to an optical axis of the second region as well as in a direction intersecting with or orthogonal to the first transparent substrate, when the light modulation layer exhibits the scattering property.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An illumination unit comprising:
an illumination optical system configured to generate linear illumination light formed by two-dimensionally arranging a plurality of linear illumination light beams or a plurality of point-like illumination light beams; and
a reflective plate configured to reflect the linear illumination light,
wherein the reflective plate is configured to reflect the linear illumination light to or close to a plane passing through a part that generates the linear illumination light and being perpendicular to a plane including the reflective plate,
wherein the reflective plate generates reflected light focused on a focal point located on or near a line segment passing through the part that generates the linear illumination light and being parallel to a normal to the plane including the reflective plate, when a light component parallel to a plane perpendicular to the part that generates the linear illumination light, and
wherein a pitch of a cubic shape in the reflective surface is equal to a pitch of the part that generates the linear illumination light.

2. The illumination unit according to claim 1, wherein the reflective plate has, directly below the part that generates the linear illumination light, a surface shape where the reflected light is focused.

3. The illumination unit according to claim 1, wherein the reflective plate has a surface shape allowing the reflected light to be focused on a focal point at a position satisfying a following expression:

$$H1/nr - W1 \leq H2 \leq H1/nr + W1$$

where H1 is a distance between a first plane including a plurality of apexes formed on a top surface of the reflective plate and the part that generates the linear illumination light,
H2 is a distance between the first plane and the position of the focal point,
nr is a relative refractive index (n1/n2),
n1 is a refractive index of a region between the first plane and the part that generates the linear illumination light,
n2 is a refractive index of a region between the first plane and a reflective surface of the reflective plate, and
W1 is a width of the part that generates the linear illumination light.

4. The illumination unit according to claim 1, wherein the reflective plate has a surface shape allowing the reflected light to be focused on a focal point located at a position satisfying a following expression:

$$H2 = H1/nr$$

where H1 is a distance between a first plane including a plurality of apexes formed on a top surface of the reflective plate and the part that generates the linear illumination light,
H2 is a distance between the first plane and the position of the focal point,
nr is a relative refractive index (n1/n2), n1 is a refractive index of a region between the first plane and the part that generates the linear illumination light, and n2 is a refractive index of a region between the first plane and a reflective surface of the reflective plate.

5. The illumination unit according to claim 1, wherein the reflective plate has, as a reflective surface, a part of an inner surface of a cylinder at a position facing the part that generates the linear illumination light.

6. The illumination unit according to claim 5, wherein a radius r of a part corresponding to the part of the inner surface of the cylinder in the reflective surface satisfies a following expression:

$$r=(H2^2+(P1/2)^2)^{1/2}$$

where H2 is a distance between a first plane including a plurality of apexes formed on a top surface of the reflective plate and the position of the focal point, and P1 is a pitch of the part that generates the linear illumination light.

7. The illumination unit according to claim 1, wherein the reflective plate has a surface shape where the reflected light is focused on a focal point located at a position satisfying a following expression (1), and has, as a reflective surface, a part of an inner surface of a cylinder at a position facing the part that generates the linear illumination light, a pitch of a cubic shape in the reflective surface is equal to a pitch of the part that generates the linear illumination light, and a radius r of a part corresponding to the part of the inner surface of the cylinder satisfies a following expression (2):

$$H2=H1/nr \tag{1}$$

$$r(H2^2+(P1/2)^2)^{1/2} \tag{2}$$

where H1 is a distance between a first plane including a plurality of apexes formed on a top surface of the reflective plate and the part that generates the linear illumination light, H2 is a distance between the first plane and the position of the focal point, nr is a relative refractive index (n1/n2), n1 is a refractive index of a region between the first plane and the position of the focal point, n2 is a refractive index of a region between the first plane and the reflective surface of the reflective plate, P1 is a pitch of the part that generates the linear illumination light.

8. The illumination unit according to claim 1, wherein the illumination optical system includes a light guide plate, and the reflective plate includes an adhesive layer allowing the reflective plate and a part or a whole of an outer edge of the light guide plate to be bonded together.

9. An illumination unit comprising:

an illumination optical system configured to generate linear illumination light formed by two-dimensionally arranging a plurality of linear illumination light beams or a plurality of point-like illumination light beams; and a reflective plate configured to reflect the linear illumination light, wherein the reflective plate is configured to reflect the linear illumination light to or close to a plane passing through a part that generates the linear illumination light and being perpendicular to a plane including the reflective plate, wherein the reflective plate generates reflected light focused on a focal point located on or near a line segment passing through the part that generates the linear illumination light and being parallel to a normal to the plane including the reflective plate, when a light component parallel to a plane perpendicular to the part that generates the linear illumination light, and wherein the reflective plate has a surface shape allowing the reflected light to be focused on a focal point at a position satisfying a following expression:

$$H1/nr-W1 \leq H2 \leq H1/nr+W1$$

where H1 is a distance between a first plane including a plurality of apexes formed on a top surface of the reflective plate and the part that generates the linear illumination light, H2 is a distance between the first plane and the position of the focal point, nr is a relative refractive index (n1/n2), n1 is a refractive index of a region between the first plane and the part that generates the linear illumination light, n2 is a refractive index of a region between the first plane and a reflective surface of the reflective plate, and W1 is a width of the part that generates the linear illumination light.

10. The illumination unit according to claim 9, wherein the illumination optical system includes a light guide plate, and the reflective plate includes an adhesive layer allowing the reflective plate and a part or a whole of an outer edge of the light guide plate to be bonded together.

11. An illumination unit comprising:

an illumination optical system configured to generate linear illumination light formed by two-dimensionally arranging a plurality of linear illumination light beams or a plurality of point-like illumination light beams; and a reflective plate configured to reflect the linear illumination light, wherein the reflective plate is configured to reflect the linear illumination light to or close to a plane passing through a part that generates the linear illumination light and being perpendicular to a plane including the reflective plate, wherein the reflective plate generates reflected light focused on a focal point located on or near a line segment passing through the part that generates the linear illumination light and being parallel to a normal to the plane including the reflective plate, when a light component parallel to a plane perpendicular to the part that generates the linear illumination light, and wherein the reflective plate has a surface shape allowing the reflected light to be focused on a focal point located at a position satisfying a following expression:

$$H2=H1/nr$$

where H1 is a distance between a first plane including a plurality of apexes formed on a top surface of the reflective plate and the part that generates the linear illumination light, H2 is a distance between the first plane and the position of the focal point, nr is a relative refractive index (n1/n2), n1 is a refractive index of a region between the first plane and the part that generates the linear illumination light, and n2 is a refractive index of a region between the first plane and a reflective surface of the reflective plate.

12. The illumination unit according to claim 11, wherein
the illumination optical system includes a light guide plate, and
the reflective plate includes an adhesive layer allowing the reflective plate and a part or a whole of an outer edge of the light guide plate to be bonded together.

13. An illumination unit comprising:
an illumination optical system configured to generate linear illumination light formed by two-dimensionally arranging a plurality of linear illumination light beams or a plurality of point-like illumination light beams; and
a reflective plate configured to reflect the linear illumination light,
wherein the reflective plate is configured to reflect the linear illumination light to or close to a plane passing through a part that generates the linear illumination light and being perpendicular to a plane including the reflective plate,
wherein the reflective plate generates reflected light focused on a focal point located on or near a line segment passing through the part that generates the linear illumination light and being parallel to a normal to the plane including the reflective plate, when a light component parallel to a plane perpendicular to the part that generates the linear illumination light,
wherein the reflective plate has, as a reflective surface, a part of an inner surface of a cylinder at a position facing the part that generates the linear illumination light, and
wherein a radius r of a part corresponding to the part of the inner surface of the cylinder in the reflective surface satisfies a following expression:

$$r = (H2^2 + (P1/2)^2)^{1/2}$$

where H2 is a distance between a first plane including a plurality of apexes formed on a top surface of the reflective plate and the position of the focal point, and
P1 is a pitch of the part that generates the linear illumination light.

14. The illumination unit according to claim 13, wherein
the illumination optical system includes a light guide plate, and
the reflective plate includes an adhesive layer allowing the reflective plate and a part or a whole of an outer edge of the light guide plate to be bonded together.

15. An illumination unit comprising:
an illumination optical system configured to generate linear illumination light formed by two-dimensionally arranging a plurality of linear illumination light beams or a plurality of point-like illumination light beams; and
a reflective plate configured to reflect the linear illumination light,
wherein the reflective plate is configured to reflect the linear illumination light to or close to a plane passing through a part that generates the linear illumination light and being perpendicular to a plane including the reflective plate,
wherein the reflective plate generates reflected light focused on a focal point located on or near a line segment passing through the part that generates the linear illumination light and being parallel to a normal to the plane including the reflective plate, when a light component parallel to a plane perpendicular to the part that generates the linear illumination light, and
wherein the reflective plate has a surface shape where the reflected light is focused on a focal point located at a position satisfying a following expression (1), and has, as a reflective surface, a part of an inner surface of a cylinder at a position facing the part that generates the linear illumination light,
a pitch of a cubic shape in the reflective surface is equal to a pitch of the part that generates the linear illumination light, and
a radius r of a part corresponding to the part of the inner surface of the cylinder satisfies a following expression (2):

$$H2 = H1/nr \quad (1)$$

$$r = (H2^2 + (P1/2)^2)^{1/2} \quad (2)$$

where H1 is a distance between a first plane including a plurality of apexes formed on a top surface of the reflective plate and the part that generates the linear illumination light,
H2 is a distance between the first plane and the position of the focal point,
nr is a relative refractive index (n1/n2),
n1 is a refractive index of a region between the first plane and the position of the focal point,
n2 is a refractive index of a region between the first plane and the reflective surface of the reflective plate,
P1 is a pitch of the part that generates the linear illumination light.

16. The illumination unit according to claim 15, wherein
the illumination optical system includes a light guide plate, and
the reflective plate includes an adhesive layer allowing the reflective plate and a part or a whole of an outer edge of the light guide plate to be bonded together.

* * * * *